United States Patent [19]

Uchihira et al.

[11] Patent Number: 5,860,009
[45] Date of Patent: Jan. 12, 1999

[54] PROGRAMMING METHOD FOR CONCURRENT PROGRAMS AND PROGRAM SUPPORTING APPARATUS THEREOF

[75] Inventors: Naoshi Uchihira; Shinichi Honiden, both of Tokyo; Akihiko Ohsuga, Kawasaki; Toshibumi Seki, Yokohama; Yasuo Nagai; Keiichi Handa, both of Tokyo; Satoshi Ito, Yokohama; Nobuyuki Sawashima; Yasuyuki Tahara, both of Tokyo; Hideaki Shiotani, Kawasaki, all of Japan

[73] Assignee: Kabushiki Kaisha Toshiba, Kawasaki, Japan

[21] Appl. No.: 429,782

[22] Filed: Apr. 27, 1995

[30] Foreign Application Priority Data

Apr. 28, 1994 [JP] Japan .................................. 6-114668

[51] Int. Cl.$^6$ ..................................................... G06F 09/45
[52] U.S. Cl. ........................................... 395/706; 395/704
[58] Field of Search .............................................. 395/704

[56] References Cited

U.S. PATENT DOCUMENTS

| 5,048,018 | 9/1991 | Bernstein et al. | 371/19 |
| 5,325,530 | 6/1994 | Mohrmann | 395/700 |
| 5,361,352 | 11/1994 | Iwasawa et al. | 395/700 |

OTHER PUBLICATIONS

"Advanced Compiler Optimizations for Supercomputers" by Padua et al., Comm. of the ACM, vol. 29, No. 12, Dec. 1988, pp. 1184–1201.

"Compositional Adjustment of Concurrent Programs to satisfy Temporal Logic Constraints in Mendels Zone", Uchihira et al., Proc. of the 28$^{th}$ Annual Hawaii Int'l Conf. on System Sciences, 1995, pp. 359–368.

Communication of the ACM, vol. 29, No. 12, "Advanced Compiler Optimizations for Supercomputers" by Padua et al., pp. 1184–1201, Dec. 1986.

*Primary Examiner*—Emanuel Todd Voeltz
*Assistant Examiner*—Kakali Chaki
*Attorney, Agent, or Firm*—Banner & Witcoff, Ltd.

[57] ABSTRACT

An apparatus for supporting parallelization according to the invention is characterized by comprising a serialization unit for converting a first concurrent program having a concurrent structure into a sequential program capable of being sequentially executed, a debugging unit for debugging the sequential program and forming debugging information, and a concurrent program programming unit for performing parallelization of the debugged sequential program on the basis of the debugging information to convert the sequential program into a second concurrent program. With above configuration, the debugging unit includes a unit for introducing information associated with concurrency to the sequential program.

52 Claims, 68 Drawing Sheets

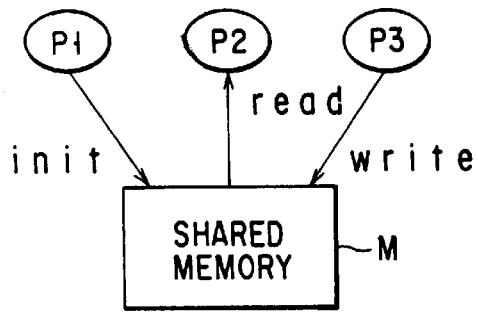
F I G. 1A
(PRIOR ART)
```
init  →  read  →  write
init  →  write →  read
read  →  init  →  write
read  →  write →  init
write →  init  →  read
write →  read  →  init
```
F I G. 1B (PRIOR ART)
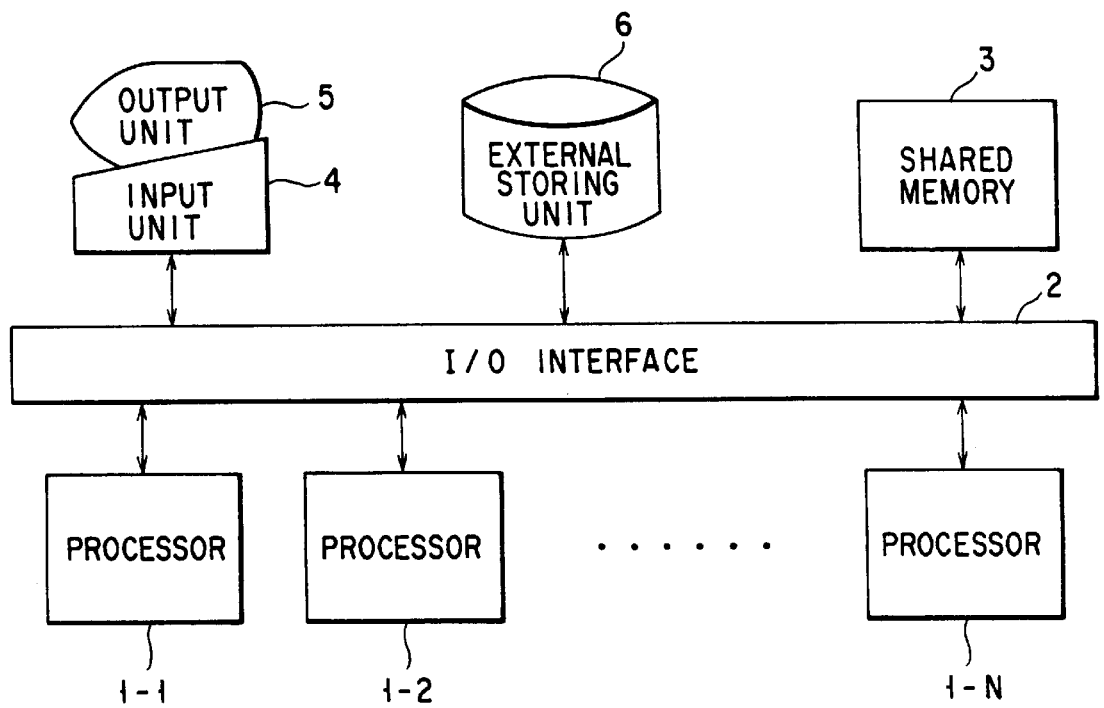
F I G. 2

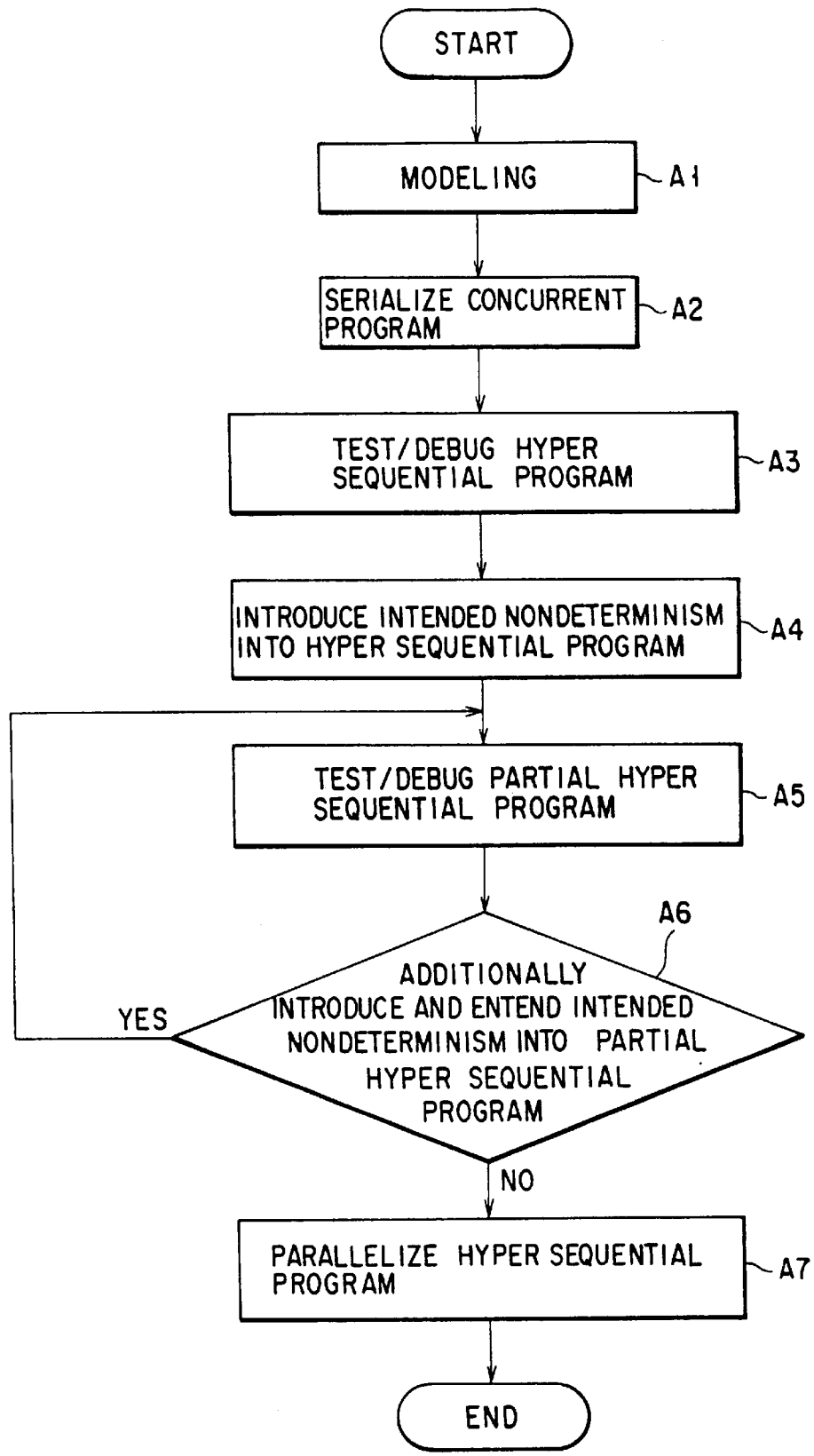
F I G. 4

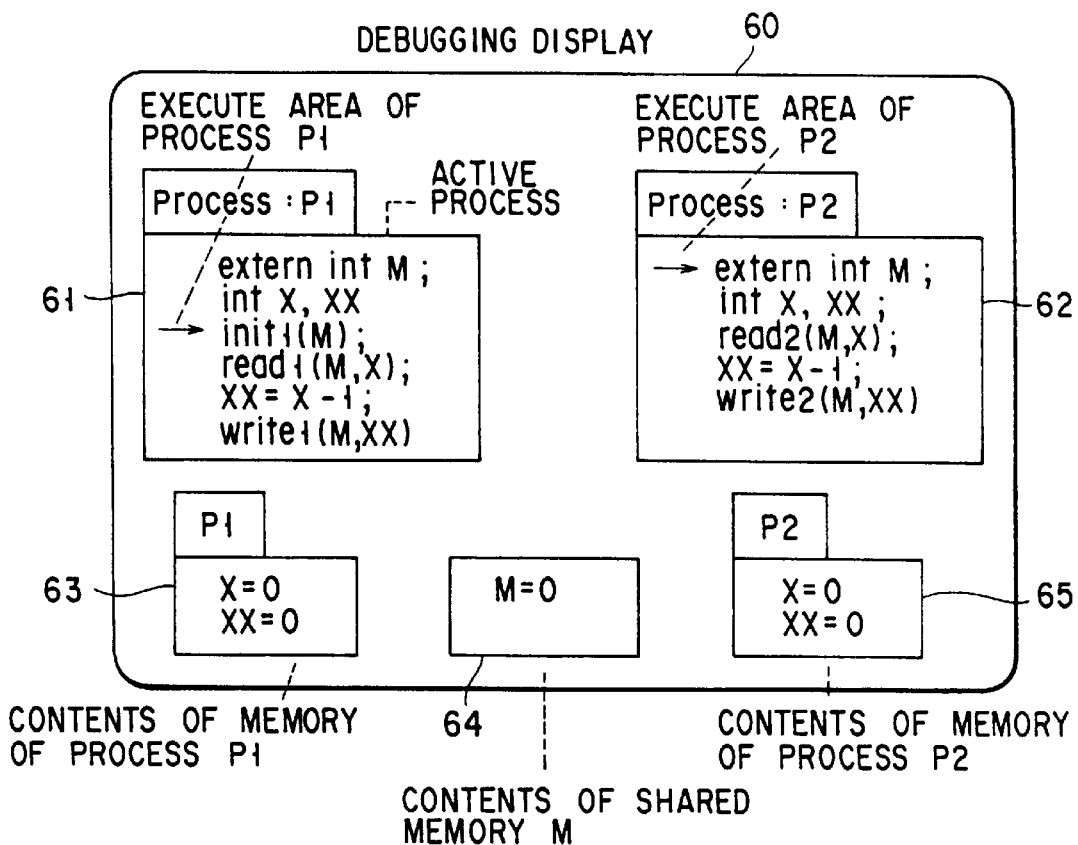
F I G. 7
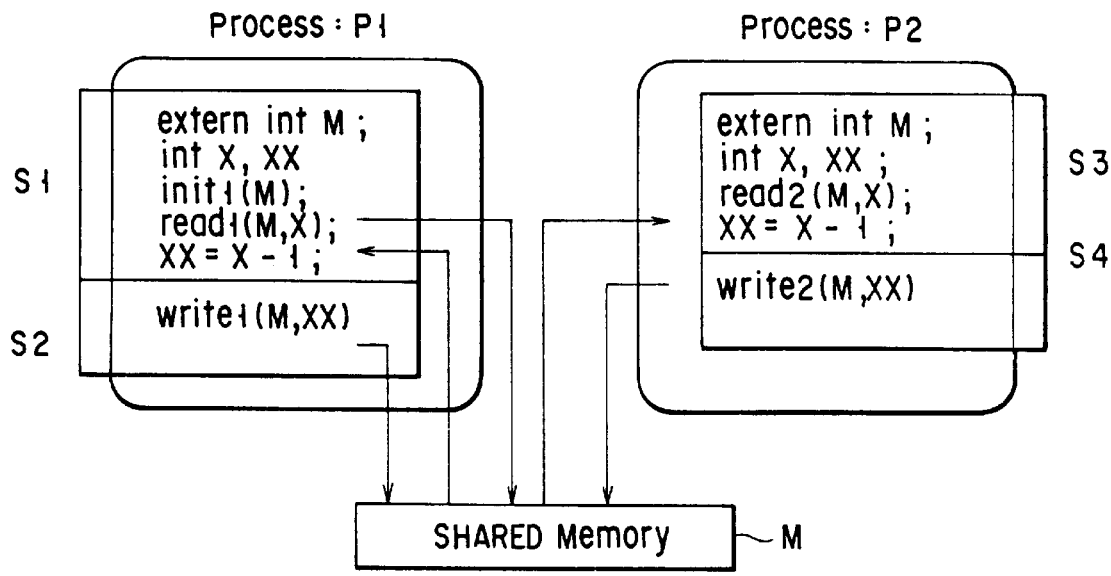
F I G. 8

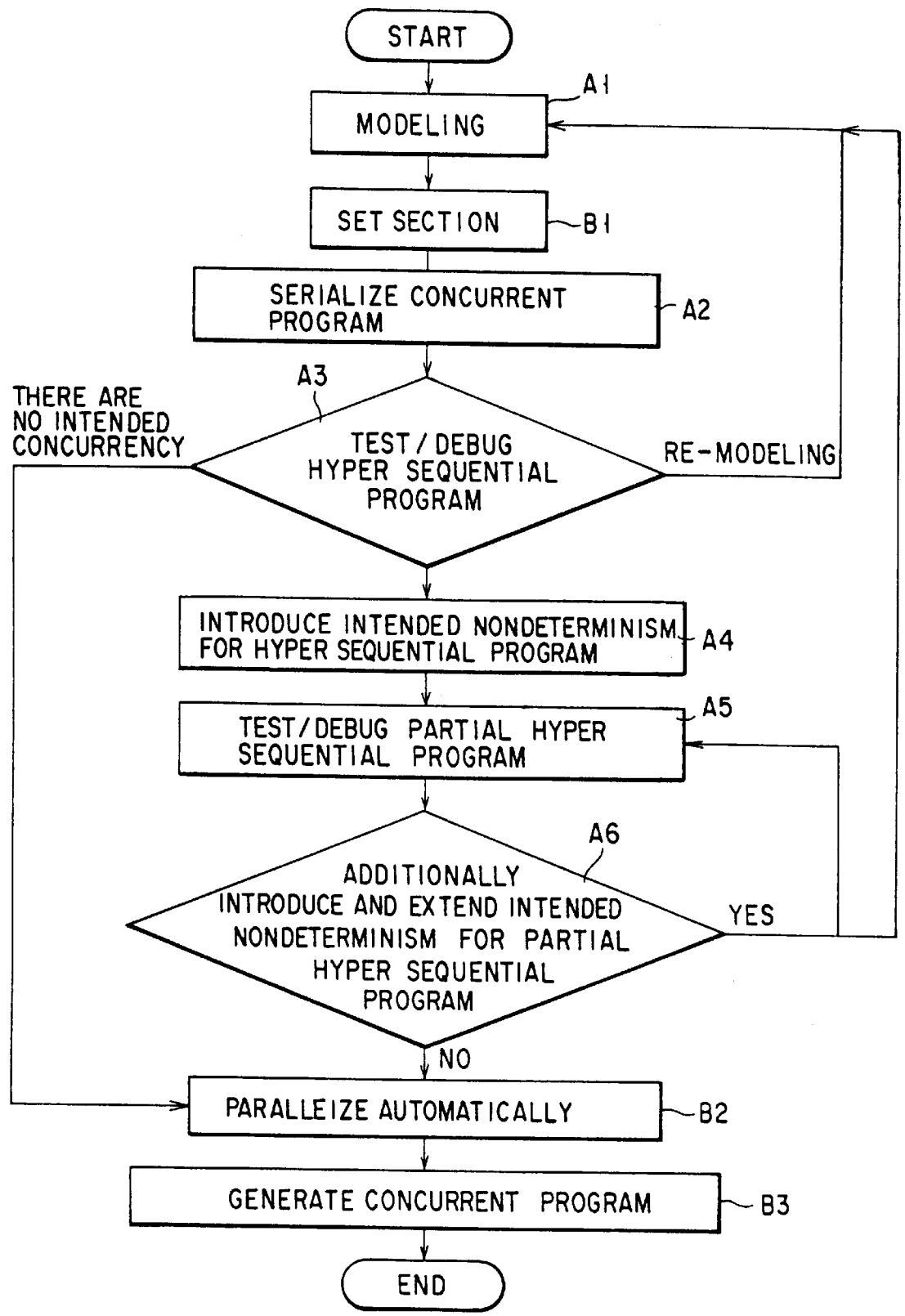
F I G. 10

```
process()                  DIVISIONAL POINT
{
    ─────────────────────────────────────
    s1 ;
    s2 ;                          SECTION 1
    s3 ;
    while (cond) {
        ─────────────────────────────────
        s4 ;
        s5 ;                      SECTION 2
        s6 ;
    } if (cond) {
        ─────────────────────────────────
        s7 ;                      SECTION 3
        s8 ;

}
    ─────────────────────────────────────
    s11 ;                         SECTION 4
    s12 ;
    ─────────────────────────────────────
    wait (Sem) ;              SYNCHRONIZATION
                              INSTRUCTION
    ─────────────────────────────────────
    s13 ;                         SECTION 5
    s14 ;

}
```

F I G. 11

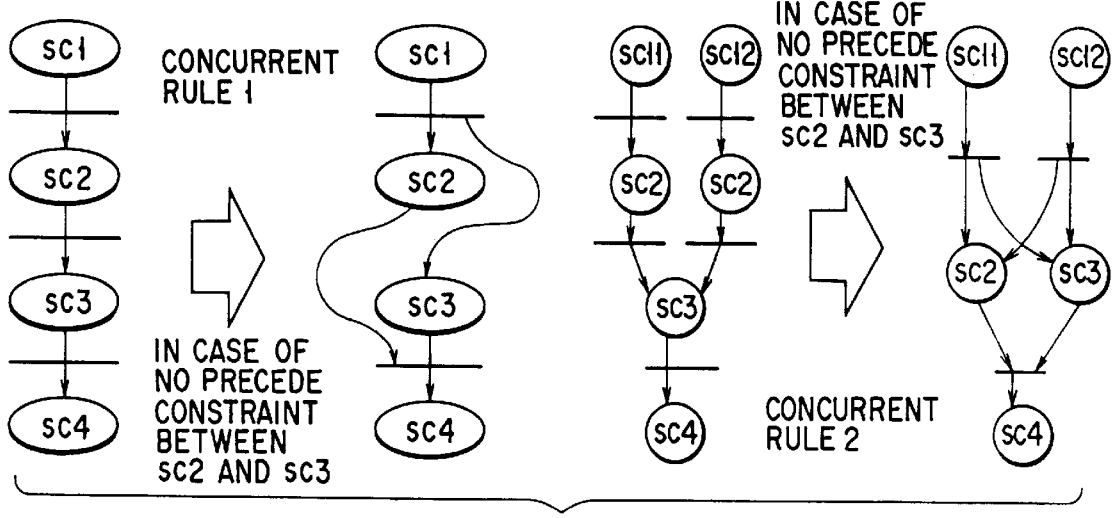

F I G. 13

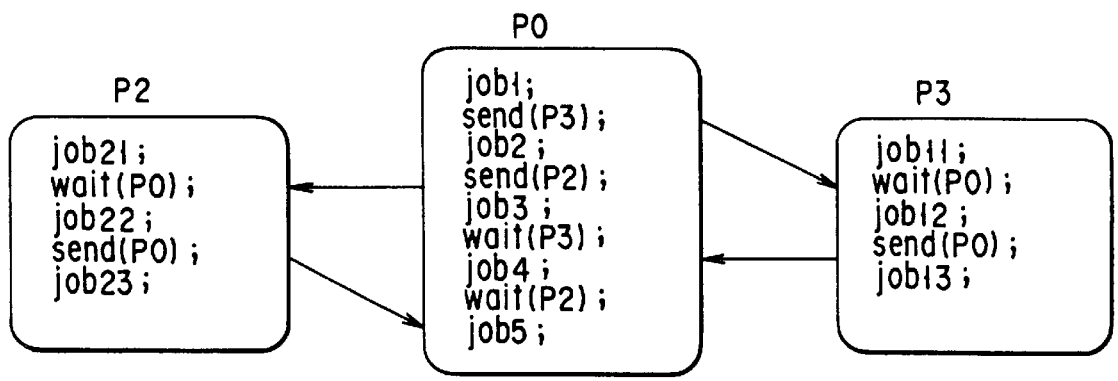
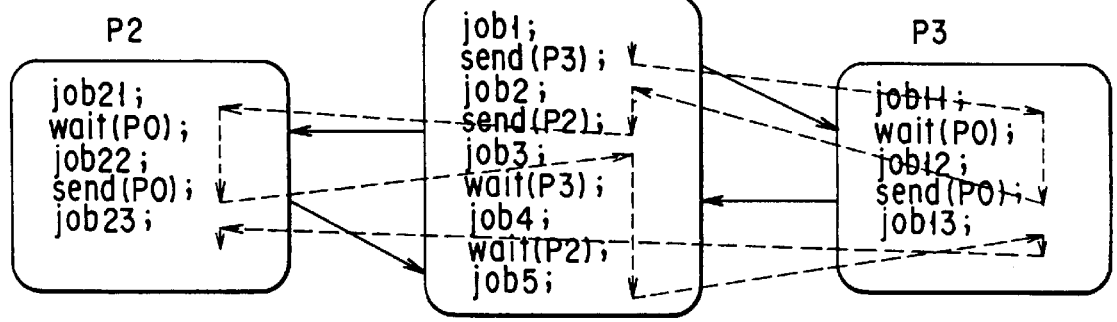
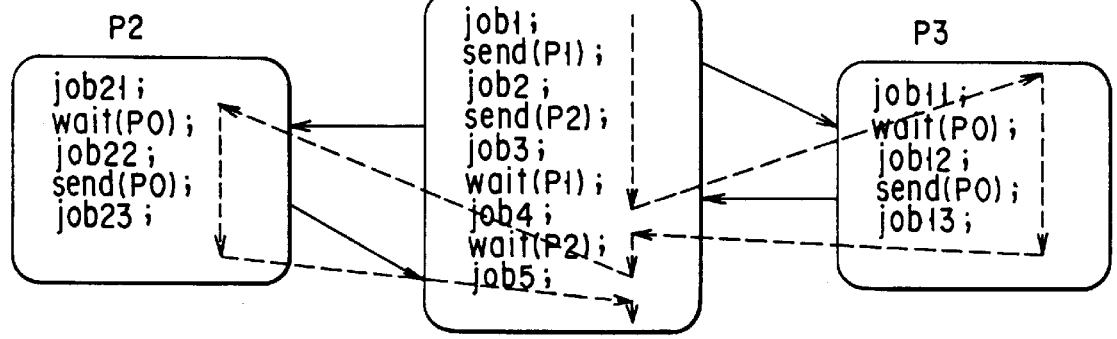
FIG. 12

FIG. 14
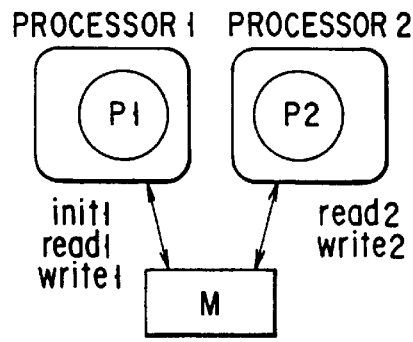
FIG. 15
```
P1:
begin
  init1;    /* INITIALIZE MEMORY M */
  read1;    /* READ DATA FROM MEMORY M */
  write1;   /* WRITE DATA INTO MEMORY M */
end
P2:
begin
  read2;    /* READ DATA FROM MEMORY M */
  write2;   /* WRITE DATA INTO MEMORY M */
end
```
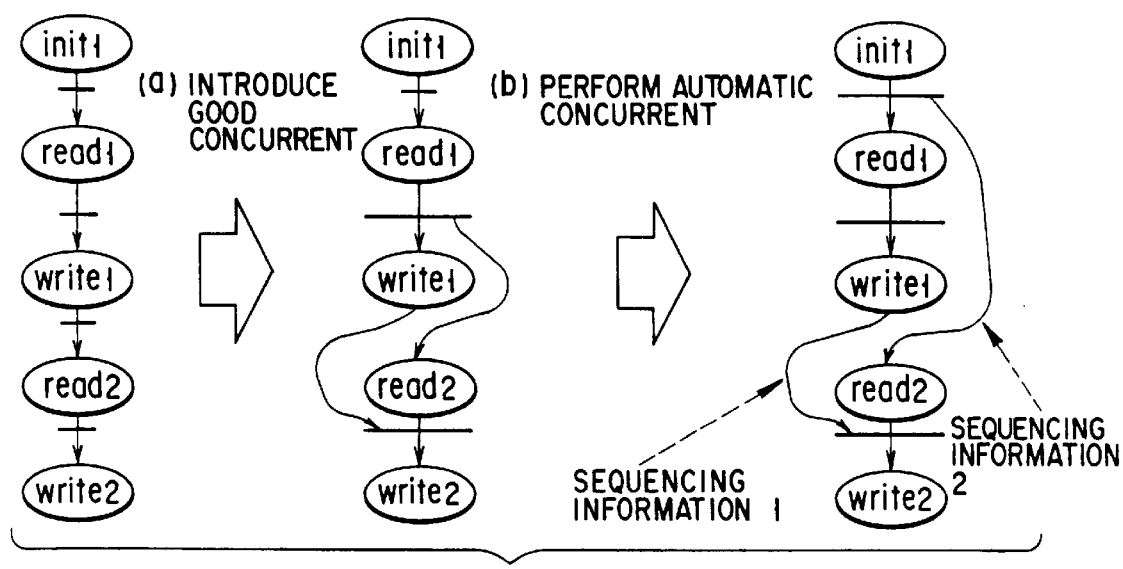
FIG. 17

| SECTION ID | SOURCE CODE |
|---|---|
| init1 | init1 |
| read1 | read1 |
| write1 | write1 |
| read2 | read2 |
| write2 | write2 |

F I G. 16A

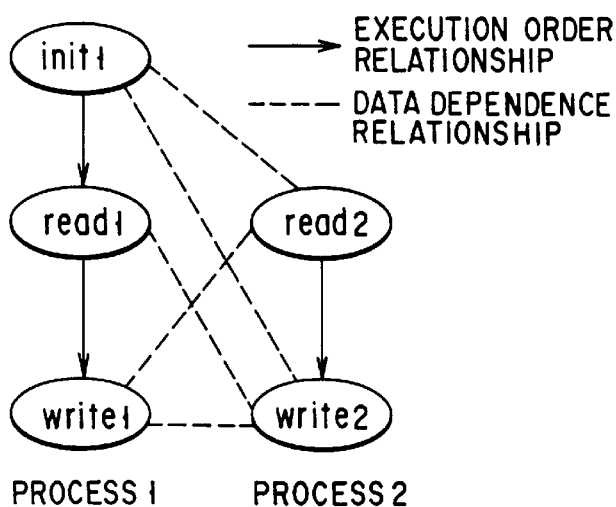

→ EXECUTION ORDER RELATIONSHIP
--- DATA DEPENDENCE RELATIONSHIP

PROCESS 1    PROCESS 2

F I G. 16B

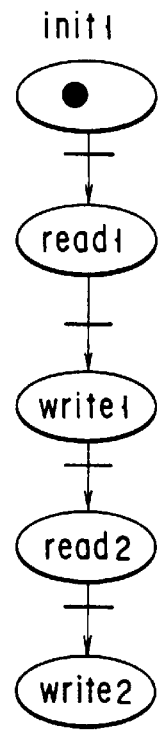

F I G. 16C

F I G. 18

```
P1:
begin
  init1;      /* INITIALIZE MEMORY M
  send(1);    /* SEMAPHORE
  read1;      /* READ DATA FROM MEMORY M */
  write1;     /* WRITE DATA INTO */
              /*  MEMORY M
  send(2);    /* SEMAPHORE
end P2:
begin
  wait(1);    /* SEMAPHORE
  read2;      /* READ DATA FROM MEMORY M */
  wait(2);    /* SEMAPHORE
  write2;     /* WRITE DATA INTO */
              /*  MEMORY M
end
```

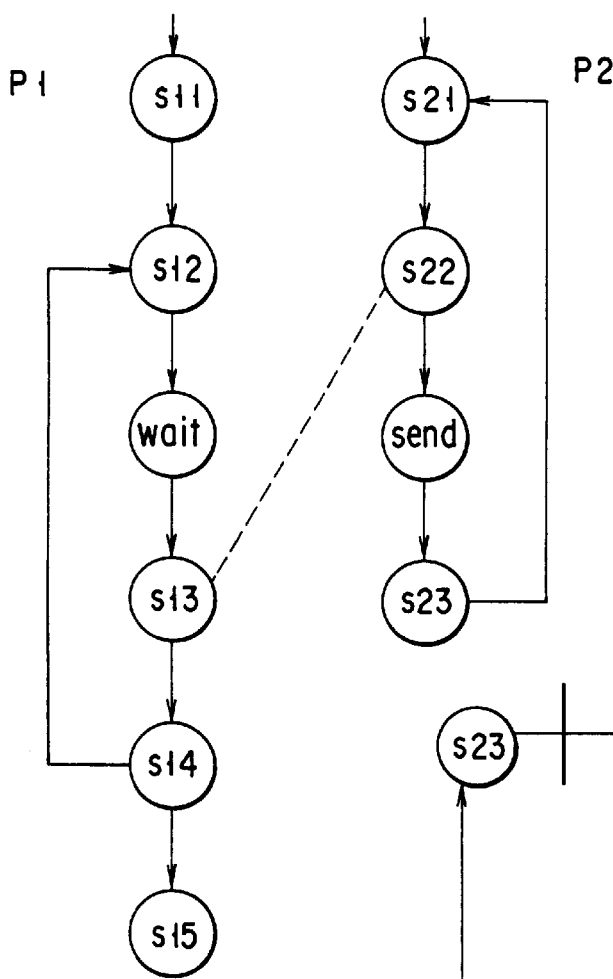
F I G. 19
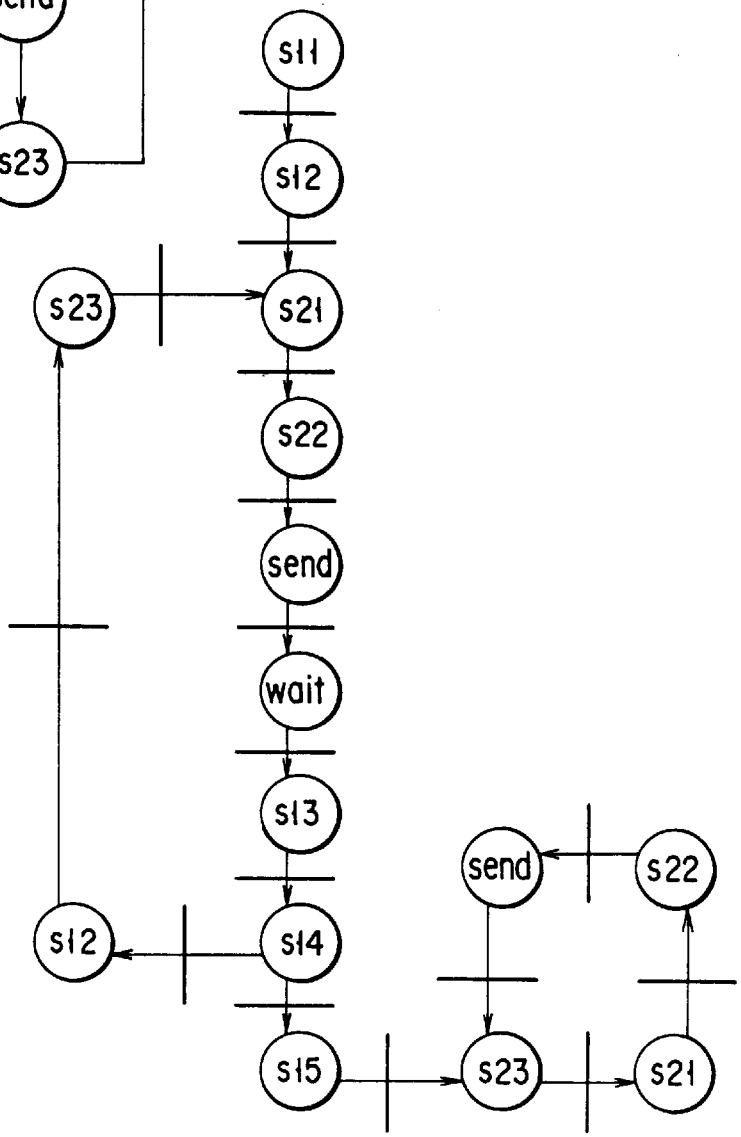
F I G. 20

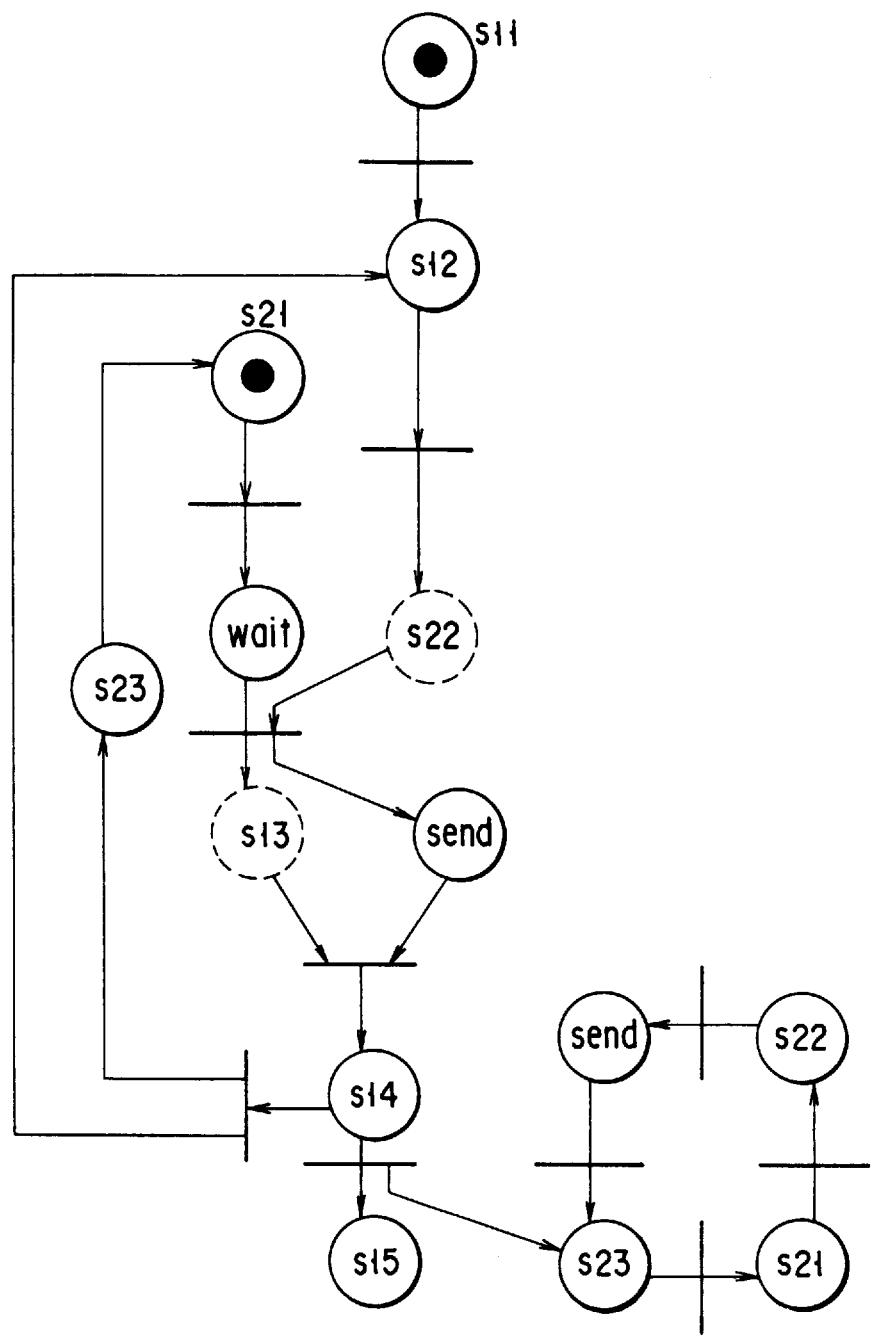
F I G. 21

```
CP = P1 | P2

P1 :

begin job 11 ; / * EXECUTE  JOB 11 */ job 12 ; / * EXECUTE  JOB 12 */ end

P2 ;

begin job 21 ; / * EXECUTE  JOB 21 */ job 22 ; / * EXECUTE  JOB 22 */ end
```

F I G. 24

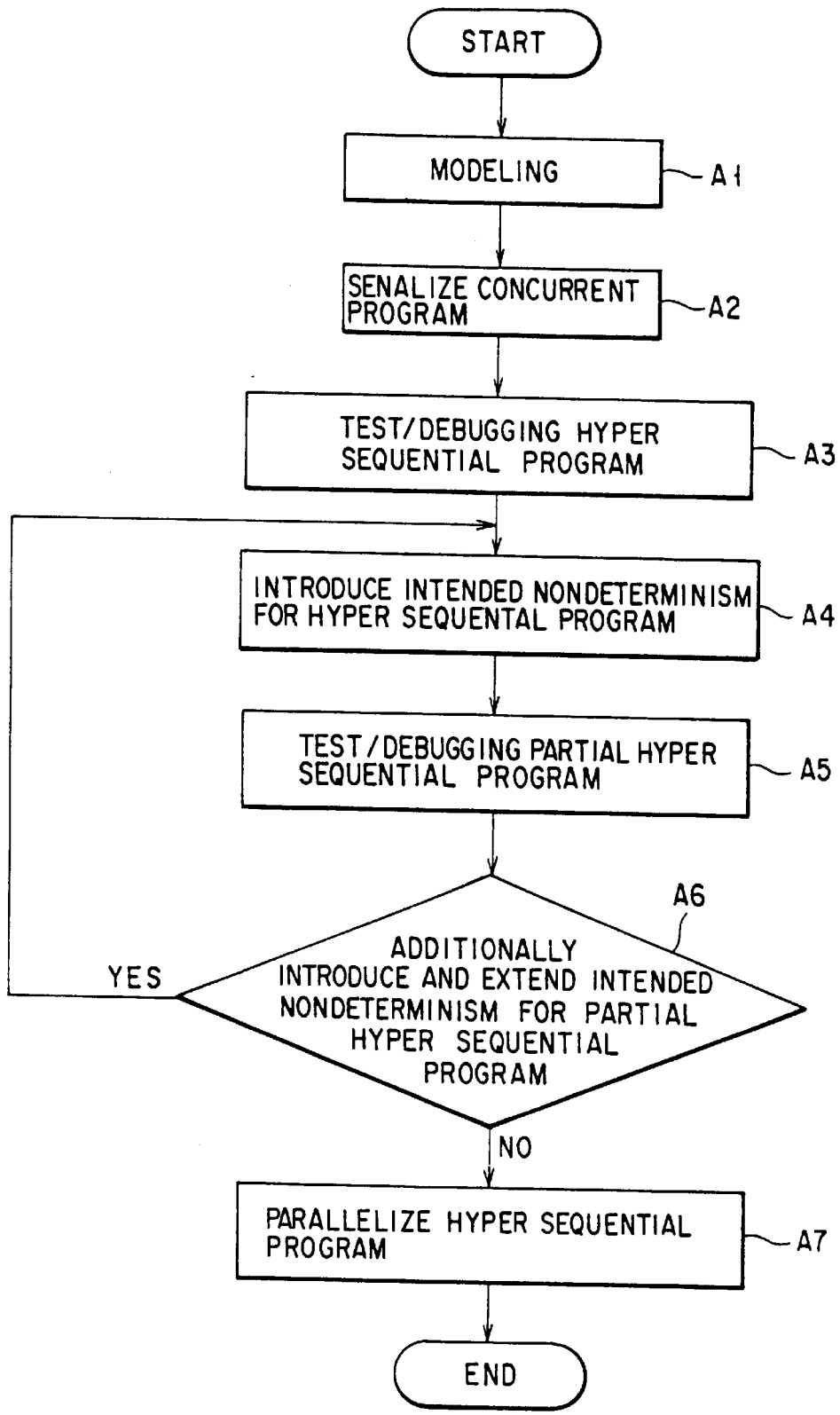
F I G. 26

```
EXAMPLE OF CONCURRENT PROGRAM main ( )
 (
procedure A;
procedure B;
par (
     seq (
     procedure C;
     procedure G;
     procedure I;
     )
     seq (
          procedure D;
          par (
               procedure E;
               procedure F;
               )
          procedure H;
          procedure J;
          )
     )
procedure K;
 )
```

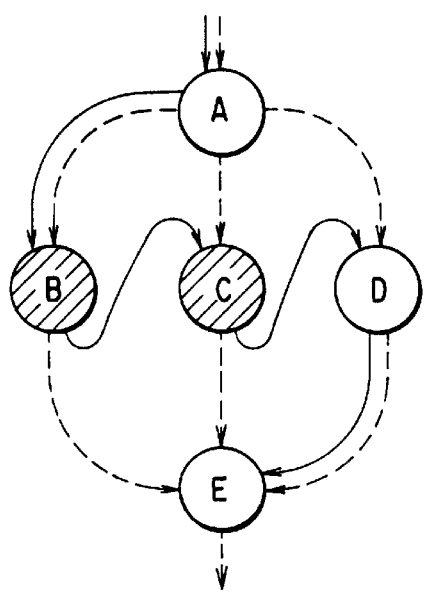
F I G. 37
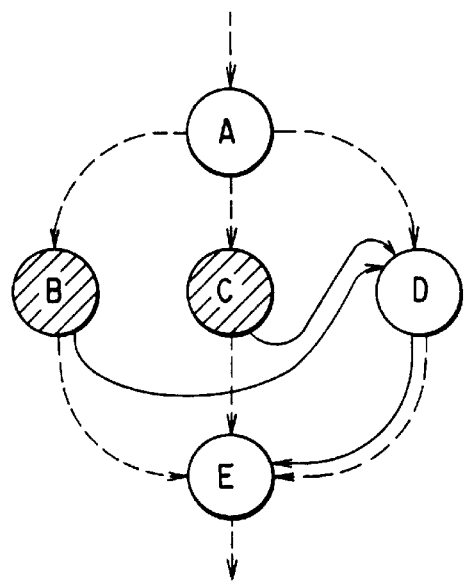
F I G. 38
```
main()
{
procedure P1;
procedure P2;
seq {
      procedure P3;
      par {
           procedure P4;
           procedure P5;
      }
}
seq {
      procedure P6;
      par {
           procedure P7;
           procedure P8;
      }
      procedure P9;
}
procedure P10;
procedure P11;
}
```
F I G. 40
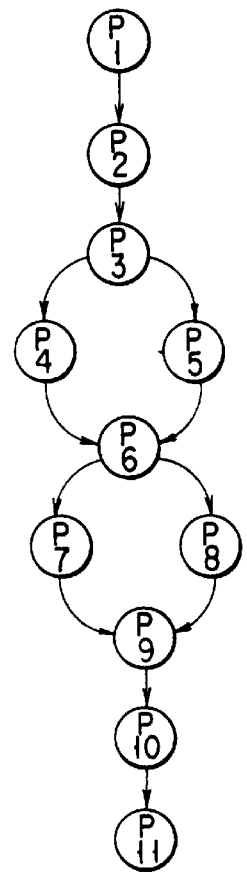
F I G. 41

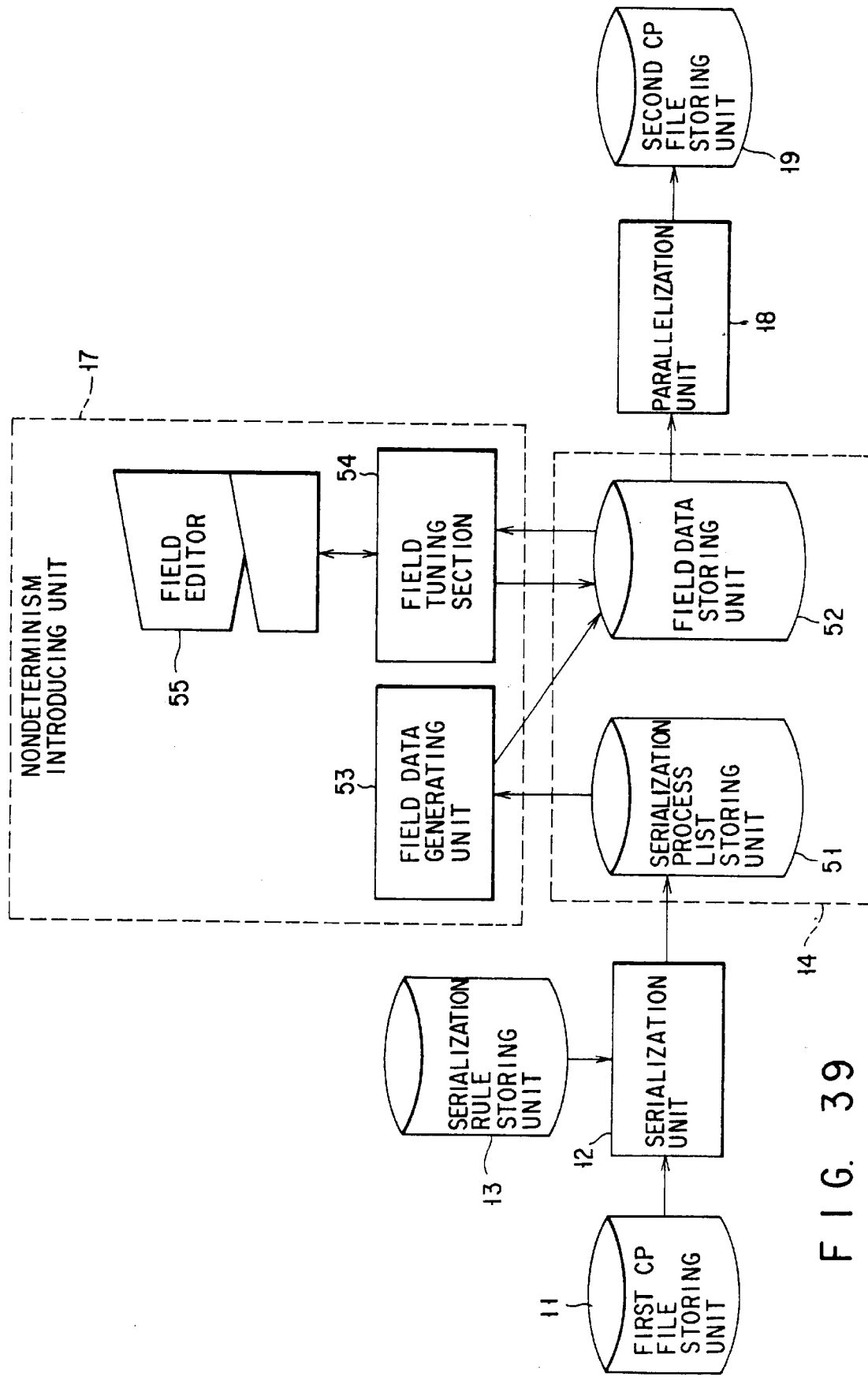
F I G. 39

```
main ()
 {
 procedure  P1;
 procedure  P2;
 procedure  P3;
 procedure  P4;
 procedure  P5;
 procedure  P6;
 procedure  P7;
 procedure  P8;
 procedure  P9;
 procedure  P10;
 procedure  P11;
 }
```
F I G. 42
F I G. 43
```
constraint  (before P_x1 P_x2 )
            (before P_y1 P_y2 )
transition P_z1
```
} PRESENT ONLY THIS PART TO USER
name: A(i)
next: A(j) ····
pre:  A(k) ····
F I G. 45

FIG. 46

SEQUENCED PROCESS

P1 → P2 → P3 → P4 → P5 → P6 → P7 → P8 → P9 → P10 → P11

FIELDING ↓ (between P5 and P6)

| Start | | | | | | | | | | | End |
|---|---|---|---|---|---|---|---|---|---|---|---|
| | before P1 P2 / transition P2 | before P2 P3 / transition P3 | before P3 P4 / transition P4 | before P4 P5 / transition P5 | before P5 P6 / transition P6 | before P6 P7 / transition P7 | before P7 P8 / transition P8 | before P8 P9 / transition P9 | before P9 P10 / transition P10 | before P10 P11 / transition P11 | |
| A(1) | A(2) | A(3) | A(4) | A(5) | A(6) | A(7) | A(8) | A(9) | A(10) | A(11) | A(12) |
| nextA(2) | nextA(3) preA(1) | nextA(4) preA(2) | nextA(5) preA(3) | nextA(6) preA(4) | nextA(7) preA(5) | nextA(8) preA(6) | nextA(9) preA(7) | nextA(10) preA(8) | nextA(11) preA(9) | nextA(12) preA(10) | preA(11) |

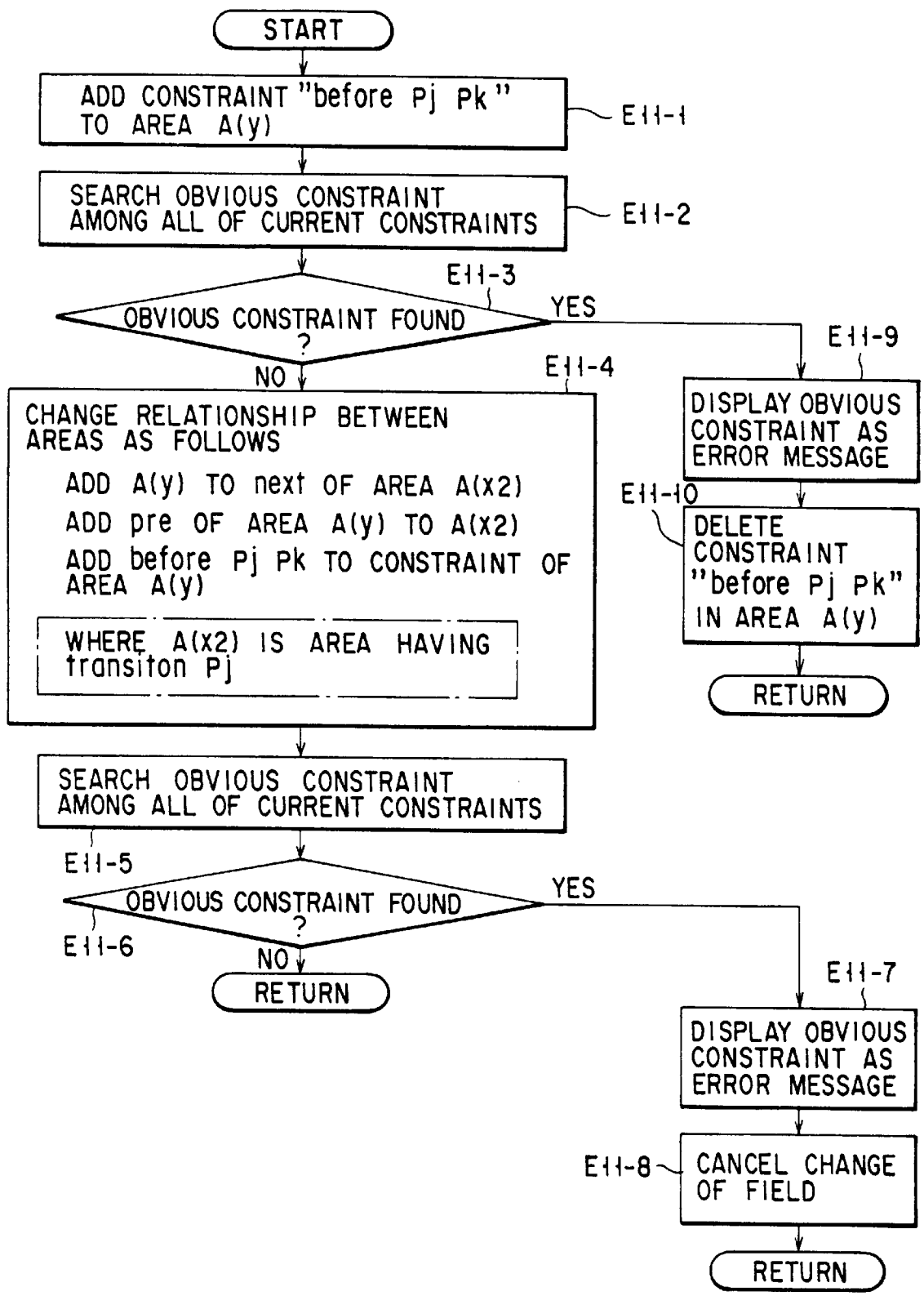
F I G. 50

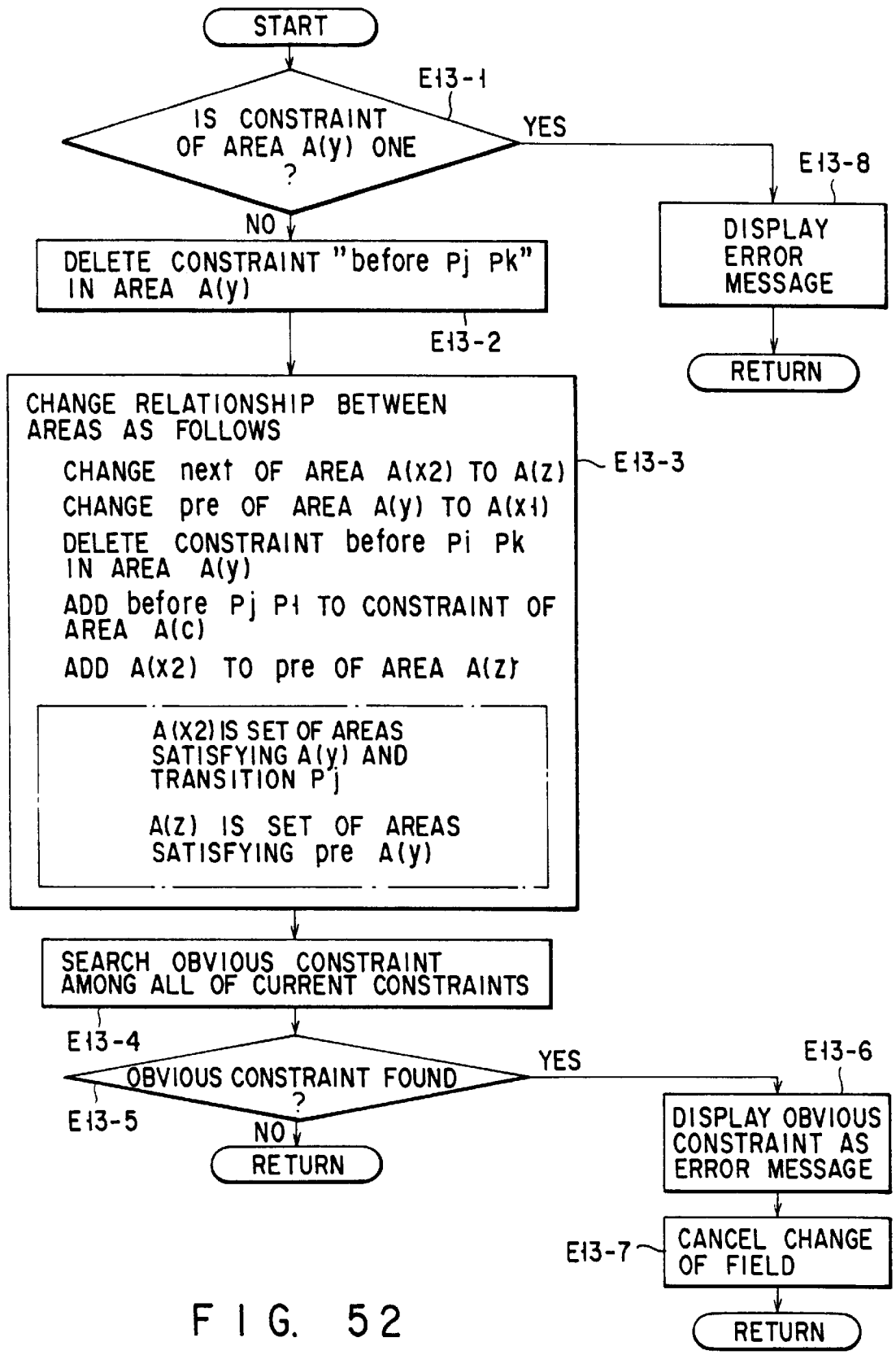
F I G. 52

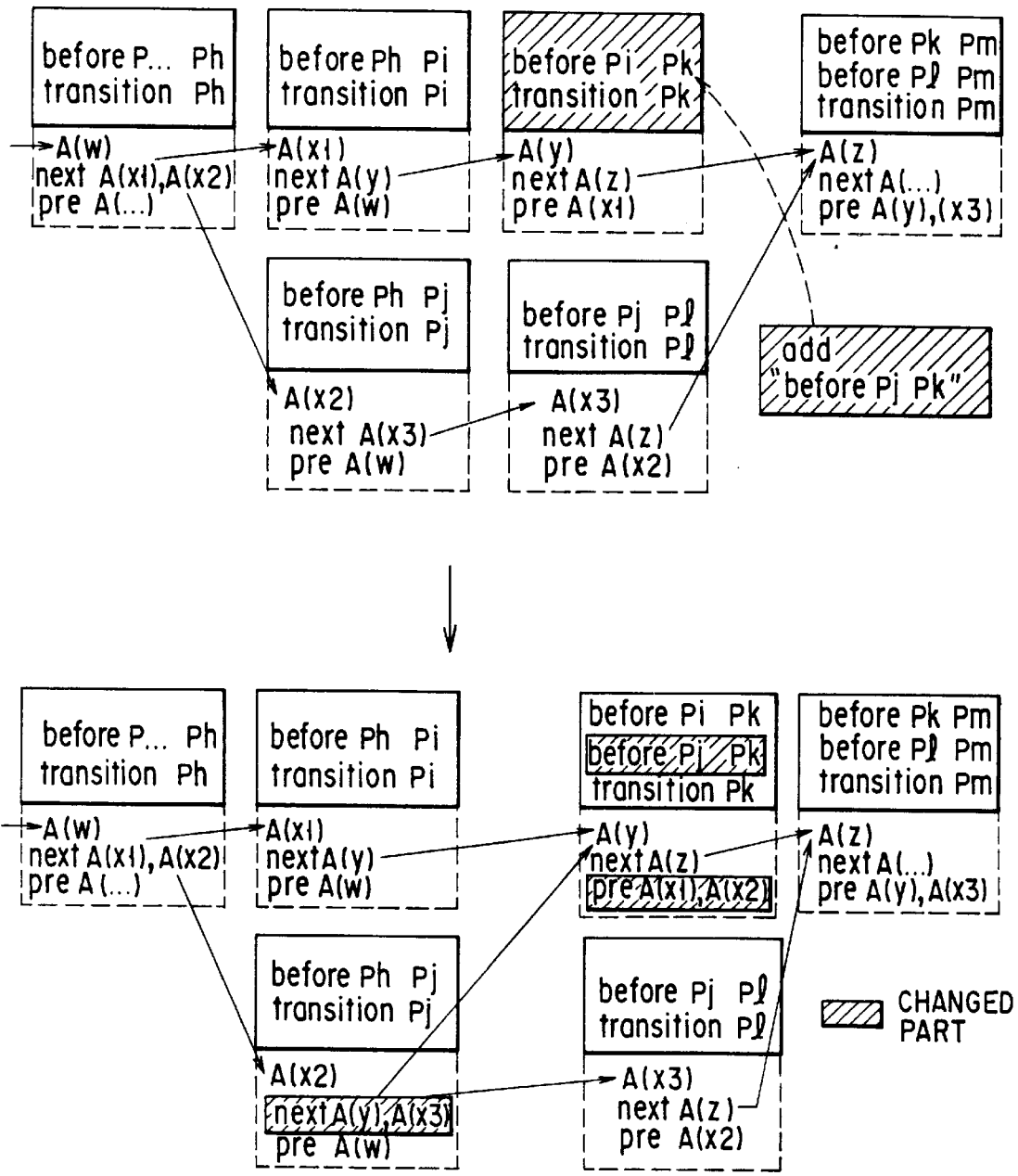
F I G. 53

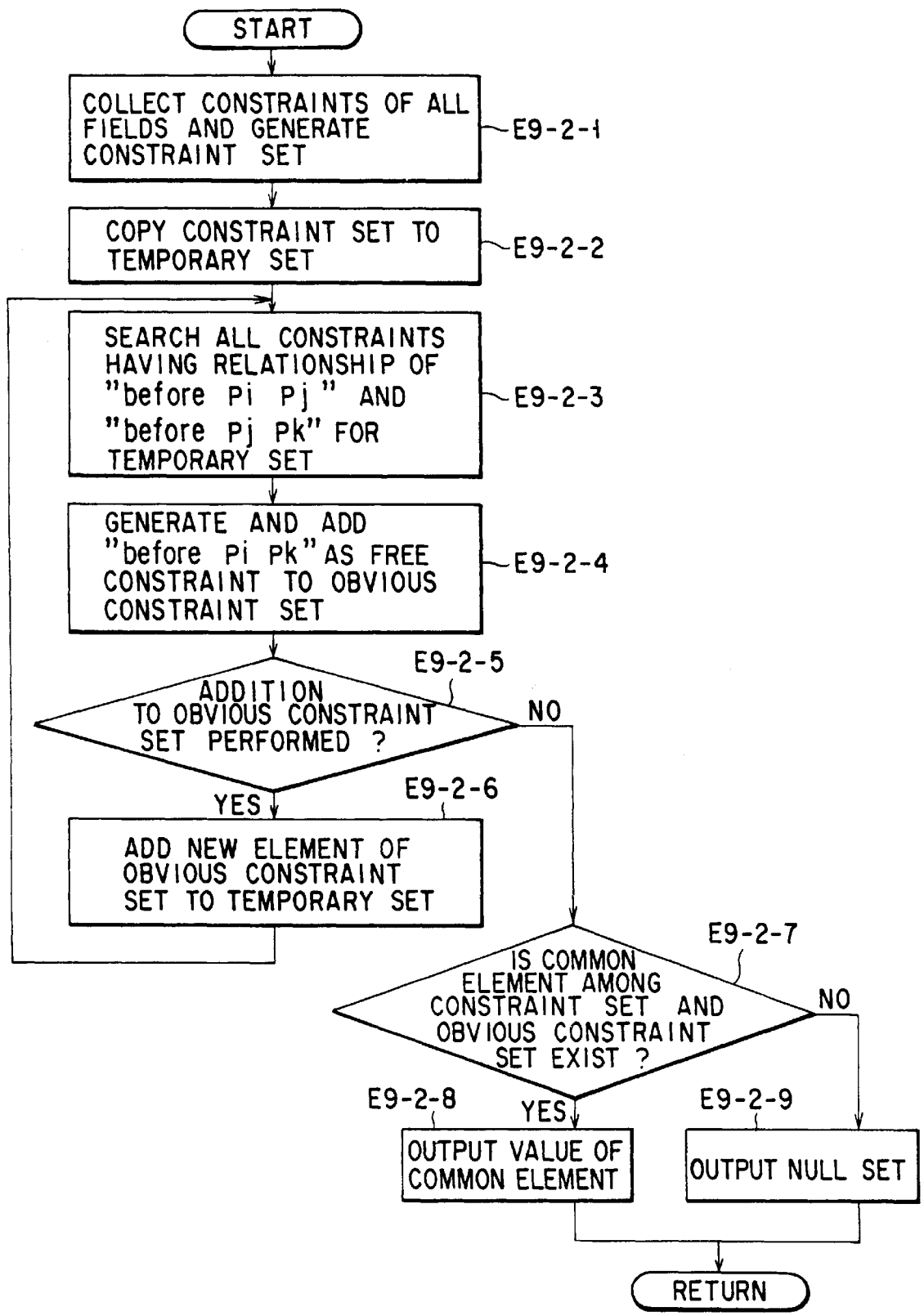
F I G. 54

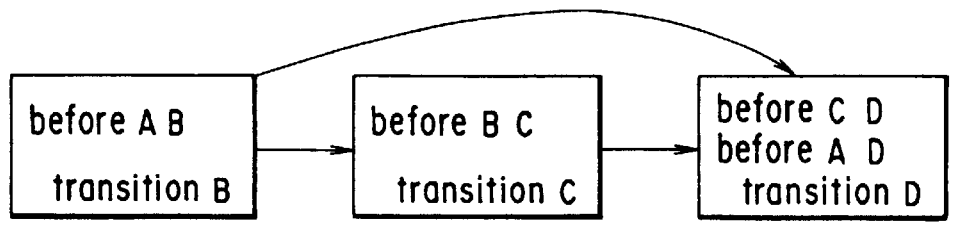
F I G. 55
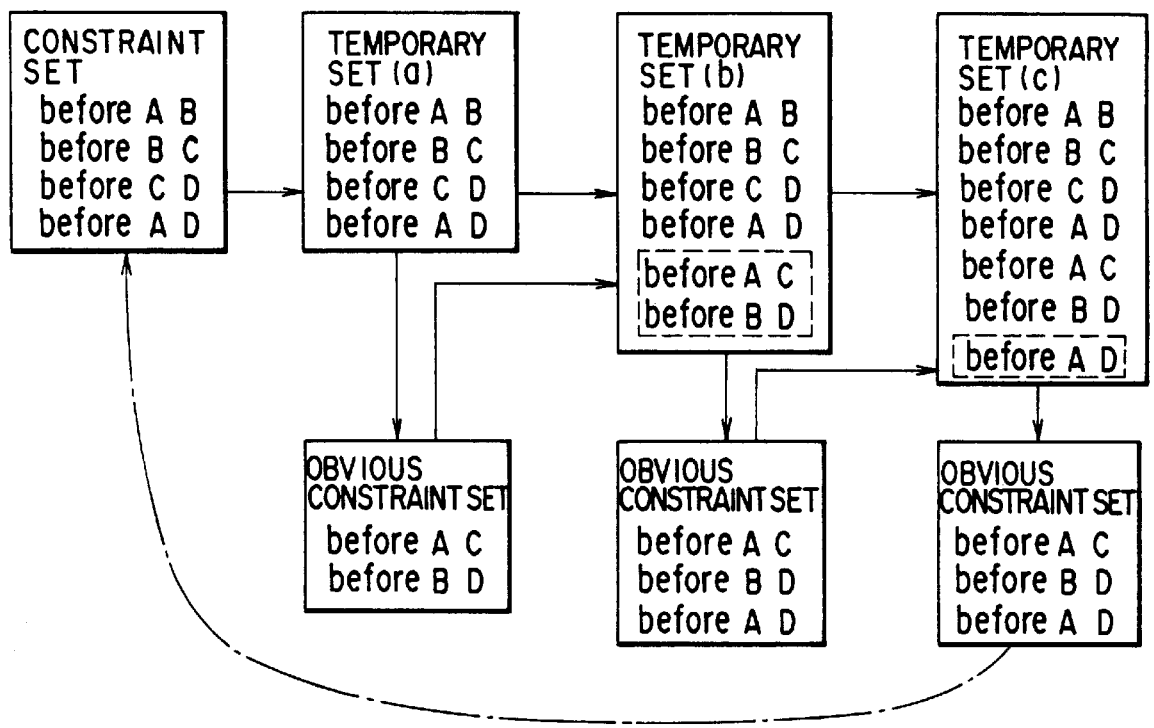
F I G. 56

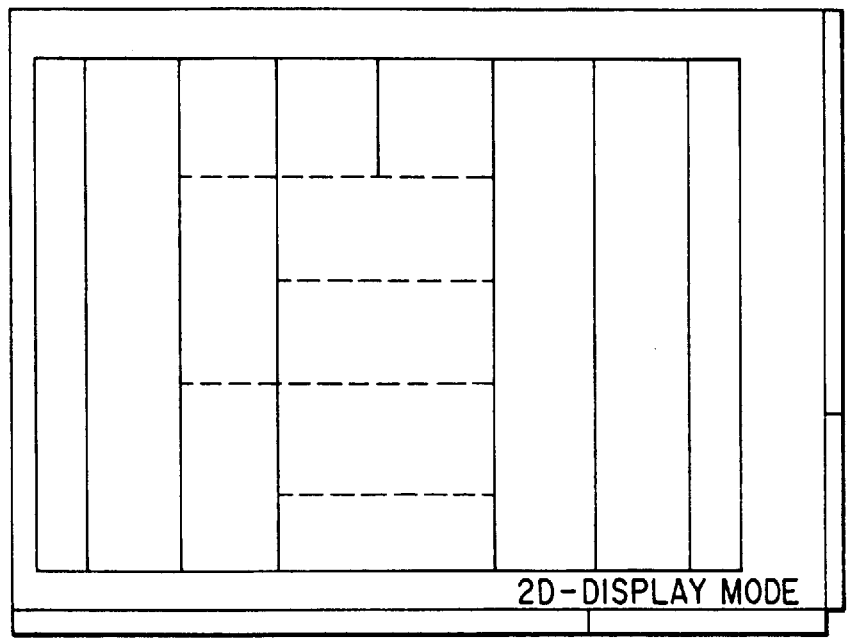
F I G. 58
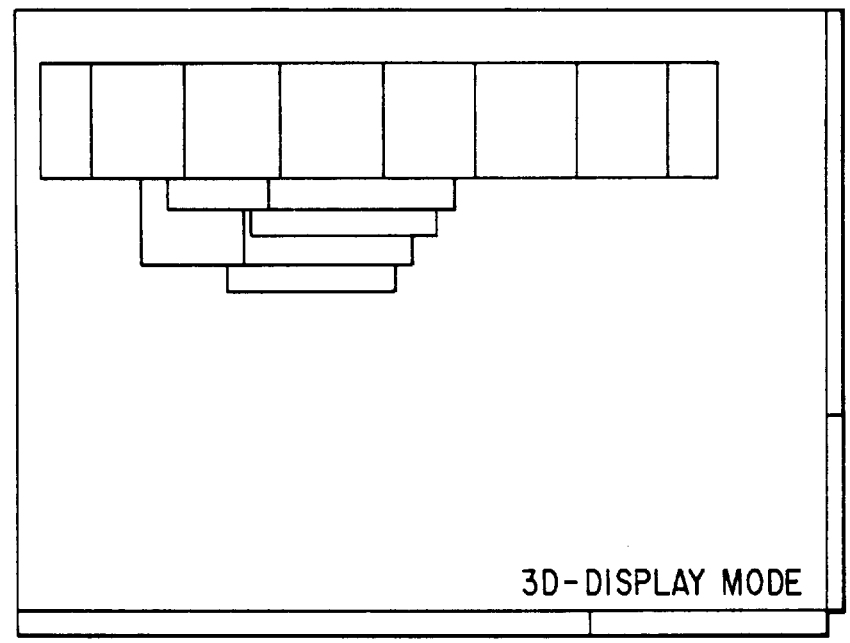
F I G. 59

F I G. 60

F I G. 61

F I G. 62

F I G. 63

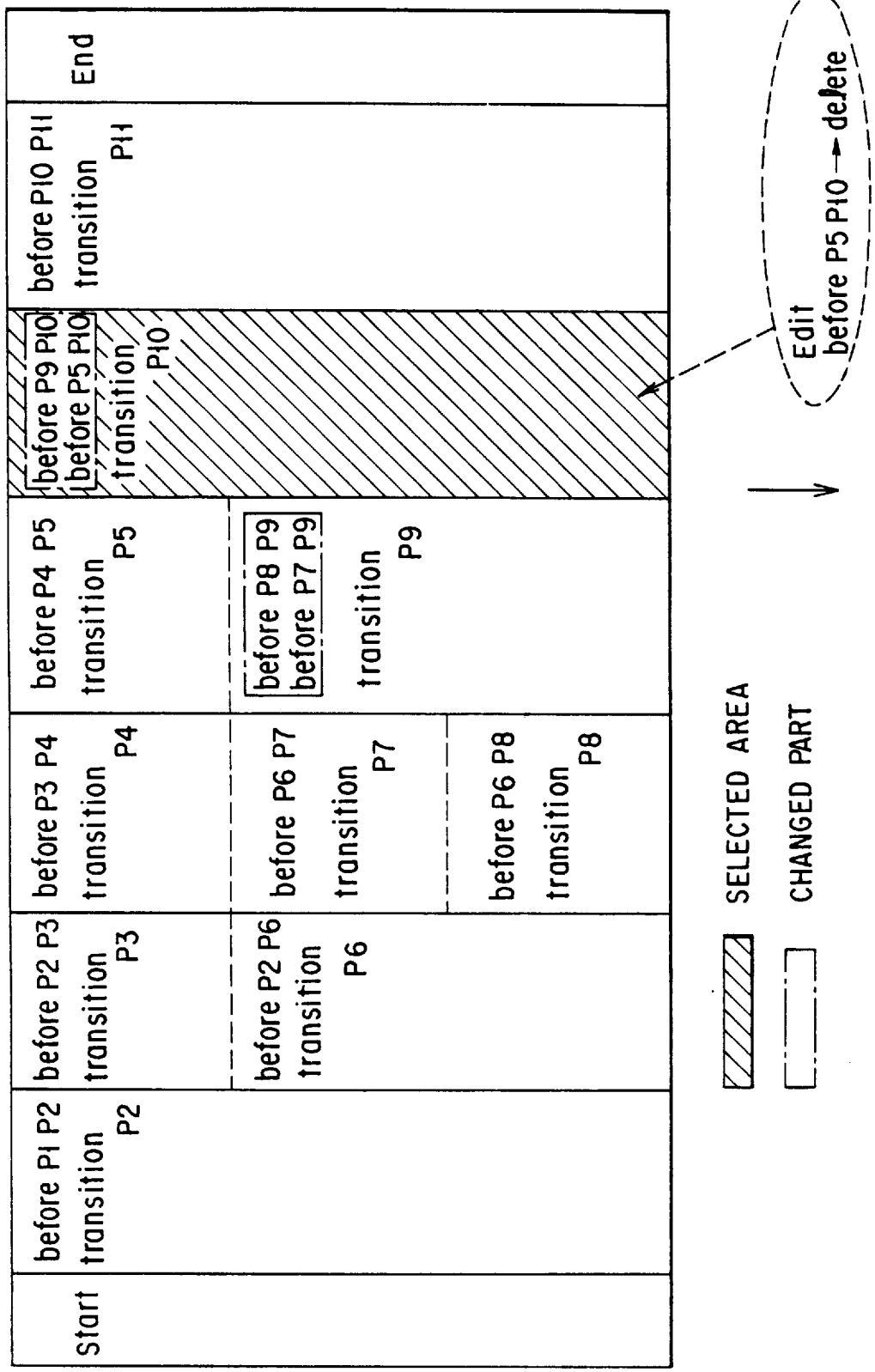
F I G. 66

```
main ( )
{
procedure P1;
procedure P2;
par (
        seq (
      procedure P3;
      procedure P4;
      procedure P5;
      )
     seq (
        procedure P6;
        par (
            procedure P7;
            procedure P8;
            )
        procedure P9;
        procedure P10;
        )
    )
procedure P11;
}
```

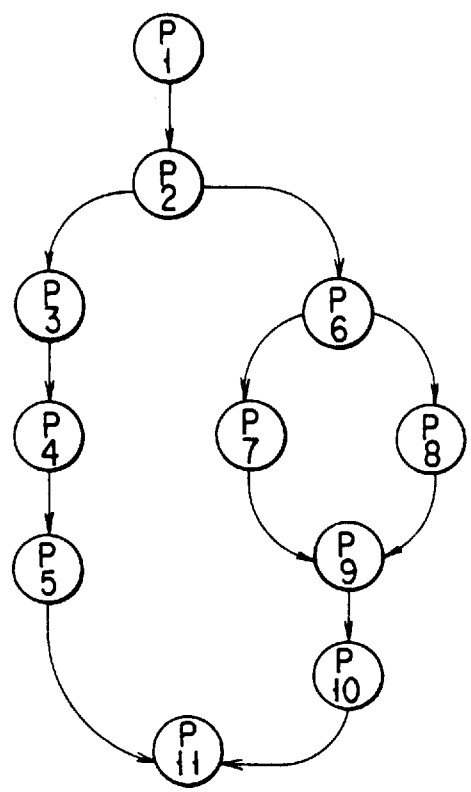
F I G. 70

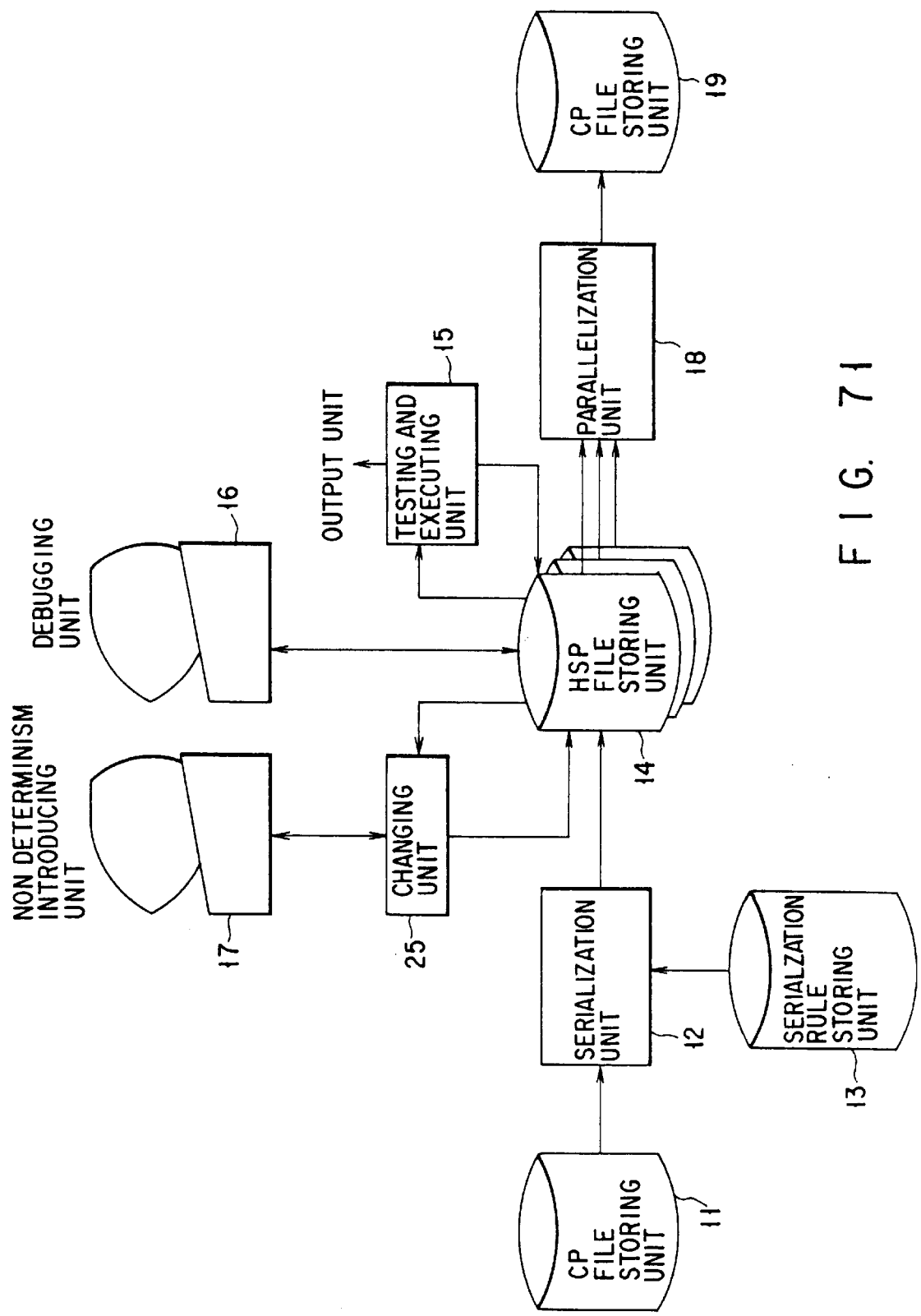
F I G. 71

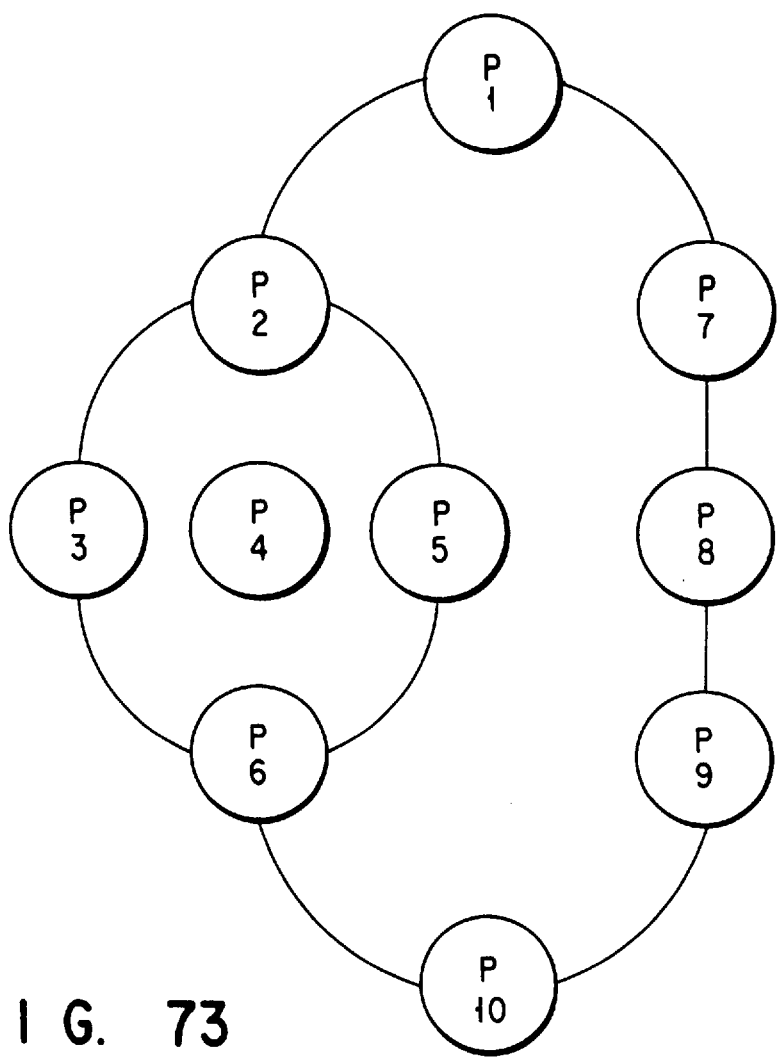
F I G. 73
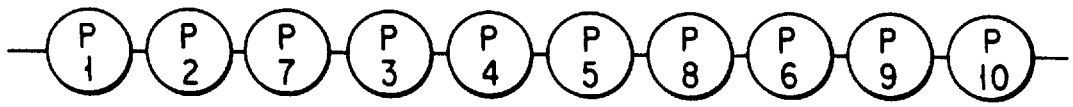
F I G. 74

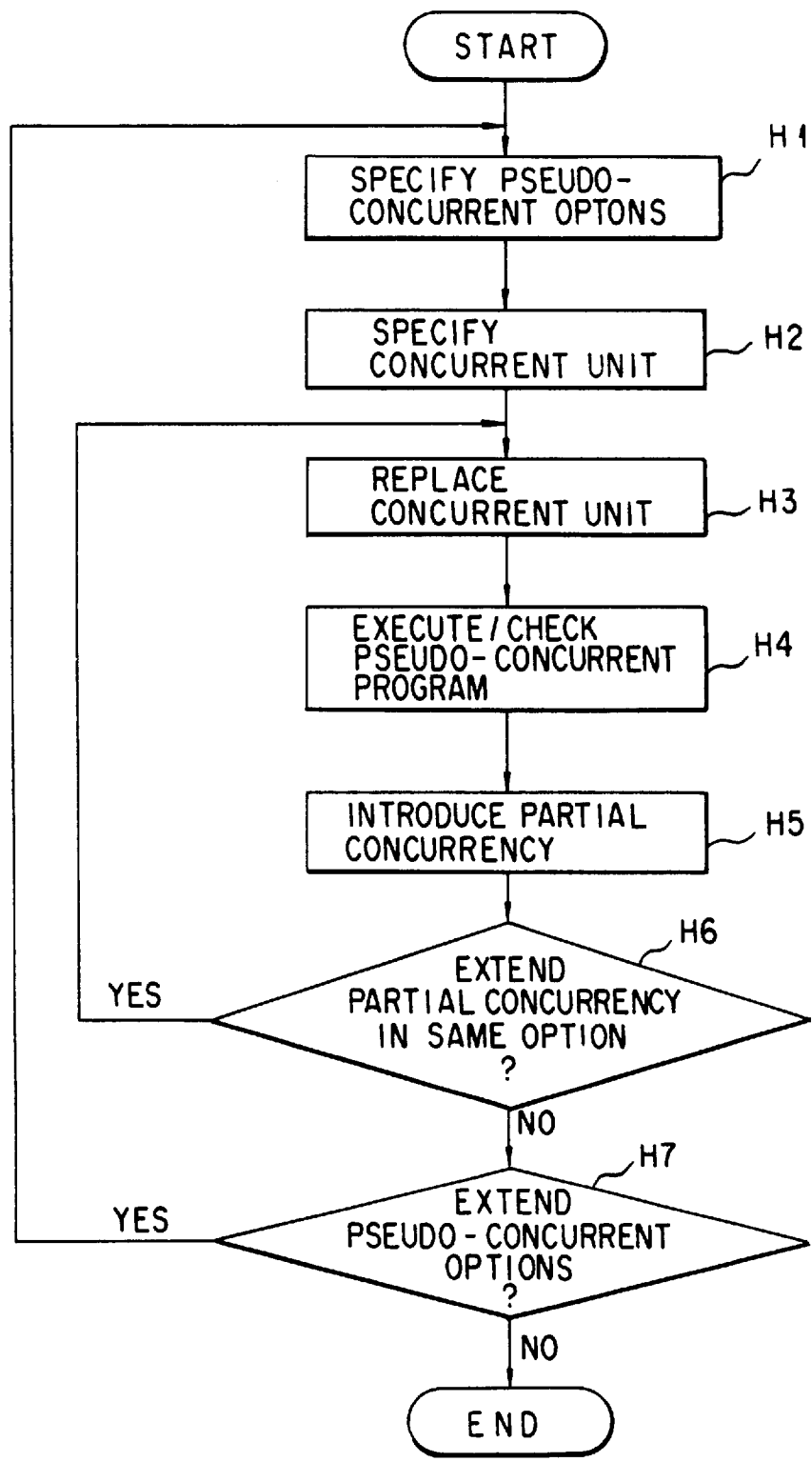
F I G. 75

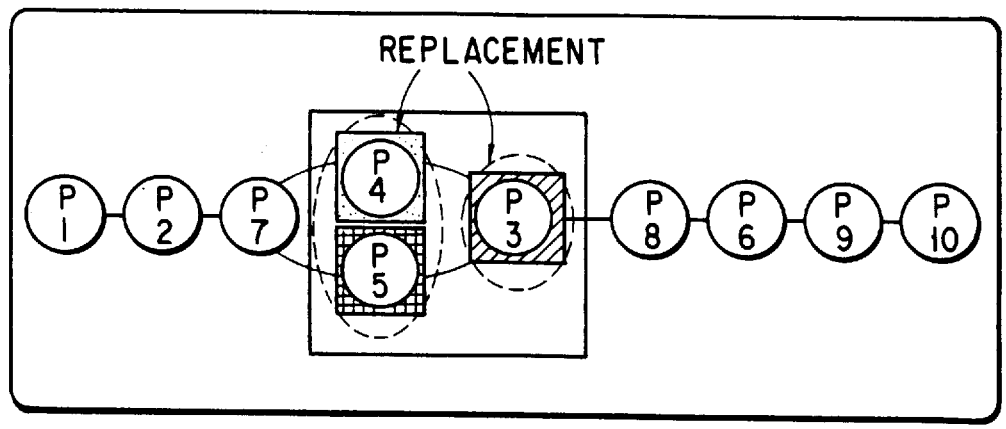
F I G. 77A
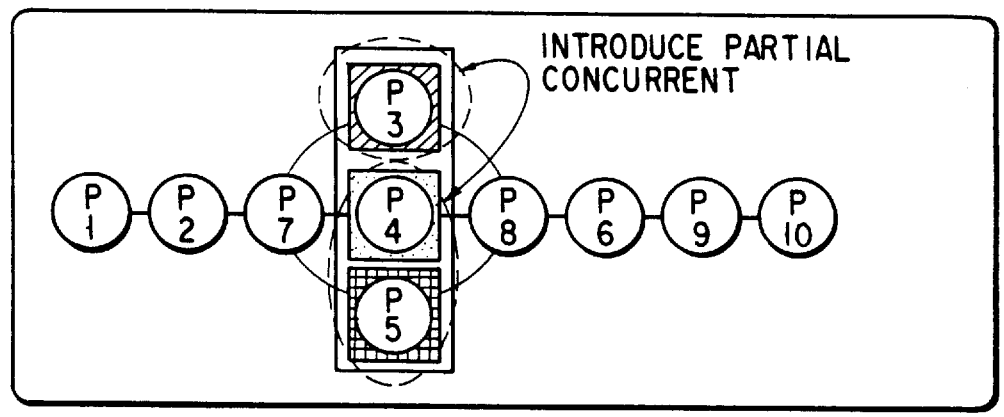
F I G. 77B

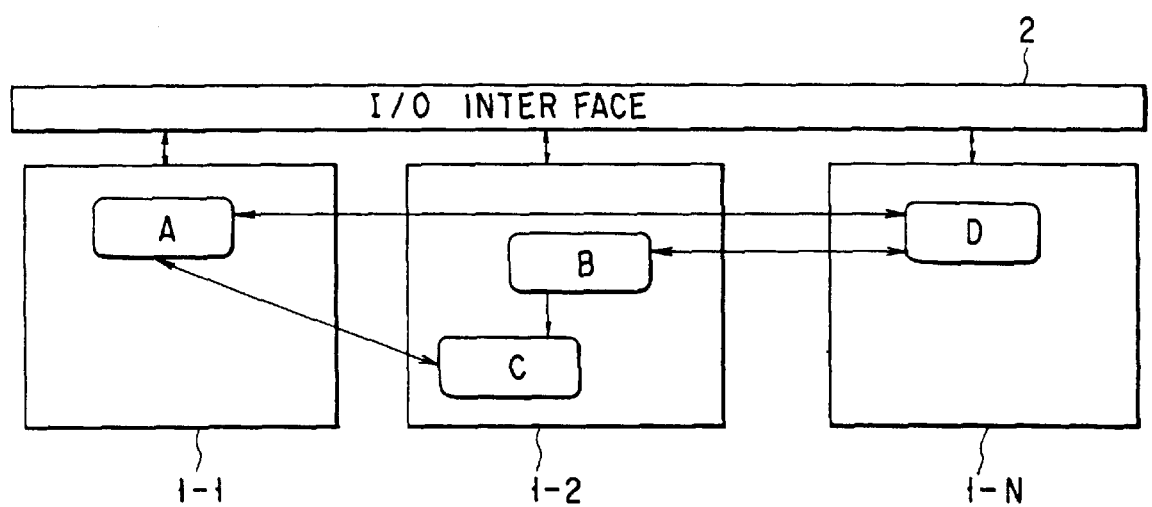
F I G. 80

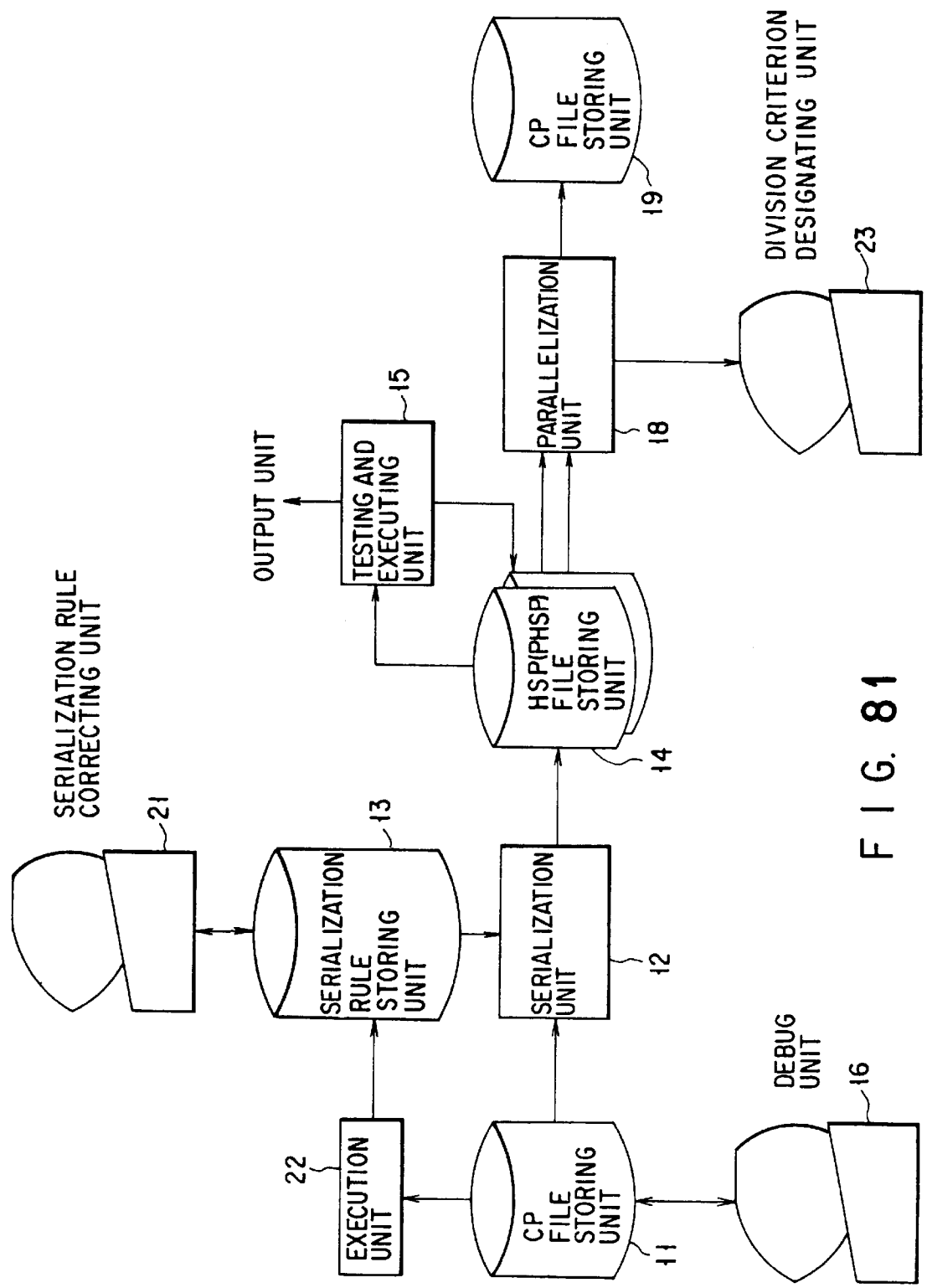
F I G. 81

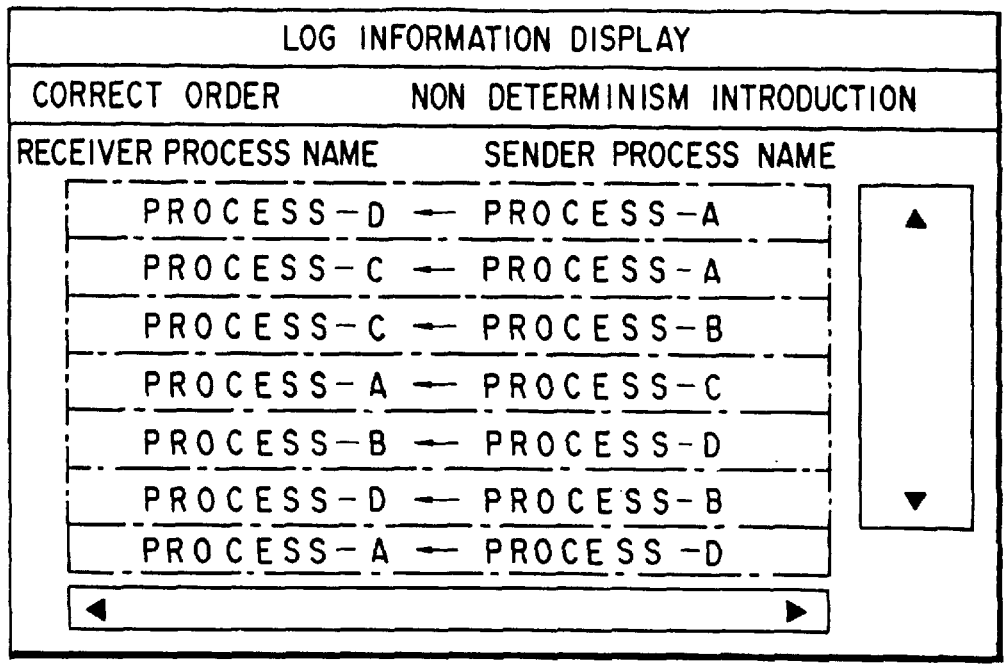
F I G. 83
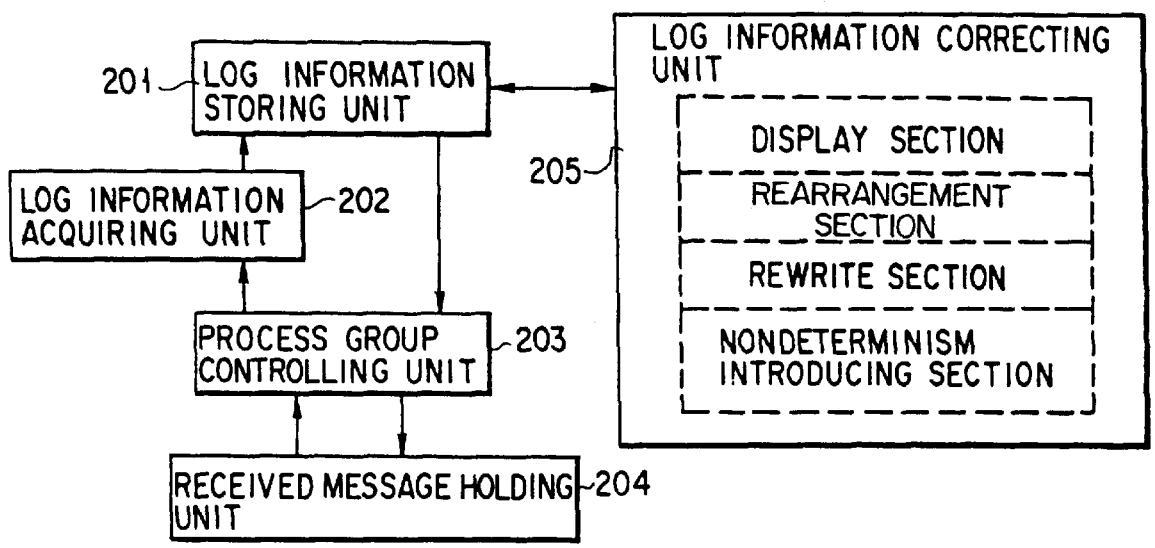
F I G. 84

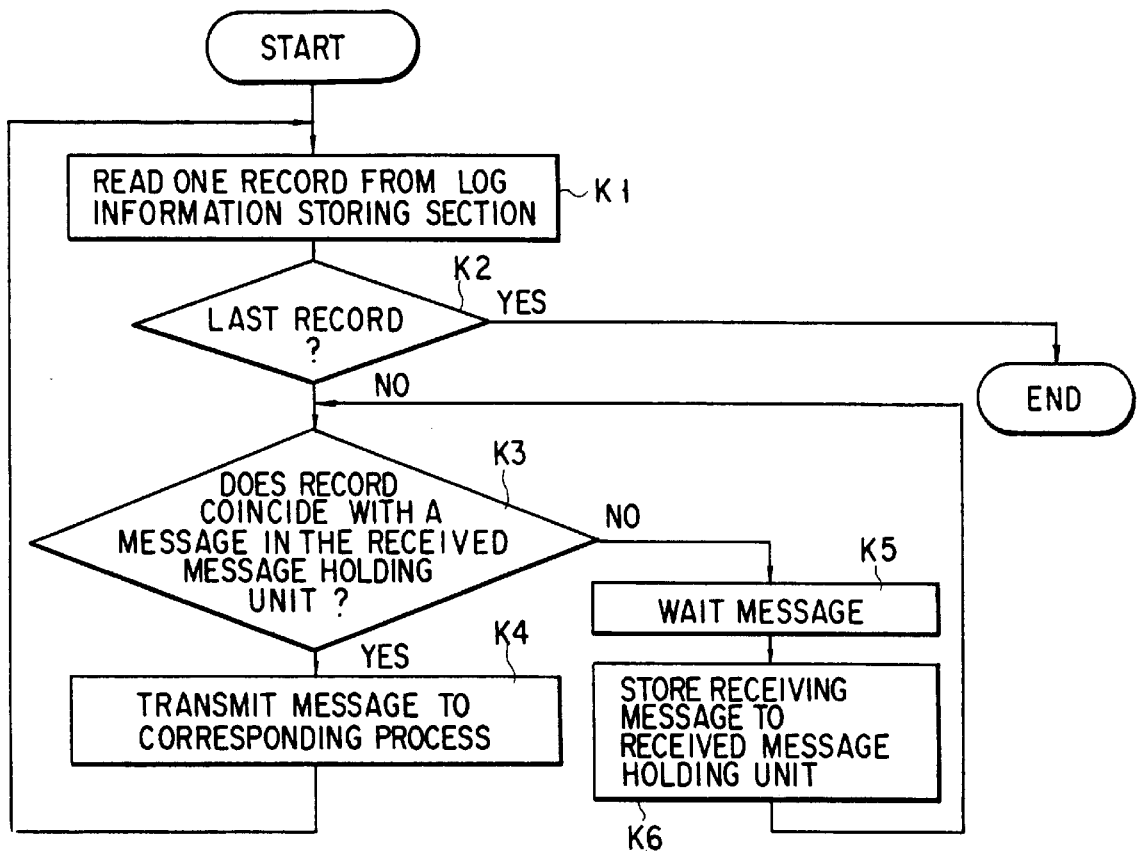
F I G. 88
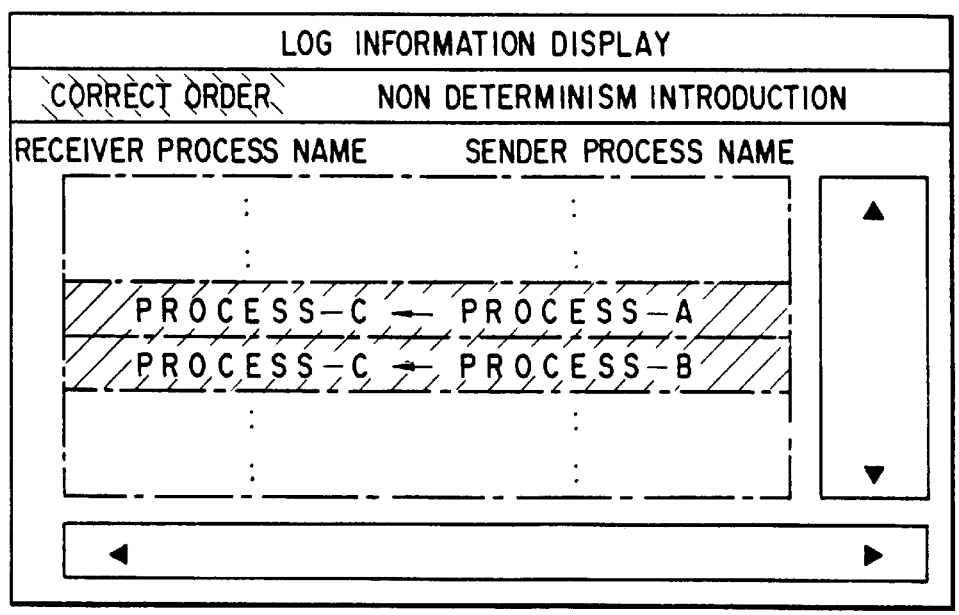
F I G. 89

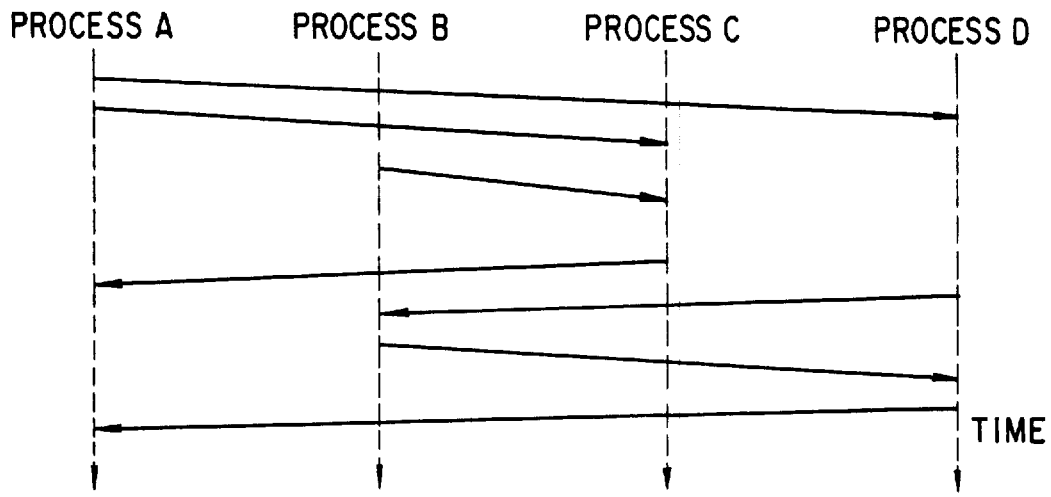
F I G. 94
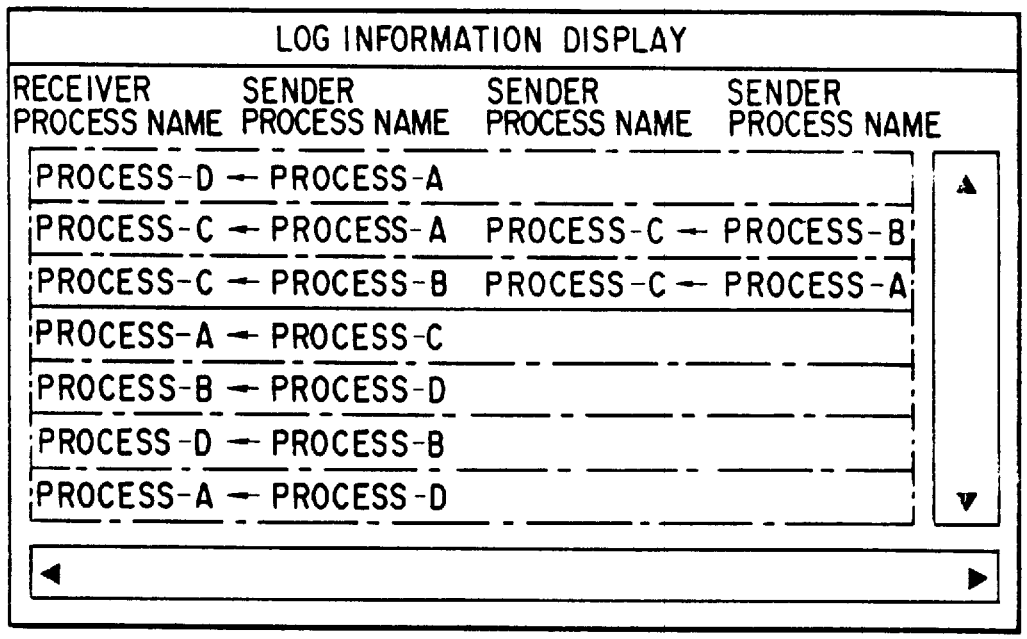
F I G. 95

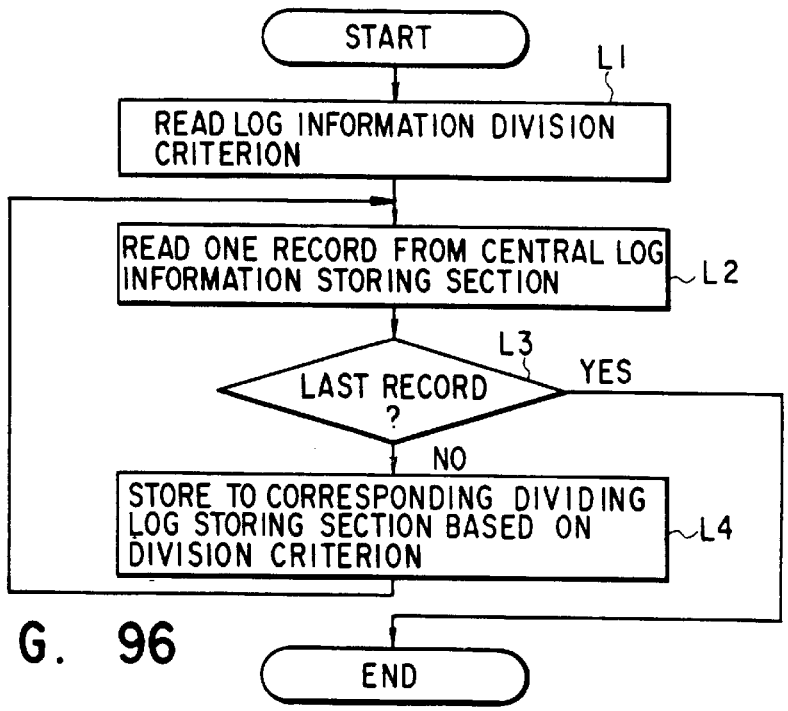
F I G. 96
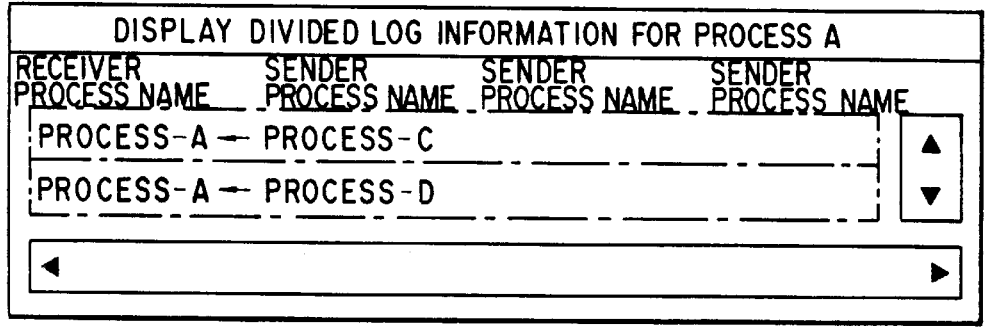
F I G. 97A
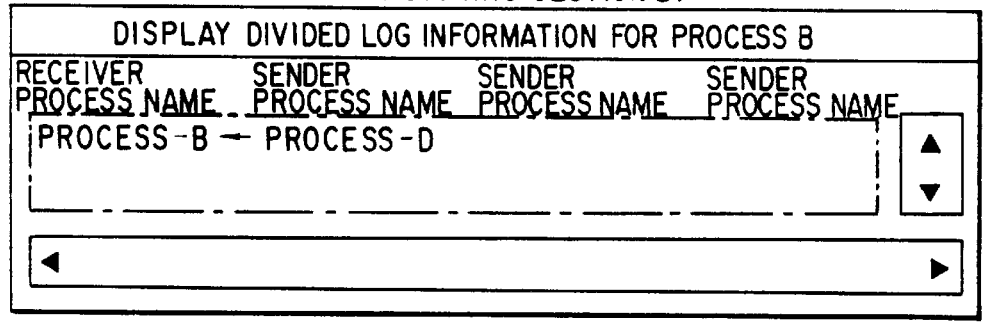
F I G. 97B

DIVIDED LOG INFORMATION FOR PROCESS C
(DIVIDED LOG INFORMATION STORING SECTION C)
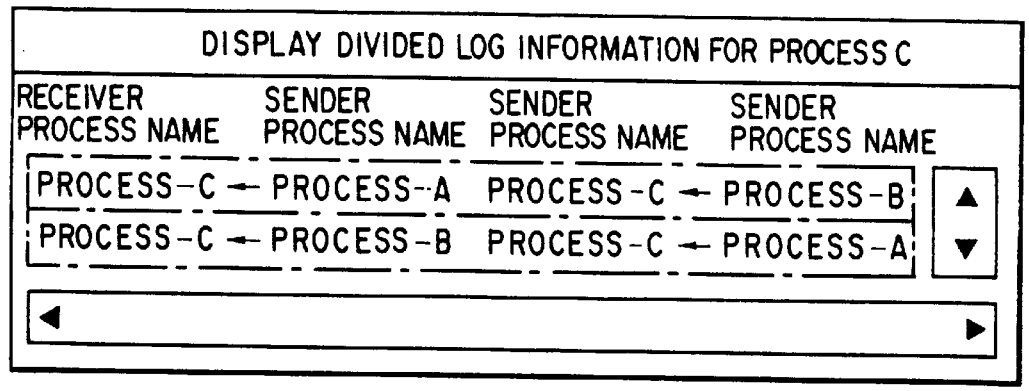
F I G. 97C
DIVIDED LOG INFORMATION FOR PROCESS D
(DIVIDED LOG INFORMATION STORING SECTION D)
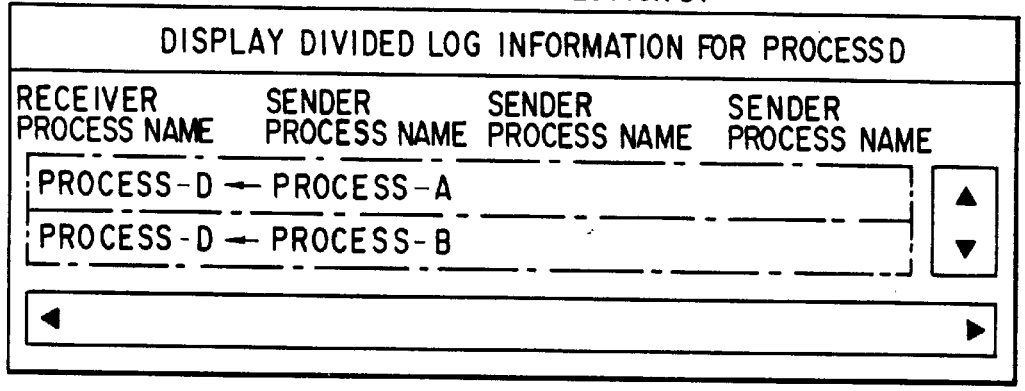
F I G. 97D
```
PROCESSING OF PROCESS ( )
{
        CALL ( PROCESS CONTROL MEANS) ;
        PROCESSING OF MAINBODY OF PROCESS
           :
}
```
F I G. 98

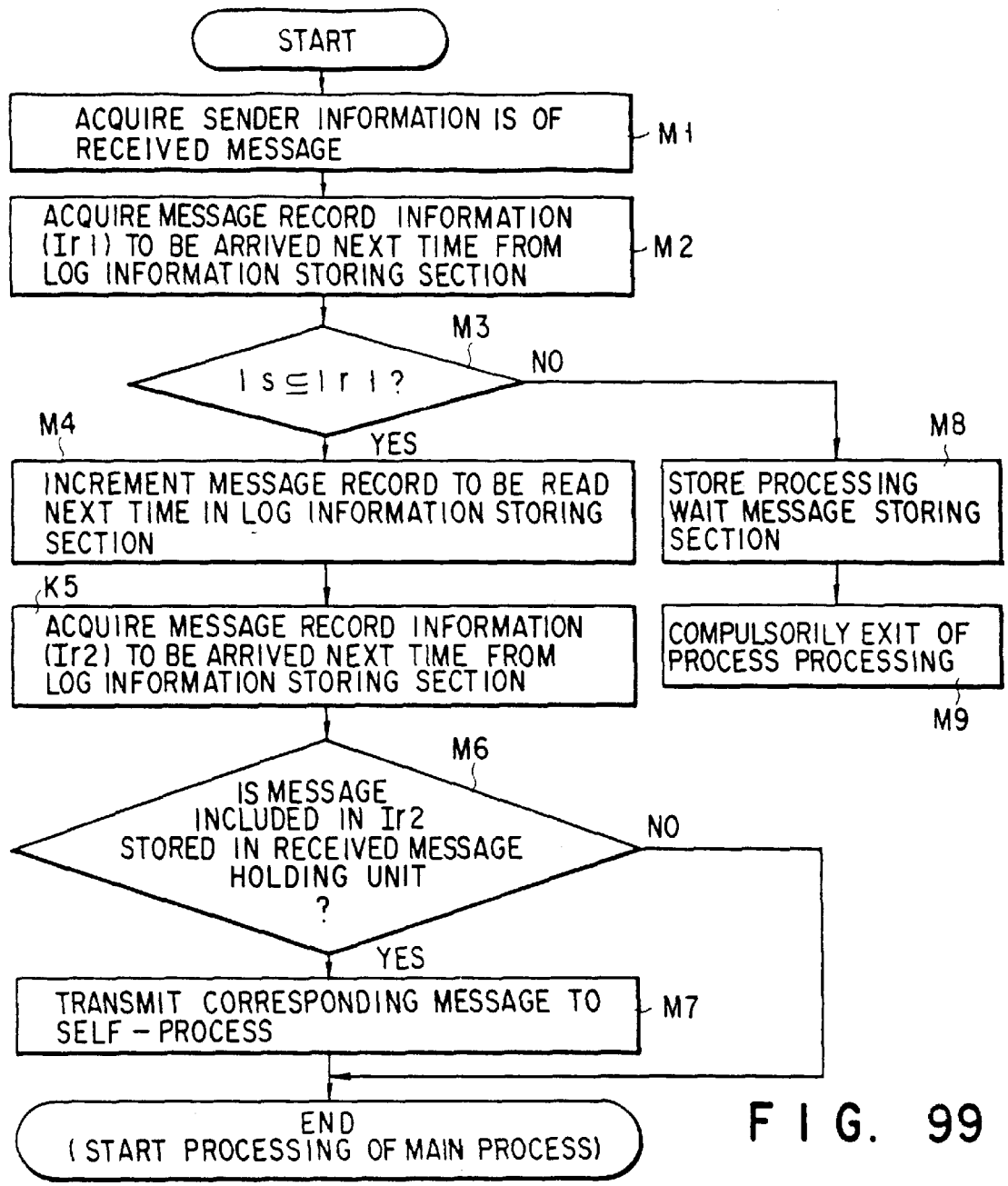
F I G. 99
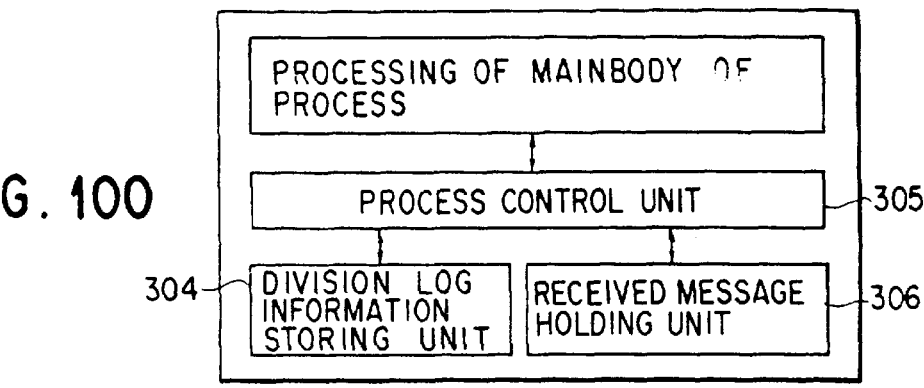
F I G. 100

PROGRAMMING METHOD FOR CONCURRENT PROGRAMS AND PROGRAM SUPPORTING APPARATUS THEREOF

BACKGROUND OF THE INVENTION

1. Field of the Invention

The present invention relates to a programming method for concurrent programs and a supporting apparatus for parallelization.

2. Description of the Related Art

Along with the recent progress in semiconductor integrated circuit technology, complex processors or large-capacity memories with a small size can be realized at a low cost, resulting in actual use of concurrent processing systems or distributed processing systems consisting of a large number of processors. Such hardware requires a dedicated program, i.e., a concurrent program or a distributed processing program (to be referred to as a "concurrent program" hereinafter). Therefore, efficient development of a concurrent program is an important factor as in examination of an excellent algorithm.

In program development, a step of finding and correcting a bug in a program (i.e., debug) largely influences the efficiency of program development. In development of a concurrent program, however, a problem inherent to a concurrent program, which is unfamiliar in development of a sequential program, must be taken into consideration. Such a problem inherent to a concurrent program is that processes constituting a concurrent program may exhibit various behaviors depending on timings of interaction among processes, so the entire concurrent program does not properly operate. This problem based on the nature of the concurrent program is generally called "nondeterminism".

Consider a concurrent program shown in FIGS. 1A and 1B.

Referring to FIG. 1A, a process P1 performs initialization (init) of a shared memory M, a process P2 performs read access (read) to the shared memory M, and a process P3 performs write access (write) to the shared memory M. When these processes are operated in in concurrent processing system which executes these processes by different processors, a total of six (FIG. 1B) combinations of operations are available. Normally, the system starts processing with initialization. Assume that a correct result is obtained when the program is operated in an order of processes P1 (init)→P2 (read)→P3 (write) or P1 (init)→P3 (write)→P2 (read). In this case, as for the four remaining combinations (e.g., P2 (read)→P3 (write)→P1 (init)), since initialization is not performed first, a correct result cannot be obtained.

Whenever the concurrent program is operated, the above nondeterminism associated with the behaviors of processes change the result depending on the system status at that point of time. Therefore, unless the problem of nondeterminism is solved, the normal operation of the concurrent program cannot always be guaranteed although the concurrent program normally operates in a test mode.

In addition, it is difficult to detect a bug associated with nondeterminism as compared to a bug in a sequential program. In a sequential program, an operation can be confirmed by executing all paths in the program during a testing and debugging operation. To the contrary, in a concurrent program, paths must be executed in consideration of all matched paths (i.e., not only all paths in each process but also behaviors among processes). When the number of processes is small, as in the above example, all behaviors among the processes can be relatively easily listed. In actual program development, however, the number of processes becomes large to result in a large number of combinations thereof. For this reason, it is impossible to cover all behaviors.

As described above, debugging in concurrent program development is much more difficult than that in sequential program development. Especially, a program itself recently becomes very large to make debugging more difficult.

SUMMARY OF THE INVENTION

It is an object of the present invention to provide a method of programming a concurrent program and a supporting apparatus for a parallelization, in which the concurrent program can be easily debugged and efficiently developed.

It is a gist of the present invention to temporarily convert a concurrent program into a sequential program, perform test and debugging operations for the sequential program, and restore the concurrency of the program upon completion of the testing and debugging operation. The original concurrent program is debugged as needed.

The reason why programming of a concurrent program is difficult is that "since a human thinking is substantially sequential, it is difficult to logically recognize concurrently operated objects as they are". In the present invention, a concurrent program is temporarily converted into a sequential program, and programming or debugging ("debugging" used here means an operation including a test operation) is performed for the sequential program. The level of difficulty is the same as that of the conventional serialization. Upon completion of debugging, concurrency is automatically restored using the debugging information.

The above programming style is called "hyper serialization". According to this "hyper serialization", difficulty in programming by the conventional method can be solved. The basic concept of the present invention comprises the following three steps (or means).

(1) The step (means) of performing serialization of a concurrent program to generate a hyper sequential program.

(2) The step (means) of performing operations (programming, debugging, and introduction of concurrency) for the hyper sequential program.

(3) The step (means) of performing parallelization of the hyper sequential program upon completion of the operations to generate a concurrent program.

The "hyper sequential program" here means a program which is serialized while information associated with the concurrent structure of an original concurrent program is maintained.

The parallelization for supporting apparatus is characterized by comprising: serialization means for converting a first concurrent program having a concurrent structure into a sequential program capable of being sequentially executed; debugging means for debugging the sequential program and forming debugging information; and parallelization means for performing parallelization of the debugged sequential program on the basis of the debugging information to convert the sequential program into a second concurrent program. The method of programming a concurrent program, is characterized by comprising: the first step of converting a first concurrent program having a concurrent structure into a sequential program capable of being sequentially executed; the second step of debugging the sequential program and forming debugging information; and the third step of performing parallelization of the debugged sequential program on the basis of the debugging information to convert the sequential program into a second concurrent program.

Preferable embodiments of the present invention will be listed below.

(1) Information associated with concurrency is introduced into the hyper sequential program. The information associated with the concurrency includes, e.g., information associated with intended nondeterminism (to be described later).

(2) The concurrent structure of the first concurrent program is analyzed, and parallelization of the sequential program is performed by using concurrent structure and an execution result obtained upon testing of the sequential program.

(3) The concurrent structure of a section of the first concurrent program, which section is to be converted into the sequential program, and the sequential structure of a section of the sequential program are analyzed, and a correlation associated with the concurrent structure of the first concurrent program and a correlation associated with the sequential structure of the sequential program are displayed as graph information. In display of the graph information, the graph information is displayed while defining the predetermined section as a node, the correlation associated with the concurrent structure as the first arc, and the correlation associated with the sequential structure as the second arc. Concurrent programming of a selected section of the sequential program is performed to convert the section into a partial sequential program partially having the sequential structure. Concurrent programming of the partial sequential program is performed to convert the partial sequential program into a second concurrent program.

The step of converting the first concurrent program into the sequential program may include the step of debugging the sequential program until a desired execution result of the sequential program is obtained, or the step of converting the sequential program into the partial sequential program may include the step of debugging the partial sequential program until a desired execution result is obtained. Alternatively, both the steps may include the steps of performing testing and debugging operations.

The step of converting the sequential program into the partial sequential program may include the step of analyzing the sequential structure of the partial sequential program, and at the same time, steps of displaying the graph information, selecting the section to be converted into a concurrent program, and converting the section into the partial sequential program may be repeated a predetermined number of times.

(4) In serialization for converting the first concurrent program into a sequential program, the first concurrent program is executed, and an execute log in this step is stored. The stored execute log and the first concurrent program are analyzed, and the stored execute log is rearranged on the basis of an analysis result. In analysis of the execute log and the first concurrent program, a preceding relationship between processes is extracted from the stored execute log and the first concurrent program, and the preceding relationship is stored as preceding relationship information.

(5) In introduction of information associated with concurrency, the flow of processes of the sequential program is converted into a field consisting of a constraint and a transition condition, and this field is tuned. In addition, field data representing the field is displayed.

(6) A process group as a parallelization candidate for the sequential program is designated. The execution order of the process group is exchanged to convert the sequential program into a plurality of pseudo-concurrent programs. Thereafter, the plurality of pseudo-concurrent programs are converted into a partial sequential program partially having a sequential structure, and parallelization of the partial sequential program is performed to convert the partial sequential program into the second concurrent program.

The step of converting the first concurrent program into the sequential program may include the step of debugging the sequential program until a desired execution result of the sequential program is obtained, or the step of converting the plurality of pseudo-concurrent programs into a partial sequential program may include the step of debugging the plurality of pseudo-concurrent programs until a desired execution result of the pseudo-concurrent program group is obtained. Alternatively, both the steps may include the steps of performing testing and debugging operations. In designation of the process group as a parallelization candidate for the sequential program, the first concurrent program may be analyzed, and the process group as a candidate of parallelization may be extracted from an analysis result. The step of converting the sequential program into the plurality of pseudo-concurrent programs may include the step of eliminating a pseudo-concurrent program determined as unnecessary from an execution result of some of the plurality of pseudo-concurrent programs. The step of converting the plurality of pseudo-concurrent programs into a partial sequential program may include the step of designating the process group as a parallelization candidate for the partial sequential program, and the step of converting the sequential program into the plurality of pseudo-concurrent programs and the step of converting the plurality of pseudo-concurrent programs into a partial sequential program may be repeated a predetermined number of times.

(7) When the first concurrent program is to be converted into the sequential program in accordance with a predetermined serializing rule, information associated with concurrency is introduced to the sequential program by correcting the serializing rule.

(8) In an apparatus for supporting concurrent programming, which supports programming of a concurrent program used in an execution environment in which a process group operates in a concurrent manner while exchanging message information, log information corresponding to the execution history of the process group of the concurrent program is acquired and stored as a serializing rule, and the stored log information can be corrected. The process group can be sequentially started and controlled on the basis of the stored log information, and parallelization of the stored log information is performed to convert the log information into a second concurrent program.

The log information correcting means includes display means for time-serially displaying the log information stored in the log information storing means, rearrangement designating means for designating rearrangement of an order of data in the log information time-serially displayed by the display means, and rewrite means for rewriting the log information stored in the log information storing means in accordance with a designation from the rearrangement designating means. The log information correcting means includes nondeterminism introduction means for introducing nondeterminism of a processing timing between processes.

(9) In a system in which a process group operates in accordance with execution order definition information in an execution environment in which the process group can operate in a concurrent manner while exchanging message information, the execution order definition information is divided, and the process group is started and controlled on the basis of the divided execution order information.

In this case, the means for holding the division criterion designating means for supplying a criterion for dividing the execution order definition information may also be provided. The history of message exchange is used as the execution order definition information, and at the same time, destination process information in the message is used as a division criterion in the division criterion designating means. The history of message exchange is used as the execution order definition information, the destination process information in the message is used as a division criterion in the division criterion designating means, and at the same time, the means for holding the process control means in units of processes is also provided. The history of message exchange is used as the execution order definition information, the destination process information in the message is used as a division criterion in the division criterion designating means, and at the same time, the means for holding the process control means in units of processes, and the division execution order information storing means for independently storing the execution order information divided by the execution order information division means are also provided. The process control means starts and controls the process on the basis of the division execution order information stored in the division execution order storing means corresponding to the process. Log information corresponding to the execution history information of the process group may be used as the execution order definition information.

(10) A test of the first concurrent program having a concurrent structure is executed. An execute log determined to have no bug upon execution of the test is accumulated, and parallelization of only the accumulated execute logs having no bug is performed to convert the execute logs into the second concurrent program. In addition, an execute log determined to have a bug upon execution of the test is accumulated, and the first concurrent program is corrected on the basis of the accumulated execute logs having bugs.

In the present invention, a concurrent program is temporarily serialized, and the sequential program is tested/debugged. With this operation, the concurrent program can be debugged at the same level of difficulty as that of serialization which is much easier than the conventional parallelization.

The concurrent information and the serialization information are simultaneously presented to the user by the graph information. With this operation, the user can designate a intended nondeterministic portion while considering the concurrent structure of the first concurrent program. In addition, the intended nondeterministic portion is designated/canceled not at the concurrent program description level but for the graph information. For this reason, a concurrent program can be easily developed without requiring an advanced parallelization technique.

In conversion of the first concurrent program into the sequential program, the first concurrent program and the execute log thereof are analyzed, and the execute log is rearranged on the basis of the analysis result. With this operation, the rearranged execute log is displayed and presented to the user, thereby facilitating understanding of the process of execution of the concurrent program and improving the efficiency of the debugging operation.

In introduction of the information associated with concurrency to the sequential program, the flow of the processes of the sequential program is converted into a field consisting of a constraint and a transition condition, and field data is displayed. The field is interrogatively and visually edited to effectively introduce the information associated with the concurrency, thereby efficiently programming a concurrent program without any bug.

A process group as a parallelization candidate is designated for the sequential program serialized from the first concurrent program, and the execution order of the process group is exchanged to convert the sequential program into a plurality of pseudo-concurrent programs. Thereafter, the plurality of pseudo-concurrent programs are converted into a partial sequential program partially having a sequential structure, and parallelization of the partial sequential program is performed to convert the partial sequential program into the second concurrent program. With this operation, the operation of the concurrent program can be sufficiently confirmed on the partial sequential program. In addition, when a process group as a parallelization candidate is designated for the partial sequential program, the sequential structured program can be gradually converted into a concurrent program. Furthermore, by introducing an information relating to concurrency which allows only nondeterminism confirmed to be properly operated in sequential execution based on a pseudo-concurrent behavior, a concurrent program which properly operates can be obtained. With this operation, the testing and debugging operation of a concurrent program is facilitated.

In an apparatus for supporting parallelization, which supports programming of a concurrent program used in an execution environment in which a process group of first concurrent program operates in a concurrent manner while exchanging message information, log information corresponding to the execution history of the process group is acquired and stored as a serializing rule. This log information can be corrected, and at the same time, the process group is sequentially started and controlled on the basis of the stored log information, thereby performing parallelization of the stored log information to convert the log information into the second concurrent program. In this case, the log information can be corrected without correcting the concurrent program as a source program to solve a drawback caused by nondeterminism of a processing timing. With this operation, the development of a concurrent/parallel/distributed program can be facilitated. In addition, since intended nondeterminism intended by the user can be easily introduced, flexibility, reutilization, and expansibility of a concurrent program can be maintained.

In a system in which a process group operates in accordance with execution order definition information in an execution environment in which the process group can operate in a concurrent manner while exchanging message information, the execution order definition information is divided, i.e., integrated log information of all processes, which is obtained by sequencing a concurrent program, is divided in units of processes, and the process group is started and controlled on the basis of the divided execution order information. With this operation, harmless nondeterminism is naturally introduced, and the same result as in execution of a sequential program on the basis of the integrated log information can be obtained at a higher processing efficiency.

The first concurrent program is tested, and an execute log determined to have no bug, which is one of thereof, upon execution of the test is accumulated. Concurrent programming of only the accumulated execute logs having no bug is performed to convert the execute logs into the second concurrent program. With this operation, the program can operate to allow only timing passing in the test, thereby preventing a bug which remains because of no execution of the test and improving the reliability.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 1A and 1B are views for explaining a problem in a prior art;

FIG. 2 is a block diagram showing the arrangement of a computer system for realizing a parallelization supporting apparatus according to the present invention;

FIG. 4 is a flow chart schematically showing the procedures of a parallelization method according to the first embodiment;

FIG. 7 is a view showing a testing and debugging screen so as to explain the operation of the first embodiment;

FIG. 8 is a view showing an example of introduction of information associated with nondeterminism so as to explain the operation of the first embodiment;

FIG. 10 is a flow chart schematically showing the procedures of a parallelization method according to the second embodiment;

FIG. 11 is a view showing a section setting method;

FIG. 12 is a view showing a serialization method;

FIG. 13 is a view showing a serialization information rewrite rule;

FIG. 14 is a view showing a concurrent program;

FIG. 15 is a view showing description of a concurrent program;

FIGS. 16A to 16C are views respectively showing the section information, the program structure information, and the hyper serialization information of a hyper sequential program;

FIG. 17 is a view for explaining introduction of intended concurrency;

FIG. 18 is a view showing the source code of a concurrent program translated from a sequential program which is automatically translated into a concurrent program;

FIG. 19 is a view showing the program structure information of the hyper sequential program;

FIG. 20 is a view showing the serialization information of the hyper sequential program;

FIG. 21 is a flow chart showing the flow of the processing of the hyper sequential program which is automatically translated into a concurrent program;

FIG. 24 is a view showing a concurrent program as a source program so as to explain the operation of the third embodiment;

FIG. 26 is a flow chart schematically showing the procedures of a parallelization method according to the fourth embodiment;

FIG. 37 is a view for explaining introduction of an intended nondeterministic portion among three processes;

FIG. 38 is a view showing the hyper sequential graph after introduction of the intended nondeterministic portion;

FIG. 39 is a block diagram schematically showing the arrangement of a parallelization supporting apparatus according to the fifth embodiment;

FIG. 40 is a view showing a concurrent program as a source program so as to explain the operation of the fifth embodiment;

FIG. 41 is a view showing the flow of processing executed by the concurrent program in FIG. 40;

FIG. 42 is a view showing a serialization process stored in a serialization process file in the fifth embodiment;

FIG. 43 is a view showing the flow of processing executed in the serialization process in FIG. 42;

FIG. 45 is a view showing data structure of an area generated by the processing in FIG. 44;

FIG. 46 is a view showing field data generated by the field data generating unit in the fifth embodiment;

FIG. 50 is a view showing another part of FIG. 47 (step E11) in detail;

FIG. 52 is a view showing still another part of FIG. 47 (step E13) in detail;

FIG. 53 is a view showing a change in field, which is caused by the constraint change operation in the fifth embodiment;

FIG. 54 is a view showing processing for detecting an obvious constraint which generates contradiction in the field;

FIG. 55 is a view showing a field including the obvious constraint;

FIG. 56 is a view showing detection of the obvious constraint;

FIGS. 57 to 59 are views showing display screens of a field editor;

FIGS. 60 to 67 are views showing processes for tuning the field data in the fifth embodiment;

FIG. 70 is a view showing an image of the flow of processing executed by the concurrent program in FIG. 69;

FIG. 71 is a block diagram schematically showing the arrangement of a parallelization supporting apparatus according to the sixth embodiment;

FIG. 73 is an example of a concurrent program supposed by the user;

FIG. 74 is an example of modeling an execution series of the hyper sequential program obtained by the concurrent program of FIG. 73;

FIG. 75 is a flow chart showing the procedures of converting from hyper sequential program to a partial concurrent program according to the seventh embodiment;

FIGS. 76A–76C, 77A–B, 78A–B and 79A to 79B show examples of process for converting the hyper sequential program to the partial concurrent simulated model;

FIG. 80 is a view showing information exchange between processes according to the eighth embodiment;

FIG. 81 is a block diagram schematically showing the arrangement of a parallelization supporting apparatus according to the eighth embodiment;

FIG. 83 is a view showing log information as a message execution history in the eighth embodiment;

FIG. 84 is a block diagram schematically showing the arrangement of a concurrent program debugging unit based on the log information according to the eighth embodiment;

FIG. 88 is a flow chart showing the procedures of the processing of a process group control unit in the eighth embodiment;

FIG. 89 is a view showing a state in which a replacement target is designated to correct the log information in the eighth embodiment;

FIG. 94 is a view showing information exchange between tasks in the eighth embodiment;

FIG. 95 is a view showing log information in introduction of intended nondeterminism in the eighth embodiment;

FIG. 96 is a flow chart showing the procedures of the processing of a task control unit in the eighth embodiment;

FIGS. 97A to 97D are views showing programs as a means for starting the task control unit in the eighth embodiment;

FIG. 98 is a view showing the structure of each task in the eighth embodiment;

FIG. 99 is a flow chart showing the procedures of the processing of the task control unit in the eighth embodiment; and FIG. 100 is a view showing a message format in the eighth embodiment.

DETAILED DESCRIPTION OF THE PREFERRED EMBODIMENTS

Figure 3:
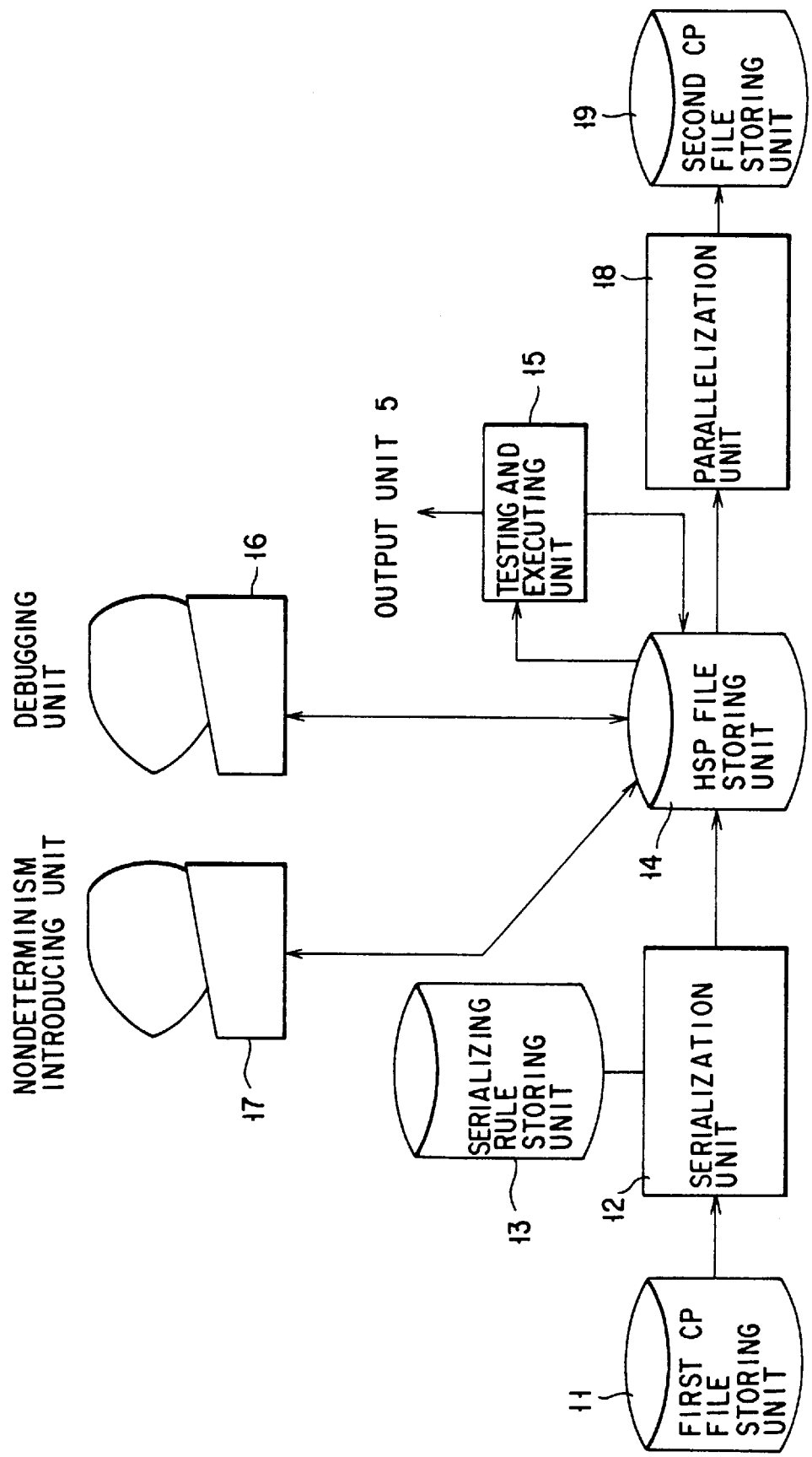
FIG. 3 is a block diagram schematically showing the arrangement of a parallelization supporting apparatus according to the first embodiment.

Preferred embodiments of the present invention will be described with reference to the accompanying drawings.

Prior to a description of the embodiments of the present invention, terms used in the present invention will be defined below.

Concurrent System: a system having logical concurrency. A system in which a concurrent program runs is a concurrent system. A parallel computer and a distributed processing system are concurrent systems.

Concurrent Program (CP): a program described on the basis of a model which can be logically operated in a concurrent manner. A program (concurrent program) which is logically and physically operated in a concurrent manner in a concurrent computer constituted by a plurality of CPUs is included in concurrent programs. Even a program which is physically operated in a sequential manner under the control of a single CPU is included in the concurrent programs, provided that logical concurrency is established as in a multi-task system.

Sequential Program: a program described on the basis of a model which is logically operated in a sequential manner.

Hyper Sequential Program (HSP): a program sequentially operated upon addition of meta-level (execution management level) serialization control to a concurrent program. For example, when a scheduler of an execution management level is added to a program described as a concurrent program to obtain a sequentially operated program, the resultant program is called a hyper sequential program. A hyper sequential program has a reproducible behavior if external inputs are identical to each other because the hyper sequential program does not have nondeterminism (to be described later).

In a hyper sequential program, concurrency (nondeterminism) can be partially introduced. This program is still called a hyper sequential program. A hyper sequential program to which concurrency (nondeterminism) is partially introduced may be especially called as partial hyper sequential program (PHSP), and a program, which has no concurrency (nondeterminism) and is completely serialized, may be called as a complete hyper sequential program.

Nondeterminism: a change in system behavior depending on processing timings in spite of the same inputs. Nondeterminism is an essential aspect in execution of a concurrent program. In a sense, a program having no nondeterminism is equivalent to a logically sequential program.

Intended Nondeterminism: nondeterminism intended by a user, i.e., nondeterminism included in user specifications and other requirements. By this nondeterminism, a program can properly respond to an external (environmental) nondeterministic input.

Harmful Nondeterminism: nondeterminism not expected by a user. Cases not intended at the time of design frequently occur in actual execution of a concurrent program because the user's thinking is sequential.

Harmless Nondeterminism: nondeterminism in which selection of a nondeterministic choice does not influence a final result. In a parallelization unit of "hyper serialization", a part of which can be parallelized includes "harmless nondeterminism".

Default Serialization: serialization control at an execution management level.

Pseudo-Concurrent Program: a set of behaviors generated in a specific range serving as a concurrent program in the hyper sequential program.

Pseudo-Concurrent Behavior: one behavior generated to simulate concurrent program operations on a sequential program in the specific range as the parallelization in such a manner that a sequential execution order is arbitrarily or intentionally changed. A plurality of pseudo-concurrent behaviors are generated in one concurrent program programming range.

Generally, since a plurality of pseudo-concurrent behaviors are generated in one parallelization candidate range, all of them are called as one pseudo-concurrent program. A plurality of pseudo-concurrent programs are generated in an entire hyper sequential program.

FIG. 2 is a block diagram showing the arrangement of a computer system for realizing a supporting apparatus for programming a concurrent program according to the present invention. Referring to FIG. 2, N processors 1-1, 1-2, ..., 1-N can simultaneously execute a concurrent program and access a shared memory 3 and peripheral devices through an I/O interface 2. The peripheral devices are constituted by an input unit 4, an output unit 5, and an external storing unit 6.

The input unit 4 includes a keyboard, a pointing device, and the like and is used to input various commands and data. The output unit 5 includes a CRT display and the like and displays a source program and information associated with a debugging status in the form of a text or graphic pattern, which is presented to a user. The user uses the input unit 4 and the output unit 5 to interrogatively operate the computer.

The external storing unit 6 includes a magnetic disk, a magneto-optical disk, or the like and can write or read the source program and the information associated with the debugging status.

The arrangement of the computer system described above is not limited to this. For example, the computer system may be arranged using, e.g., a so-called distributed network in which a plurality of computers are connected using a network.

In the computer system having the above arrangement, parallelization according to the present invention can be realized as follows.
(First Embodiment)

A partial hyper sequential program is tested/debugged in the first embodiment. As a preferable embodiment, information associated with intended nondeterminism is introduced in the partial hyper sequential program. In the following embodiment, a case in which intended nondeterminism is introduced will be described. However, intended nondeterminism need not be introduced.

FIG. 3 is a block diagram schematically showing the arrangement of the supporting apparatus for programming a concurrent program according to the first embodiment.

The supporting apparatus for programming a concurrent program according to the first embodiment comprises a serialization unit 12, a testing and executing unit 15, a debugging unit 16, a nondeterminism introducing unit 17, and a parallelization unit 18.

The serialization unit 12 converts a source program (to be referred to as a first concurrent program hereinafter) stored in a first CP file storing unit 11 into a hyper sequential program on the basis of serializing rules stored in a serializing rule storing unit 13 and stores the conversion result in an HSP file storing unit 14. The first CP file storing unit 11 stores the first concurrent program modeled and described in a parallelization language. The first concurrent program may have several bugs. The following parallelization languages are available to describe the first concurrent program:

(a) Concurrent PASCAL
(b) ADA
(c) GHC
(d) Modula3
(e) Occam
(f) cooC

The testing and executing unit 15 and the debug unit 16 test and debug the hyper sequential program stored in the HSP file storing unit 14.

The nondeterminism introducing unit 17 introduces intended nondeterminism into the hyper sequential program.

The parallelization unit 18 performs parallelization of the hyper sequential program to generate a second concurrent program on the basis of the hyper sequential program testing and debugging information stored in the HSP file storing unit 14. This second concurrent program is stored in a second CP file storing unit 19.

FIG. 4 is a flow chart showing the main procedures of a method of programming a concurrent program according to the first embodiment.

(1) Step A1: Modeling Concurrent System

Natural modeling using concurrency is performed for a target concurrent system. Each process structure of the concurrent system is determined. In addition, a concurrent program having a concurrent structure is described as a source program in each process in accordance with programming using a concurrent programming language. Note that the concurrent program has the "concurrent structure" because, in general, a concurrent program is not always entirely constituted by a concurrent structure. If modeling using serialization is more natural, the corresponding portion should be translated using a sequential structure. Note that a latent bug may be present in this source program.

(2) Step A2: Serializing Concurrent Program

Default serialization is introduced to convert the first concurrent program into a hyper sequential program having a sequential structure. In this embodiment, sequential structure is introduced at a meta-level. The meta-level is defined, not as the level of the source program itself (i.e., the first concurrent program) but as a level for managing execution of the source program. For example, a source program described in a concurrent program is converted into a source program as a program which assures sequential execution by means of a scheduler managed independently of the source program.

(3) Step A3: Testing and Debugging Hyper Sequential Program

A hyper sequential program is tested/debugged. A bug is eliminated from the hyper sequential program by the debugging unit on the basis of a hyper sequential program test result obtained by the testing and executing unit. The testing and debugging operation can be performed in the same manner as in the normal testing and debugging method in a sequential program. The testing and debugging operation is repeated until the correctness of the sequential program is assured.

(4) Step A4: Introduction of Nondeterminism for Hyper Sequential Program

Information (information associated with concurrency) associated with intended nondeterminism is assigned to a tested/debugged hyper sequential program. By this operation, the hyper sequential program partially has the information associated with nondeterminism and becomes a partial hyper sequential program. A method of introducing the information associated with intended nondeterminism will be described later.

(5) Step A5: Testing and Debugging Partial Hyper Sequential Program

The partial hyper sequential program obtained in step A4 is tested/debugged. That is, the hyper sequential program in which the information associated with intended nondeterminism is introduced in step A4 is tested/debugged.

(6) Step A6: Additional Introduction and Extension of Intended Nondeterminism for Partial Hyper Sequential Program Information associated with intended nondeterminism is added to the partial hyper sequential program tested/debugged in step A5. Steps A5 and A6 are repeated a predetermined number of times to gradually extend intended nondeterminism.

(7) Step A7: Parallelizing Hyper Sequential Program

A harmless nondeterministic portion is extracted from the partial hyper sequential program in which an information relating to intended nondeterminism is introduced. The harmless nondeterministic portion is parallelized to covert the partial hyper sequential program into a concurrent program. Up to this parallelization, intended and harmless nondeterminism is introduced, and only harmful nondeterminism is still removed by the default serialization. Remaining serialization given by default serialization at the meta-level is reflected (e.g., embedded in the source program itself) on the concurrent program and finally default serialization of meta-level is canceled.

The present invention will be described in more detail with reference to FIGS. 5 to 8.

Figure 5:
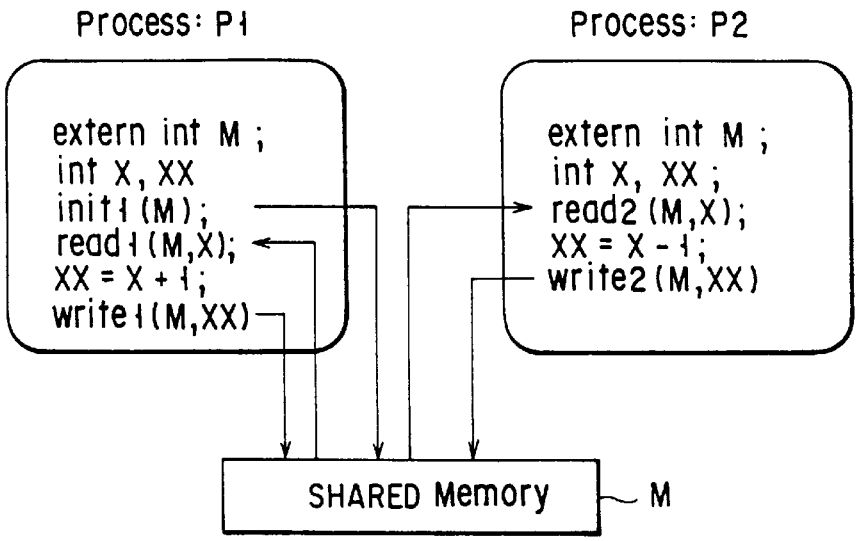
FIG. 5 is a view showing a concurrent program and a serializing rule so as to explain the operation of the first embodiment.

FIG. 5 shows a simple concurrent program.

The concurrent program in FIG. 5 is constituted by a process P1 and a process P2. These processes are realized as entities only when an execute module generated upon compiling source codes of the concurrent program is executed in a computer. Concurrent programs respectively corresponding to the processes P1 and P2 need not be stored in storing media physically independent of each other. A shared memory M here represents an external memory. The shared memory M can perform write/read access in accordance with an access instruction of the concurrent program. Solid arrows in FIG. 5 represent access to the shared memory M upon execution of the processes P1 and P2.

The first concurrent program stored in the CP file storing unit 11 is read out in accordance with a user command input from the input unit 4 and is input to the serialization unit 12. Default serialization is introduced, at the meta-level, to the first concurrent program input to the serialization unit 12 in accordance with serializing rules stored in the serializing rule storing unit 13, so that the first concurrent program is converted into a hyper sequential program (HSP). This hyper sequential program is stored in the HSP file storing unit 14.

Typical serializing rules are as follows:

(a) a rule for introducing a priority to processes;

(b) a rule for introducing a priority to functional units (i.e., methods in object-oriented programming) in a process;

(c) a serializing rule based on an executing log;

(d) a serializing rule for performing preferential execution for the destination of a message; and (e) a serializing rule for performing preferential execution for the source of a message.

"P1>>P2" described in the lower portion of FIG. 5 is a serializing rule for the concurrent program in FIG. 5. This rule indicates that the process P1 is preferentially operated over the process P2. This rule corresponds to the rule (a). This serializing rule is declared at the start of the first concurrent program and compiled together with the program body, thereby introducing the priority to the process. Alternatively, this serializing rule may be described in a file different from the concurrent program and may be interpreted and introduced upon execution of the concurrent program. In this embodiment, the serializing rule is represented by ">>". An arbitrary symbol other than ">>" can be used.

Figure 6:
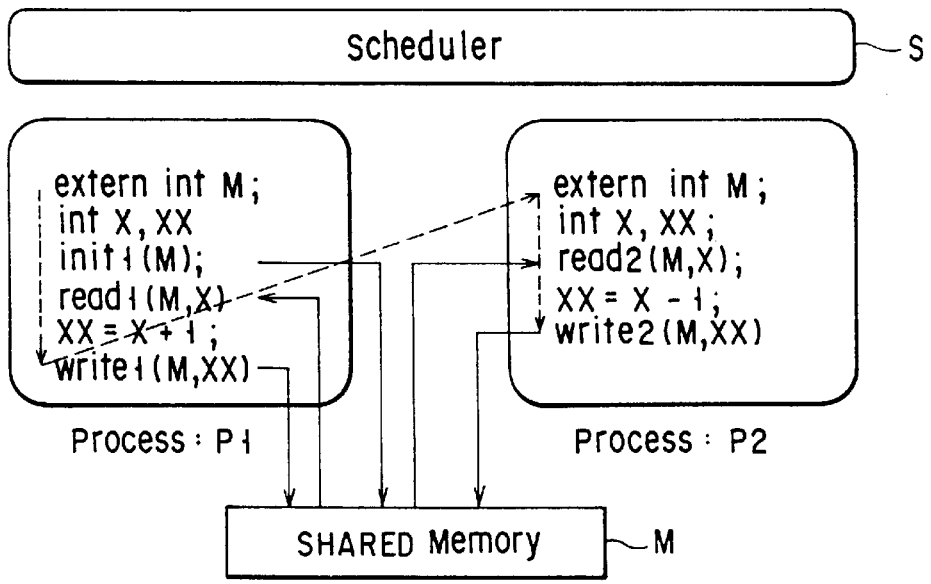
FIG. 6 is a view showing the concept of a hyper sequential program in which default sequentially of meta-level is introduced so as to explain the operation of the first embodiment.

FIG. 6 is a view showing the concept of a hyper sequential program HSP in which default serialization is introduced at the meta-level. The processes P1 and P2 are managed by the scheduler S. Referring to FIG. 6, broken arrows indicate that the scheduler S executes the process P1 and then the process P2 in accordance with the serializing rule ("P1>>P2") shown in FIG. 5. Note that the view showing the concept of this hyper sequential program HSP is described in the lower portion of FIG. 6, that is, $$HSP=P1|P2|S$$

This indicates that the hyper sequential program HSP is constituted by the processes P1 and P2 and the scheduler S. In this case, the serializing rule corresponds to the scheduling rule of the scheduler.

The user can check this hyper sequential program HSP at the output unit 5. The hyper sequential program HSP is input to the testing and executing unit 15 in accordance with a user command from the input unit 4 and tested by the testing and executing unit 15. The testing and executing unit 15 outputs a test execution result (execute log) to the output unit 5. The user uses the input unit 4 as the debugging unit 16 to perform a predetermined testing and debugging operation to the hyper sequential program HSP on the basis of this test execution result. The following testing and debugging techniques are available:

(a) a source code tracer;
(b) a break point; and
(c) an animation.

FIG. 7 is a view showing a testing and debugging image at this time. Referring to FIG. 7, various windows 61 to 65 are open on a testing and debugging screen 60 of the output unit 5, and various kinds of information are displayed. The windows 61 to 65 can be appropriately opened/closed. Note that a known debugging unit can be basically used in this testing and debugging operation. More specifically, a dbx-tool on a UNIX workstation is known (UNIX Users Manual).

After the user performs the predetermined testing and debugging operation for the hyper sequential program HSP, he inputs a command for executing a test again from the input unit 4. The tested/debugged hyper sequential program HSP is input to the testing and executing unit 15, and a test is executed again. This testing and debugging operation is repeated until the hyper sequential program HSP is normally operated. When the user confirms in the testing and debugging operation that the hyper sequential program is normally operated, information associated with nondeterminism is partially introduced in the hyper sequential program by the nondeterminism introducing unit 17. The information associated with intended nondeterminism introduced by the nondeterminism introducing unit 17 is reflected on the hyper sequential program HSP and recorded in the HSP file storing unit 14. Note that the nondeterminism introducing unit 17 will be described later.

FIG. 8 is a view showing a state in which information associated with intended nondeterminism is introduced in a hyper sequential program by giving same priority to some sections. In this case, when the unit of execution of each program of a concurrent program is called a "section", FIG. 8 shows a state in which a section S2 has the same priority as that of section S3 in a process P1 divided into a section S1 and the section S2 and a process P2 divided into the section S3 and a section S4.

More specifically, information associated with intended nondeterminism is assigned to serializing rules for assigning different priorities in units of execution (processes set to have the same priority are clicked with a mouse). Concurrent operations can be executed in an assumption that the corresponding portions have the same priority. In FIG. 8, information representing that {"write1" as the section S2 is set to have the same priority as that of "read2" as the section S3} is introduced as intended nondeterminism. Since either of processes having the same priority may be executed first, these processes have nondeterminism.

The hyper sequential program (partial hyper sequential program PHSP) in which the information associated with intended nondeterminism is introduced by the nondeterminism introducing unit 17 is tested by the testing and executing unit 15 and tested/debugged by the debugging unit 16 in accordance with a user command. In this case, since the behavior of the partial hyper sequential program PHSP is nondeterministic in the portion in which the information associated with intended nondeterminism is introduced, all the behaviors are preferably tested/debugged. In this manner, the testing and debugging operation and introduction of the information associated with intended nondeterminism are repeated to gradually add information associated with nondeterminism.

A partial hyper sequential program PHSP obtained by incrementally introducing information associated with intended nondeterminism is input to the concurrent program coding unit 18 in accordance with a user command. The parallelization unit 18 extracts harmless nondeterministic portion from the partial hyper sequential program PHSP, parallelizes these portions, and finally converts the partial hyper sequential program PHSP into a concurrent program. More specifically, the parallelization unit 18 cancels default serialization regarding introduced intended nondeterminism and harmless nondeterminism, and records the resultant program as a concurrent program CP (second concurrent program) in a file. Where, sequential structure given by default serialization except for intended nondeterminism and harmless nondeterminism are reflected to the concurrent program CP. The user can check this second concurrent program at the output unit 5 and at the same time can perform final testing and debugging operation.

The first embodiment is the basic embodiment of the present invention, and more detailed embodiments will be described below. The same reference numerals as in the first embodiment denote the same or corresponding parts in the following embodiments, and a detailed description thereof will be simplified or omitted. Different points between the first embodiment and the following embodiments will be mainly described.

(Second Embodiment)

The second embodiment has the following target concurrent program as in the first embodiment. The concurrent program is constituted by a plurality of processes. The concurrent program is executed by a multiprocessor of a shared memory type. A processor (CPU) is assigned to each process. Synchronization among processes is realized by a basic synchronization instruction and the shared memory.

The embodiment in which the present invention is applied to the above concurrent program will be described.

Figure 9:
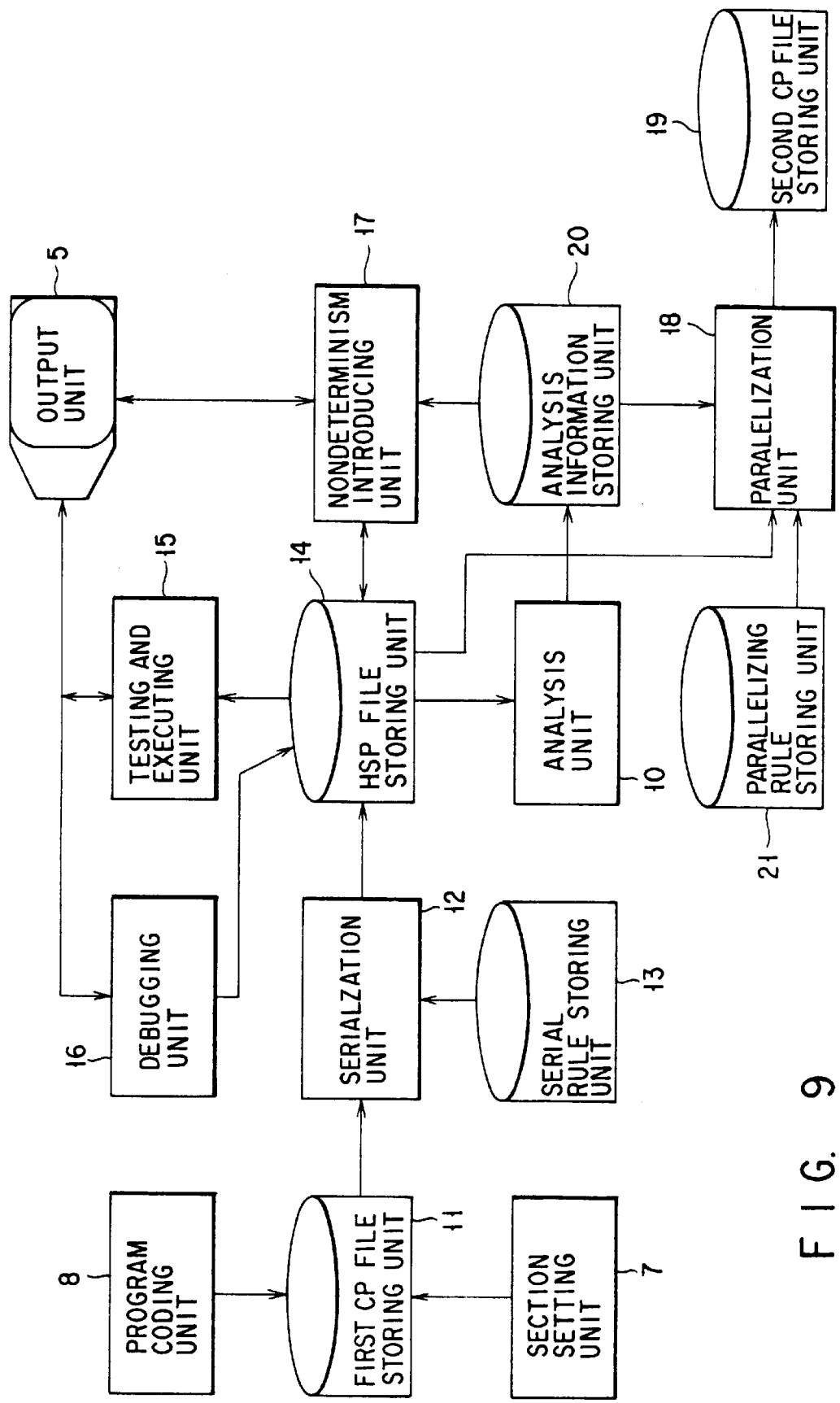
FIG. 9 is a block diagram schematically showing the arrangement of a parallelization supporting apparatus according to the second embodiment.

FIG. 9 is a block diagram schematically showing the arrangement of a parallelization supporting apparatus according to the second embodiment. FIG. 10 is a flow chart schematically showing the procedures of a parallelization method according to the second embodiment.

FIG. 9 is different from FIG. 3 in that a section setting unit 7 is arranged, a testing and executing unit 15 and a debugging unit 16 are more specifically defined as a testing and executing unit 15, a debugging unit 16, and an analysis unit 10, and an analysis information storing unit 20 for storing analysis information analyzed by the analysis unit 10 is also arranged. The analysis unit 10 analyzes a hyper sequential program and extracts a preceding constraint described later as analysis information. The remaining constituent elements are the same as those in the first embodiment, and a detailed description thereof will be omitted. Note that FIG. 9 includes a parallelizing rule storing unit 21 for storing a parallelizing rule which is referred to when a hyper sequential program is translated into a concurrent program by a parallelization unit 18.

The section setting unit 7 divides each process of the first concurrent program into several sections (program units).

The testing and executing unit 15 tests a hyper sequential program as in the first embodiment.

The analysis information storing unit 20 stores information analyzed by the analysis unit 10.

The operation of the second embodiment will be described with reference to the flow chart in FIG. 10. The same step numbers as in the flow chart of FIG. 4 denote the same operations in FIG. 10.

(1) Step A1: Modeling Concurrent System

Natural modeling using concurrency is performed for a target concurrent system. Each process structure of the concurrent system is determined. In addition, a concurrent program having a concurrent structure is described as a source program in each process in accordance with programming using a concurrent programming language. A latent bug may be present in this source program.

(2) Step B1: Setting of Sections

The programmer divides each process of the first concurrent program into several sections (functional units) by the section setting unit 7. A synchronization instruction in the first concurrent program is automatically defined as a single section. Sections are functional units of processes. In the following steps, serialization and parallelization are performed in units of sections. In this case, the programmer does not necessarily set sections. In this case, intervals obtained upon division in accordance with a synchronization instruction are automatically defined as sections.

Setting of sections can be realized by dividing the source code of each process and setting a section ID in each divided interval. In division of the source code, divisional points are inserted to define processing from one divisional point to the next divisional point as a section, as shown in FIG. 11. In this case, divisional points are automatically inserted before and after a synchronization instruction, as described above.

(3) Step A2: Serializing Concurrent Program

The first concurrent program is translated into a sequential program by the serialization unit on the basis of a serializing rule. As a serializing rule, a priority is introduced in the processes. A program executed on the basis of this priority can be regarded as a hyper sequential program because it has no nondeterminism behaviors in its execution. A program which is converted into a sequential program while maintaining program information associated with the concurrent structure is defined as a hyper sequential program.

As a serialization method, a method based on "the priority of processes" can be used. According to this method, a fixed priority is set to the processes in advance, and the sections of a process with a higher priority are preferentially executed. With this operation, a sequential and deterministic execution order free from nondeterminism can be obtained.

As another serialization method, "a method in which the waiting side of a synchronization instruction is preferentially executed (serializing rule 1)" or "a method in which the sending side of a synchronization instruction is preferentially executed (serializing rule 2)" as shown in FIG. 12 is available.

A hyper sequential program consists of three program informations (i.e., section information, program structure information, and serialization information).

Section information includes a section identifier (ID) and a source code to which the section belongs. Program structure information includes section execution order information for each process in the original concurrent program and a data dependency relationship between sections of different processes. Serialization information includes global section execution order information by serialization, and at the same time, information associated with intended nondeterminism (concurrency). As an example, a serialization information may be represented by a Petri net as means for modeling a concurrent system.

(4) Step A3: Testing and Debugging Hyper Sequential Program

A hyper sequential program is tested by the testing and executing unit 15. If a bug is detected, debug/correction is performed by the debugging unit 16. If correction of the program involves a change in concurrent structure of a synchronization instruction or the like, the flow returns to step A1 to perform modeling by a program coding unit 8, setting of sections, and serialization again. Since a program 6 is translated into a hyper sequential program, the testing and debugging operation is facilitated as in a sequential program.

(5) Step A4: Introduction of Intended Nondeterminism for Hyper Sequential Program The structure of the hyper sequential program is indicated at an output unit 5 by a nondeterminism introducing unit 17. The programmer can explicitly introduce concurrency with intended nondeterminism by the nondeterminism introducing unit 17 while checking the structure. At this time, the program information of the hyper sequential program extracted by the analysis unit 10 supports introduction of intended nondeterminism by the programmer. If introduction of intended nondeterminism is unnecessary, the flow advances to step B2.

In a method of introducing intended nondeterminism, when the serialization information of the hyper sequential information is represented by a Petri net, the Petri net is rewritten within a range for preserving the program structure, thereby introducing intended nondeterminism.

(6) Step A5: Test/Debug Operation

The hyper sequential program in which intended nondeterminism is introduced is tested by the testing and executing unit 15, as in step A3. If a bug is detected, the testing and debugging operation is performed by the debugging unit 16. If correction of the program involves a change in concurrent structure of a synchronization instruction or the like, the flow returns to step A1 to perform correction by the program coding unit, setting of sections, and serialization again. A portion in which concurrency is introduced is concurrently executed.

If the serialization information of the hyper sequential program is represented by a Petri net, the simulator of the Petri net is used to execute a section corresponding to a place with a token, thereby realizing test execution of the hyper sequential program.

(7) Step A6: Introduction/Extension of Intended Nondeterminism for Partial Hyper Sequential Program Information associated with intended nondeterminism is added to the hyper sequential program tested/debugged in step A5. Steps A5 to A6 are repeated a predetermined number of times to gradually extend intended nondeterminism.

If intended nondeterminism need be further introduced, concurrency is added by the nondeterminism introducing unit 17, as in step A5, and the flow returns to step A6. Otherwise, the flow advances to step B2.

(8) Step B2: Automatic Parallelization

A portion allowing parallelization is automatically extracted from the hyper sequential program in which intended nondeterminism is introduced by the programmer in accordance with analysis information 12 of the hyper sequential program, which is extracted by the analysis unit 10. The concurrency of the hyper sequential program is automatically extended using the parallelizing rule by the parallelization unit 18.

The parallelizing rule is as follows.

A preceding restriction based on the data dependency relationship and control dependency relationship is extracted by the analysis unit 10 from the program information, and a section having no preceding restriction can be translated into a concurrent program. This parallelization can be performed by applying a predetermined parallelizing rule. As a parallelizing rule, a rewrite rule for serialization information represented by a Petri net, as shown in FIG. 13, is used. The data dependency relationship and the control dependency relationship are known well.

(9) Step B3: Generation of Concurrent Programs

The parallelization unit 18 generates a concurrent program 15 in which, for the hyper sequential program whose concurrency is automatically extended, the program information of the hyper sequential program is reflected on the source code.

The testing and debugging operation of a concurrent program is generally much more difficult than that of sequential program. This is because the program exhibits a behavior which is not expected by the programmer at a certain timing because of the nondeterminism of the program due to concurrency. In testing and debugging of a concurrent program, bugs caused by concurrency (harmful nondeterminism) not expected by the programmer are detected one by one in test and eliminated. In this method, however, it is very difficult to completely eliminate bugs, and much labor is required.

In hyper serialization of the present invention, a concurrent program is translated into a sequential program, and only concurrency intended by the programmer is gradually introduced in the program. Eventually, after parallelizing portions automatically using parallelizing rules, the hyper sequential program is translated into a concurrent program.

More specifically, in hyper serialization of the present invention, instead of eliminating harmful nondeterminism from a concurrent program, intended nondeterminism (concurrency) is introduced in a sequential program. In hyper serialization, a concurrent program is translated from a sequential program in a bottom-up manner. For this reason, a bug cannot be generated at an unexpected timing, resulting in programming of a highly reliable program. In addition, the testing and debugging operation is largely facilitated. In serialization, a degradation in performance may be caused by serialization. However, since an automatic parallelization technique such as FORTRAN in the field of supercomputers or the like can be used, no practical problem is posed in many cases.

The basic arrangement and operation of the second embodiment have been described above. Detailed examples of the second embodiment will be described below.

(a) First Example

FIG. 14 is a view showing a concurrent program. Processes P1 and P2 are operated in a concurrent manner. The processes P1 and P2 access a shared memory M.

(1) Step A1: Modeling Concurrent System

A concurrent program P is described as in FIG. 15.

(2) Step B1: Setting of Sections

In this case, assume that each instruction forms one section. To simplify the description, the section ID is defined as an instruction itself.

(3) Step A2: Serializing Concurrent Program

Sequential program programming is performed by introducing a process priority. More specifically, P1>>P2 (the process P1 is preferentially executed over the process P2). At this time, the execution order of serialized sections is represented as follows:

$$init1 \rightarrow read1 \rightarrow write1 \rightarrow read2 \rightarrow write2$$

A hyper sequential program translated by serialization is constituted by section information, program information, and hyper sequential information, as shown in FIGS. 16A to 16C. The serialization information is an execution order represented by a Petri net.

(4) Step A3: Testing and Debugging Hyper Sequential Program

The hyper sequential program is executed. If a bug is detected, the source code of each section or an original concurrent program is corrected. In this case, it is assumed that no bug has been detected.

(5) Step A4: Introduction of Intended Nondeterminism for Hyper Sequential Program The Petri net of the serialization information is displayed on the display unit, and the sequential relationship is cut off to perform parallelization. In this case, the sequential relationship between write1 and read2 is disconnected (FIG. 17(a)). Write1 and read2 can be disconnected because they have no execution order relationship in the program structure information. In this step, an information relating to whether which sequential relationship should be cut off or not can be provided on the basis of a analysis information 20 described later.

(6) Step A5: Test/Debug Operation

The hyper sequential program in which concurrency is introduced is executed. In this case, the program can be executed such that $$init1 \rightarrow read1 \rightarrow write1 \rightarrow read2 \rightarrow write2,$$

or $$init1 \rightarrow read1 \rightarrow read2 \rightarrow write1 \rightarrow write2$$

If a bug is detected upon execution, the program should be corrected. In this case, it is assumed that no bug has been detected.

(7) Step B2: Automatic Parallelization

A preceding constraint between sections is obtained by the analysis information 20 from the data dependency relationship between the serialization information and the program information of the hyper sequential program. This preceding constraint is the analysis information. The preceding constraint is a restriction for the execution order between the sections having a data dependency relationship. More specifically, between the sections having the data dependency relationship, the calculation result may change depending on the execution order. Therefore, an order determined by the serialization information must be held. In this case, there are the following three preceding constraints:

$$init1 \rightarrow read2$$
$$init1 \rightarrow write2$$
$$read1 \rightarrow write2$$

For example, a value read by the process P1 in read1 is influenced by whether write2 of the process P2 occurs before or after read1. In the serialization information, read1→write2 is set as a preceding constraint.

As for sections having no preceding constraint, parallelization can be performed, and automatic parallelization can be performed in accordance with the parallelizing rule. Since no preceding constraint is present between read1 and read2, concurrency rule 1 (FIG. 13) can be applied (FIG. 17(b)).

(8) Step B3: Generation of Concurrent Programs

The source code of the concurrent program is translated from the program obtained by automatic parallelization. In this example, synchronization instructions (send and wait) for realizing serialization information 1 and serialization information 2 in FIG. 11 is embedded in the source code. The remaining serialization information is the serialization information (execution order) of the original concurrent program. The converted program is shown in FIG. 18.

The concurrent program is executed on a parallel computer having a structure as shown in FIG. 14.

The second example shows the procedures of hyper serialization performed when the concurrent program has a synchronization instruction, a loop structure, and a conditional branch.

(1) Modeling Concurrent System in step A1 and setting of sections in step B2 are omitted. Assume that a concurrent program having a section execution order (program structure information) as shown in FIG. 19 is given. Note that the concurrent program has synchronization instructions (send and wait) and a data dependency relationship (S13 and S22), and a loop structure and a condition branch.

(2) Step A2: Serializing Concurrent Program

Serialization is performed by introducing a priority (the process P1 has a higher priority than the process P2, i.e., P1>>P2) to the processes. The result of serialization is shown in FIG. 20. That is, the hyper sequential program has program structure information and serialization information in FIGS. 19 and 20 (section information is omitted). Note that the process execution order is changed in accordance with the synchronization instructions. For example, S21 of P2 is executed after execution of S12 of P1 by wait instruction. The loop and branch structures are also expressed by a Petri net.

(3) Step A3: Testing and Debugging Hyper Sequential Program

The hyper sequential program is executed. If a bug is detected, the source code of each section or the original concurrent program is corrected. In this case, it is assumed that no bug has been detected.

(4) Step A4: Introduction of Intended Nondeterminism for Hyper Sequential Program The Petri net of the serialization information is displayed on the display unit, and the sequential relationship is disconnected, thereby perform parallelization. It is explicitly assumed that no intended nondeterminism has been introduced.

(5) Step B2: Automatic Parallelization

Preceding constraints among sections are obtained from the data dependency relationship between the serialization information and the program information of the hyper sequential program. In this case, there is only one preceding constraint as S22→S13. As for the loop structure, a loop may be formed in the precede relationship. In this case, only the precede relationship in one loop attracts attention. As for sections having no preceding constraint, parallelization can be performed, and automatic parallelization can be performed in accordance with the parallelizing rule. A concurrent program in FIG. 21 can be finally obtained by parallelizing rule 1 and parallelizing rule 2 in FIG. 13.

(6) Step B3: Conversion of Concurrent Program

As in the first example, the concurrent program can be translated by embedding the synchronization instructions in the remaining serialization information.

(Third Embodiment)

Figure 22:
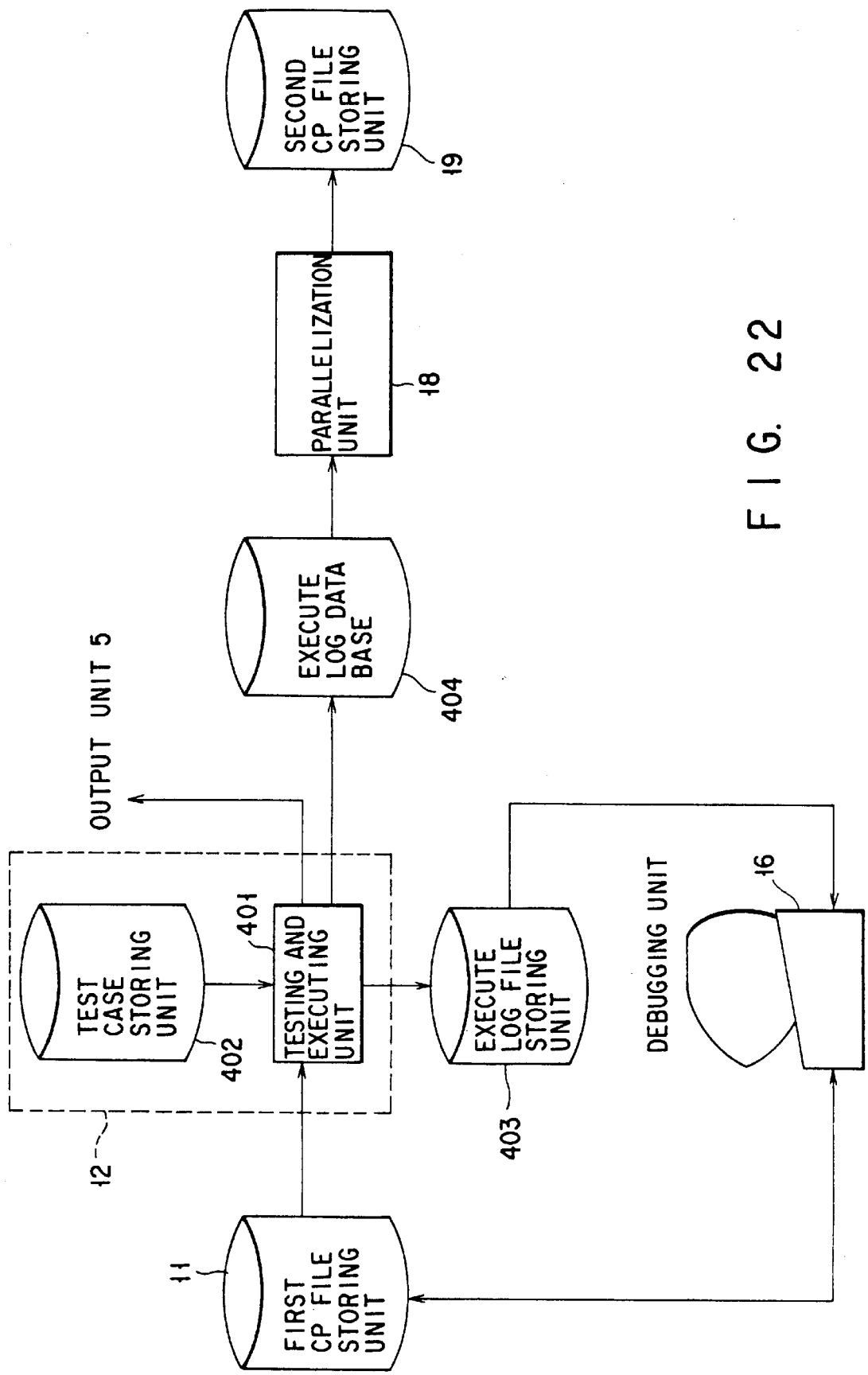
FIG. 22 is a block diagram schematically showing the arrangement of a parallelization supporting apparatus according to the third embodiment.
Figure 23:
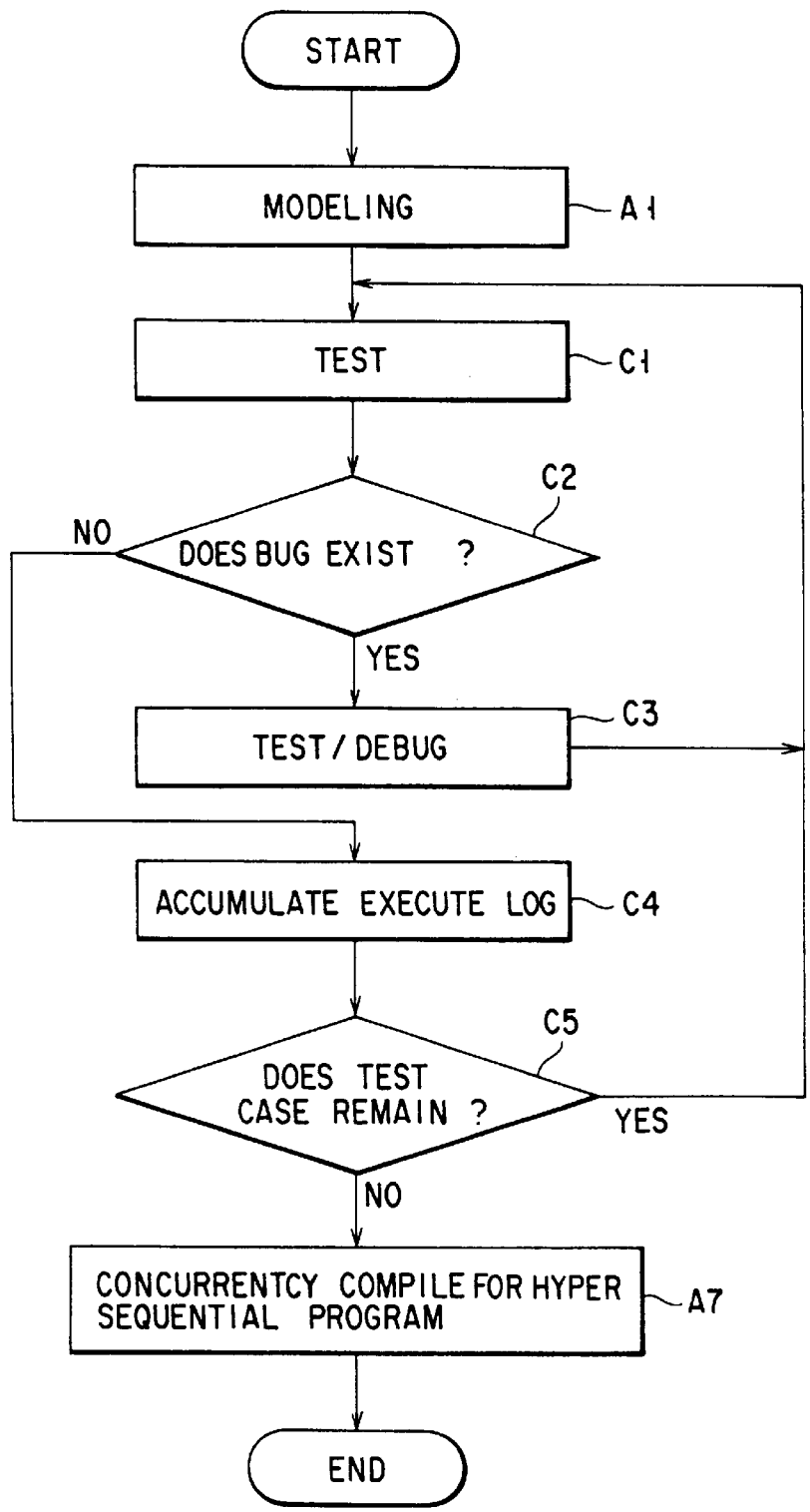
FIG. 23 is a flow chart schematically showing the procedures of a parallelization method according to the third embodiment.

FIG. 22 is a block diagram schematically showing the arrangement of a parallelization supporting apparatus according to the third embodiment. FIG. 23 is a flow chart schematically showing the procedures of a parallelization method according to the third embodiment.

In this embodiment, a serialization unit 12 is constituted by a testing and executing unit 401 and a test case storing unit 402. Unlike the above embodiments, the serialization unit 12 uses no particular serializing rule and performs concurrent programs sequentially in the random way. This embodiment will be described below in detail.

Concurrent programming in this embodiment is realized by the following procedures. In this case, as the first concurrent program, a simple concurrent program consisting of processes P1 and P2 which are independently operated is considered.

(1) Step A1: Modeling Concurrent System

Natural modeling using concurrency is performed for a target concurrent system. Each process structure of the concurrent system is determined. In addition, a concurrent program having a concurrent structure is described as a source program in each process in accordance with programming using a concurrent program. A latent bug may be present in this source program. In this case, the two processes P1 and P2 are translated as shown in FIG. 24.

(2) Step C1: Test

A test case is read out from the test case storing unit 402 by the testing and executing unit 401. The first concurrent program from a CP file storing unit 11 is executed sequentially, and the execution result is displayed on an output unit 5, thereby performing a random test.

In this case, assume that the execute log is as follows:

$$log1 = job11 \rightarrow job12 \rightarrow job21 \rightarrow job22$$

(3) Step C2: Finding Bugs

As a result of the test in step C1, if no bug is detected, the flow advances to step C4. Otherwise, the execute log is stored in an execute log storing unit 403, and the flow advances to step C3. If a bug is detected, the flow advances to step C3. In this case, it is assumed that no bug is detected, and the flow advances to step C4.

(4) Step C3: Test/Debug Operation

A bug based on the execute log stored in the execute log storing unit 403 is detected by using the output unit 5, and the first concurrent program stored in the CP file storing unit 11 is corrected to eliminate the bug by a debugging unit 16. Upon completion of the testing and debugging operation, the flow returns to step C1.

(5) Step C4: Accumulation of Execution Log

As a result of the test in step C1, if it is determined in step C2 that no bug is present, the execute log log1 is accumulated in an execute log data base 404. The execution log is hyper sequential execute series and is estimated as a special manner of the hyper sequential program.

(6) Step C5: Finding Presence/Absence of Remaining Test Case

It is determined whether any test case remains in the test case storing unit 402. If YES in step C5, the flow returns to step C1 to continue the test. If NO in step C5, the flow advances to step A7.

In this step, the flow returns to step C1 to examine another test case and continue the test. Assume that, in this second test, the execute log log2 shown below is stored in the execute log data base 404:

log2=job11→job21→job12→job22

(7) Step A7: Parallelizing Hyper Sequential Program

From the first concurrent program stored in the CP file storing unit 11 and the execute logs stored in the execute log data base 404, a concurrent program which executes only paths passing through the test is synthesized by a parallelization unit 18 and stored in a second CP file storing unit 19.

In this step, a concurrent program which executes only the two execute logs log1 and log2 stored in the execute log data base 404 is translated in accordance with the following procedures.

Figure 25A:
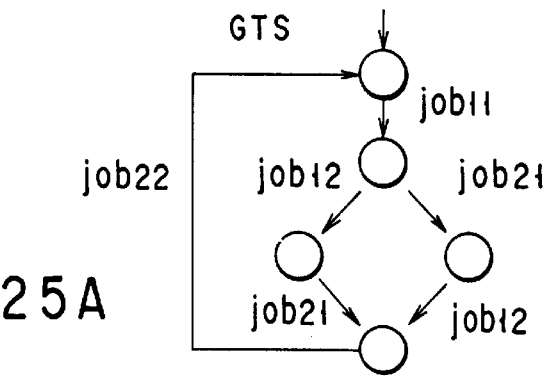
FIGS. 25A to 25C are views showing parallelization in the third embodiment.

(A) All execute logs are merged to generate a global transition system GTS (FIG. 25A).

Figure 25B:
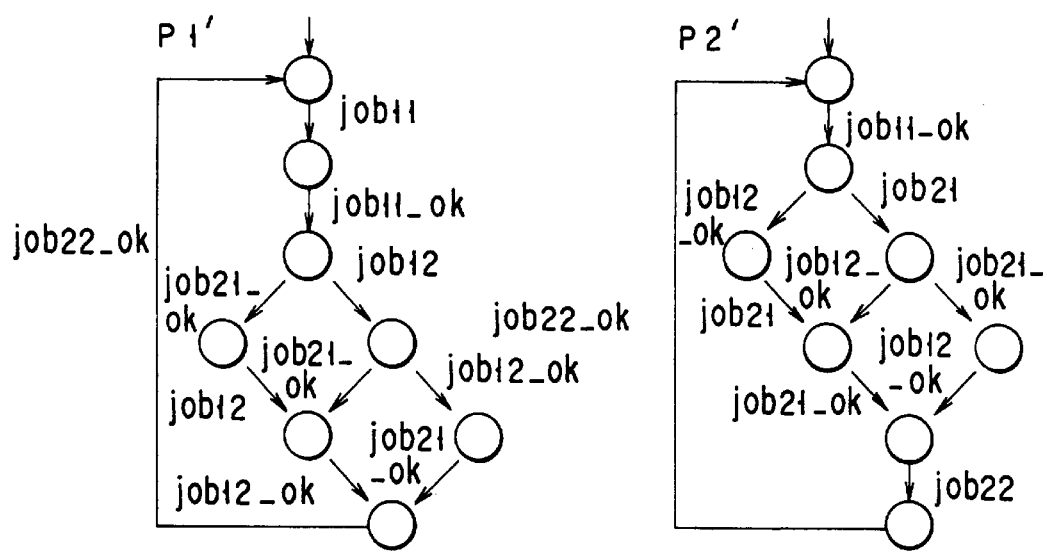

(B) The global status transition system GTS is projected on the two processes P1 and P2. At this time, a synchronization instruction for recognizing and synchronizing the behaviors of the processes is embedded. Synthesized programs are defined as P1' and P2' (FIG. 25B).

Figure 25C:
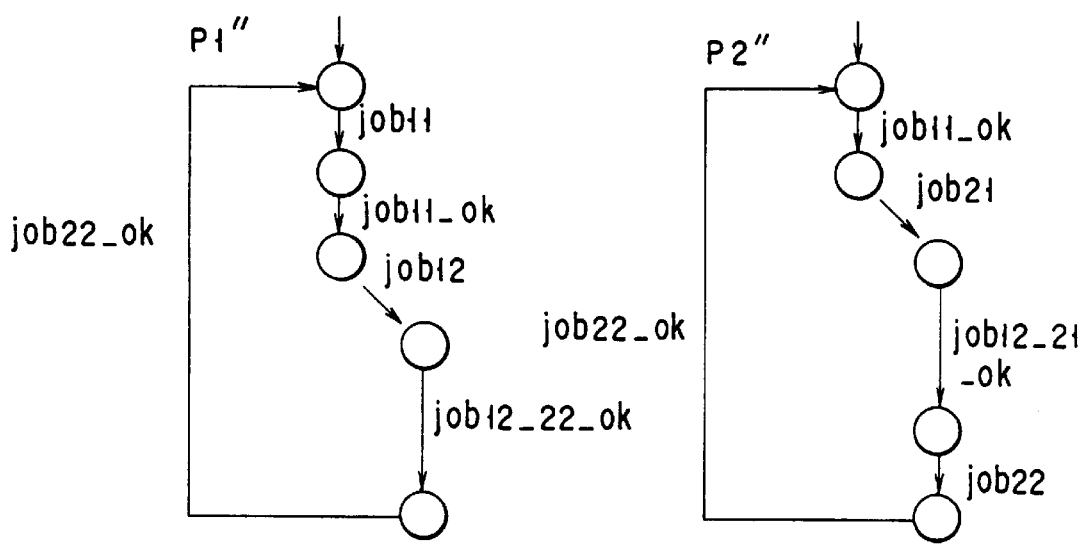

(C) Since the synchronization instructions of the programs P1' and P2' have a redundancy, this redundancy is eliminated. Processes finally obtained upon elimination of the redundancy are defined as P1" and P2" (FIG. 25C).

With the above procedures, a concurrent program CP" consisting of the two processes P1" and P2" can be translated. In this concurrent program CP", the execute logs log1 and log2 which are confirmed in the test to be properly operated can be executed. However, the following case which is not tested cannot be executed:

log3=job21→job11→job12→job22

As described above, since a case which is not tested cannot be executed, it is a highly safe program.

According to the third embodiment, a concurrent program can be translated with a difficulty almost the same as that for a sequential program, thereby user can effectively perform a test. In addition, since a portion which is not tested cannot be operated, a secondary effect such that a high reliability can be achieved.

(Fourth Embodiment)

FIG. 26 is a flow chart schematically showing the procedures of a parallelization method according to the fourth embodiment.

(1) Step A1: Modeling Concurrent System (2) Step A2: Serializing Concurrent Program (3) Step A3: Testing and Debugging Hyper Sequential Program The above steps A1 to A3 are the same as those shown in FIG. 4, and a detailed description thereof will be omitted.

(4) Step A4: Introduction of Intended Nondeterministic Portion for Hyper Sequential Program The user designates a portion which is nondeterministically operated (to be referred to as an "intended nondeterministic portion") for a hyper sequential program tested/debugged in step A3 by a nondeterminism introducing unit 17. The intended nondeterministic portion designated by the nondeterminism introducing portion 17 is reflected on the hyper sequential program as information associated with intended nondeterminism (information associated with concurrency). With this processing, the hyper sequential program is converted into a partial hyper sequential program having an intended nondeterministic portion. A method of designating an intended nondeterministic portion will be described later.

(5) Step A5: Testing and Debugging Partial Hyper Sequential Program

The partial hyper sequential program obtained in step A4 is tested/debugged. More specifically, the partial hyper sequential program in which an intended nondeterministic portion is introduced in step A4 is tested/debugged. In this case, when the partial hyper sequential program is to be converted into an execution form and executed, only the intended nondeterministic portion introduced in step A4 is converted into an execution form having a concurrent structure and executed while a portion in which no intended nondeterministic portion is introduced is converted into an execution form having the original sequential structure and executed. On the basis of the execution result, the hyper sequential program is tested/debugged. If the program converted into an execution form is not properly operated, the intended nondeterministic portion introduced to the sequential program before conversion is regarded as a portion which must not be substantially nondeterministically operated, and parallelization is canceled.

(6) Step A6: Extension of Intended Nondeterministic Portion in Hyper Sequential Program Information associated with intended nondeterminism is added to the partial hyper sequential program tested/debugged in step A5. Steps A4 to A6 are repeated a predetermined number of times to gradually extend intended nondeterminism.

(7) Step A7: Parallelizing Hyper Sequential Program

Default serialization of the partial hyper sequential program managed by the default serialization of meta-level is canceled (e.g., serialization information and concurrent information are directly embedded in the source program itself). At this time, a harmless nondeterministic portion is extracted from a portion of the partial hyper sequential program, in which information associated with intended nondeterminism is not introduced. Concurrent programming of this portion is examined to increase the concurrency of the partial hyper sequential program. For example, as for the portion in which information associated with intended nondeterminism is not introduced, the dependency relationship between processes is analyzed, and the serialization of a portion of the source program, which corresponds to a portion determined to have no dependency relationship, is canceled. Note that extraction of the harmless nondeterministic portion is performed with reference to concurrent information analyzed in serialization in step A2.

A parallelization method and a parallelization supporting apparatus according to the fourth embodiment will be described below in detail.

This embodiment is characterized in that a hyper sequential graph displayed on the output unit 5 is used to realize visual introduction of a nondeterministic portion. A hyper sequential graph is a transition graph representing the process processing order of the hyper sequential program in which default serialization is introduced with respect to a concurrent program having a concurrent structure. The hyper sequential graph is displayed on the basis of serialization information. The serialization information is generated upon conversion of a concurrent program into a hyper sequential program by a serialization unit 12.

Figures 27, 28:
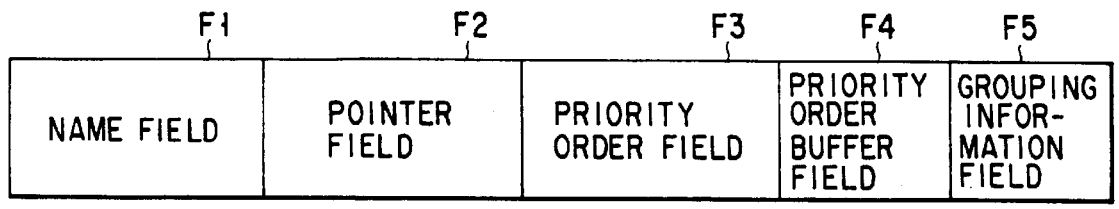
FIG. 27 is a view showing a process table used in the fourth embodiment.
FIG. 28 is a view showing a concurrent program so as to explain the operation of the fourth embodiment.

More specifically, the serialization information is a data string group called a process table having predetermined fields. FIG. 27 is a view showing the structure of the process table.

Referring to FIG. 27, a name field F1 holds names for identifying the respective processes. A pointer field F2 holds the pointer of a target call process list table (not shown) for storing a name list of a process to be called (to be referred to as a "target call process" hereinafter) from the processes. The target call process list table is independently arranged. A priority order field F3 holds the process priority order. The process priority order is determined by the serialization unit 12 on the basis of a program having the original concurrent structure when a plurality of processes can be executed at a certain process point, and the result is described in this field. The value of the priority order field F3 is changed by the nondeterminism introducing unit 17, as will be described later. For this reason, a priority order buffer field F4 holds the priority order before the change, thereby enabling restoration of a state before the change. A grouping information field F5 holds information for identifying among groups when a specific node group is formed. The name of the process in a process group corresponding to the grouped node group, which is executed first, is written in the grouping information field F5.

The serialization unit 12 of this embodiment will be described below.

Figure 29:
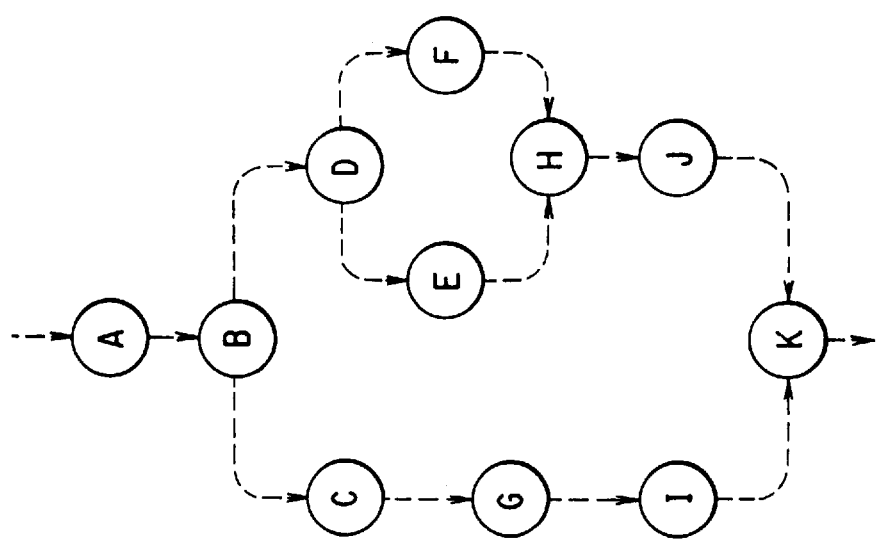
FIG. 29 is a view showing the concept of the concurrent structure of the concurrent program in FIG. 28.
Figure 30A:
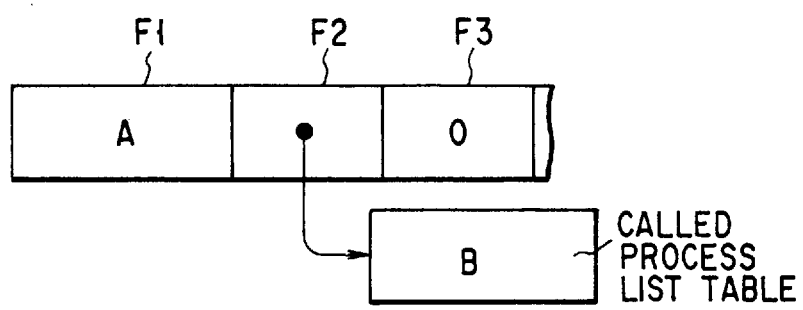
FIGS. 30A to 30E are views showing process tables formed upon analysis of the structure of the concurrent program used in the fourth embodiment.
Figure 30B:
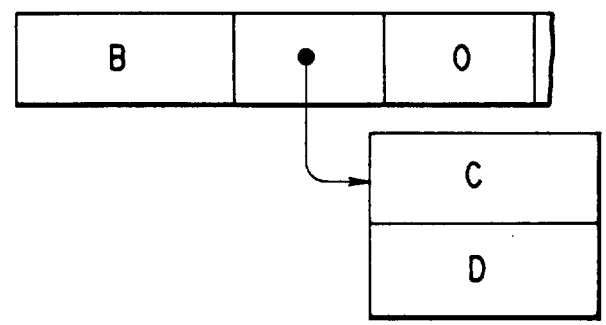
Figure 30C:
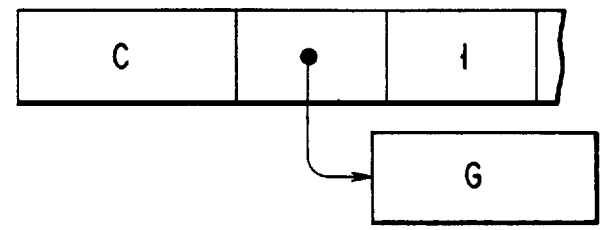
Figure 30D:
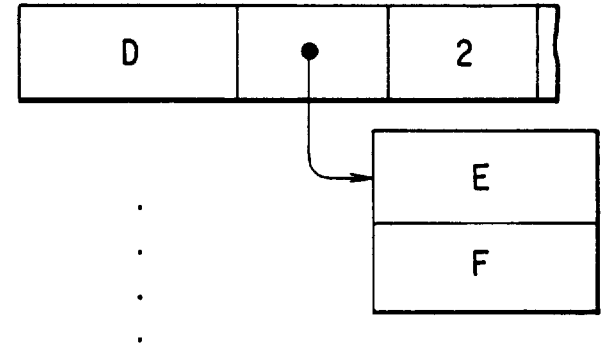
Figure 30E:
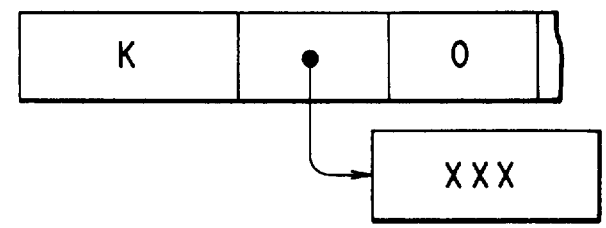

Assume that a concurrent program as shown in FIG. 28 is read in the serialization unit 12. The serialization unit 12 analyzes the concurrent structure of the concurrent program. It is analyzed that the concurrent program shown in FIG. 28 conceptually has a concurrent structure as shown in FIG. 29. This analysis can be realized by using, e.g., a tree structure search algorithm. The serialization unit 12 writes the analysis result in the process table. More specifically, the serialization unit 12 writes the priority order in the priority order field F3 of the process table shown in FIG. 27 to introduce default serialization, thereby converting the program into a hyper sequential program. That is, referring to FIG. 29, after a process B is processed, a process C or D is processed depending on, e.g., the system environment at that point of time. In this case, the serialization unit 12 uniquely determines the priority order in accordance with a predetermined rule (serializing rule). Note that the predetermined rule can be freely set by the user in accordance with various situations although the priority order can be determined in accordance with a process read order or random numbers. Note that the hyper sequential program in this embodiment is conceptually constituted by a source program and serialization information for managing the source program at a meta-level.

Assume that it is determined in accordance with a predetermined rule that the process C is preferentially processed over the process D. In this case, "1" is written in the priority order field F3 of the process C in the process table while "2" is written in the priority order field F3 of the process D in the process table. As for processes which do not require determination of the priority order, "0" is continuously set in the priority order field F3. Determination of the priority order is performed between processes at the same hierarchical level. For example, processes C, G, and I and processes D, H, and J in FIG. 29 are processes at the same level. However, processes E and F are at a hierarchical level lower by one.

In this manner, the serialization unit 12 analyzes the concurrent structure of the concurrent program to generate serialization information (process table) and records the information in the file.

FIGS. 30A to 30E are views showing the contents of the process table formed upon analysis of the structure of the concurrent program by the serialization unit 12. FIGS. 30A to 30E show the contents of the fields in the respective records corresponding to processes A to K. More specifically, the process B is called subsequently to the process A, and the priority order of the process A is "0". In the process B, it is indicated that the process C or D is subsequently called, and the processes C and D are substantially nondeterministic. The priority orders "1" and "2" are respectively assigned to the processes C and D by the serialization unit 12. This means that the process C is preferentially called (executed) over the process D.

Introduction of information associated with intended nondeterminism (i.e., a method of designating an intended nondeterministic portion) will be described below. Introduction of an intended nondeterministic portion is performed by an interactive operation by the user using the nondeterminism introducing unit 17 shown in FIG. 3. More specifically, the nondeterminism introducing unit 17 displays a hyper sequential graph on the output unit 5. The user uses an input unit 4 to introduce/cancel an intended nondeterministic portion for the hyper sequential graph.

Figure 31:
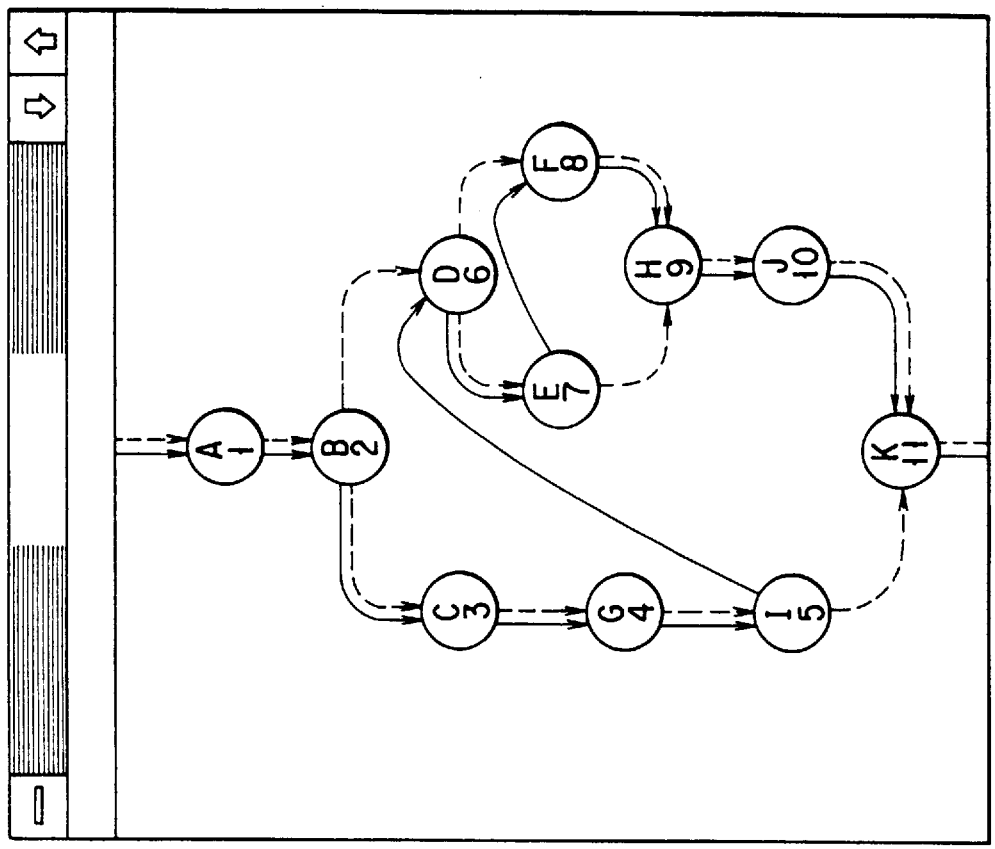
FIG. 31 is a view showing a hyper sequential graph used in the fourth embodiment.

FIG. 31 is a view showing a hyper sequential graph. Referring to FIG. 31, each node represents a corresponding process, and arcs indicated by broken arrows represent the concurrent structure of the original concurrent program. Solid arrows indicate the sequential structure of processes, which is determined by introducing default serialization by the serialization unit 12. The process execution orders are assigned with continuous numbers in accordance with the sequential structure. In the original concurrent program, the processes C→G→I and the processes D→E→F→H→J are originally described to be processed in a concurrent manner. In the hyper sequential program, however, the processes C→G→I are sequentially processed, and thereafter, the process D and the subsequent processes are processed.

The user can visually grasp such a hyper sequential graph by the output unit 5. The user can also visually grasp the hyper sequential graph at the output unit 5 by designating to display the hyper sequential graph after the concurrent program is converted into a sequential program by the serialization unit 12 to generate the serialization information. In this embodiment, the hyper sequential graph is displayed by a hyper sequential graph display control unit 30 of the nondeterminism introducing unit 17. Upon reception of a designation for displaying the hyper sequential graph from the user, the hyper sequential graph display control unit 30 starts to display the hyper sequential graph in accordance with a predetermined incorporated program.

Figure 32:
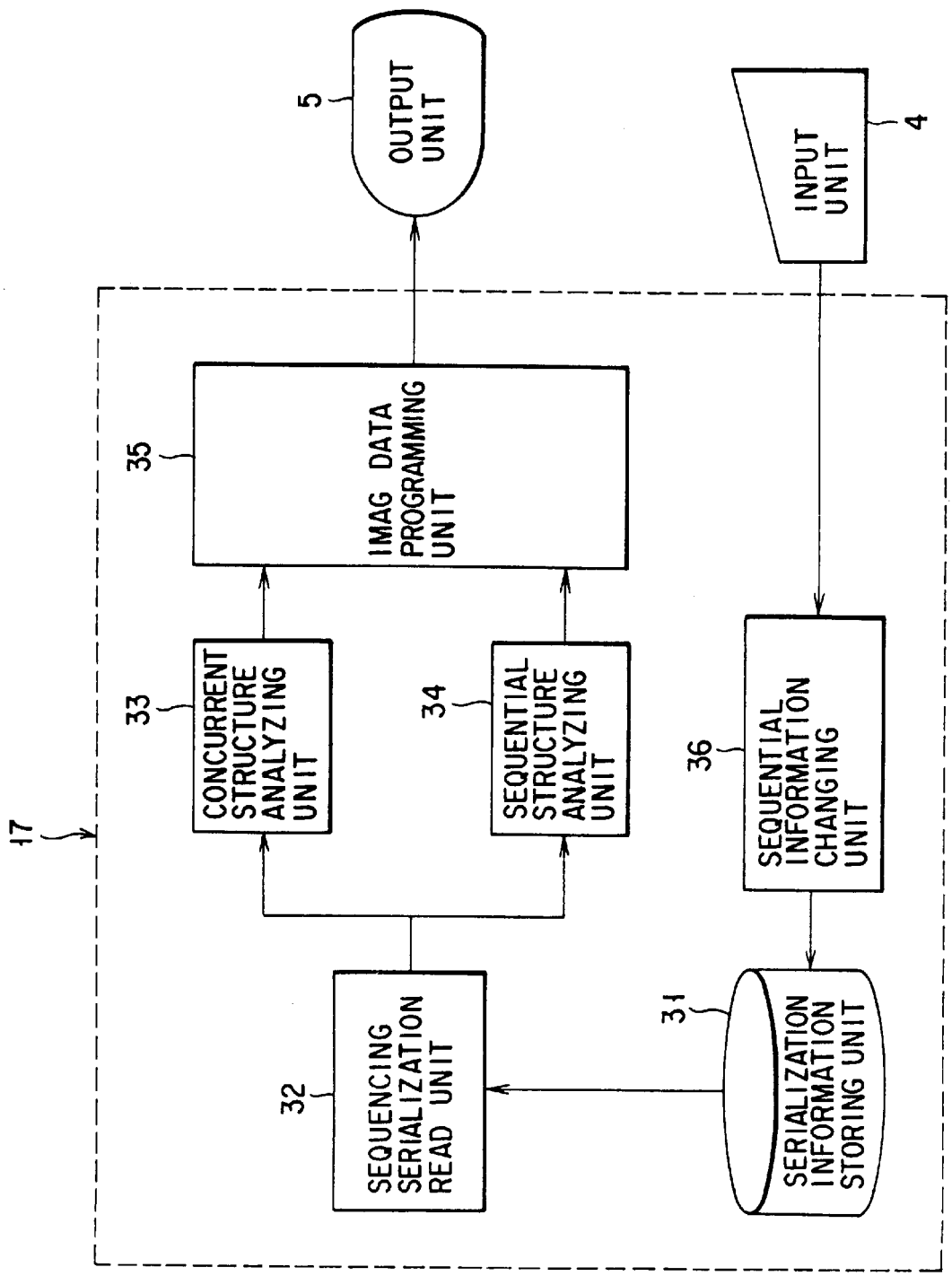
FIG. 32 is a view for explaining the operational processing of a hyper sequential graph programming unit in the fourth embodiment.

FIG. 32 is a function block diagram showing the arrangement of the hyper sequential graph display control unit 30.

The hyper sequential graph display control unit 30 determines nodes corresponding to the respective processes and an arc corresponding to the concurrent structure and the sequential structure, which represent a call relationship between nodes, in accordance with the serialization information stored in a sequencing information storing unit 31. An image data programming unit 35 converts these pieces of information into image data required for display at the output unit 5.

A serialization information read unit 32 reads the serialization information from the serialization information storing unit 31 and sends the serialization information to a concurrent structure analyzing unit 33 and a sequential structure analyzing unit 34.

The concurrent structure analyzing unit 33 and the sequential structure analyzing unit 34 analyze the concurrent structure with reference to the serialization information. More specifically, the concurrent structure analyzing unit 33 refers to the target call process list table designated by the pointer field F2, thereby specifying a call relationship between process names which can be called by the process described in the name field F1. In addition to this field, the sequential structure analyzing unit 34 also refers to the priority order described in the priority order field F3, thereby specifying the sequential structure. The analysis result by the concurrent structure analyzing unit 33 and the sequential structure analyzing unit 34 is sent to the image data programming unit 35. The image data programming unit 35 generates image data for displaying nodes corresponding to the respective processes and image data for displaying two arcs (i.e., one corresponding to the concurrent structure and the other corresponding to the sequential structure) for connecting the call relationship between the processes on the basis of the received analysis result and outputs the image data to the output unit 5. The output unit 5 displays a transition graph (i.e., a hyper sequential graph) on the basis of the image data.

In displaying the hyper sequential graph, it is preferable to generate image data by adding a connection relationship between the nodes having the sequential structure, which is accordingly analyzed by the sequential structure analyzing unit 34, to the connection relationship between the nodes having the concurrent structure, which is analyzed by the concurrent structure analyzing unit 33. In other words, the hyper sequential graph preferably holds the concurrent structure of the original concurrent program. With this processing, the user can introduce an intended nondeterministic portion for the processing flow (processes) of the sequential program while recognizing the concurrent structure of the original concurrent program.

When the hyper sequential graph is displayed on the output unit 5, the nondeterminism introducing unit 17 in FIG. 3 is set in a state for waiting input of an intended nondeterministic portion by the user. At the start of testing and debugging of the (partial) hyper sequential program, no nondeterministic portion is introduced. Therefore, arcs for the sequential structure are provided to all the nodes on the output unit 5, and no concurrent information is displayed. The concurrent information means information applied to a node in which an intended nondeterministic portion is introduced. The concurrent information is visually (by, e.g., the density of shading or coloring) discriminated on the display depending on whether the intended nondeterministic portion is introduced and displayed. The concurrent information is also visually discriminated and displayed for an intended nondeterministic portion having a hierarchical structure.

Introduction of an intended nondeterministic portion by the user is performed by using the input unit 4. A method of introducing an intended nondeterministic portion will be described later in detail. To briefly describe it, introduction is performed by disconnecting or connecting the connection relationship (arc) of the sequential structure between the nodes by using the input unit 4. As a result, the contents of the serialization information storing unit 31 are changed by a serialization information changing unit 36. The changed contents are read by the serialization information read unit again and displayed on the output unit 5.

A detailed operation example of introduction of an intended nondeterministic portion will be described.

Figure 33:
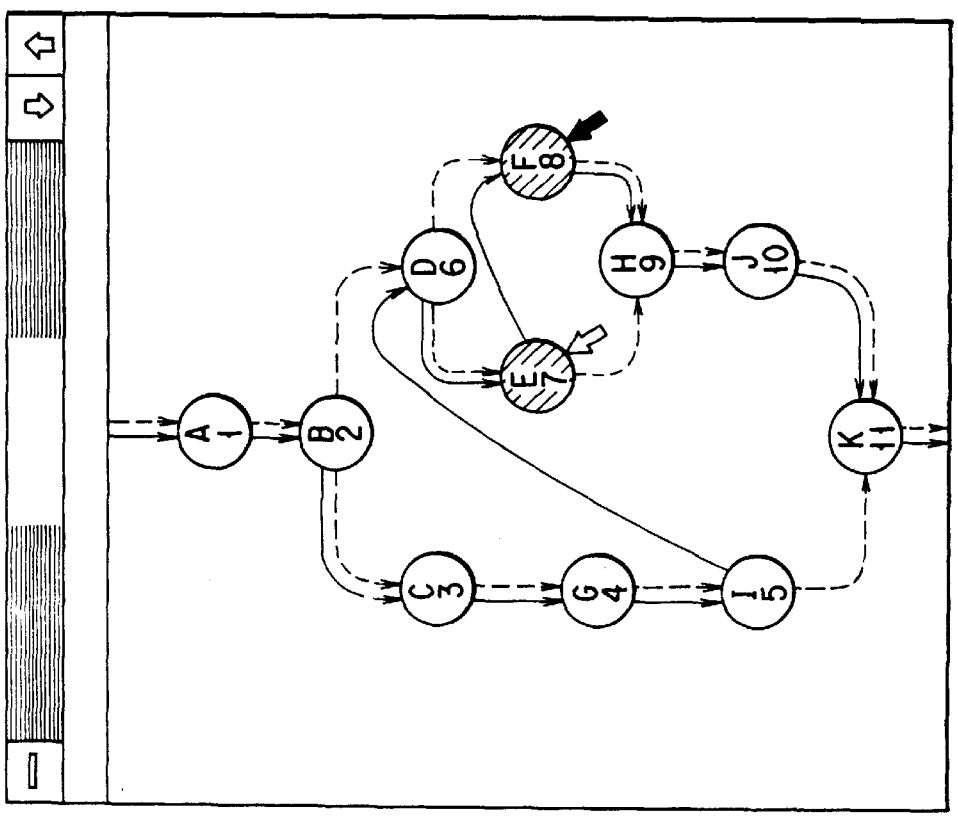
FIG. 33 is a view for explaining a method of designating a concurrent portion in the fourth embodiment.

FIG. 33 is a view for explaining a method of introducing an intended nondeterministic portion.

When intended nondeterminism is to be introduced for a plurality of processes, desired nodes corresponding to the processes are continuously designated in a intended nondeterminism introduction mode. The intended nondeterminism introduction mode is selected by, e.g., a designation operation menu and set.

Referring to FIG. 33, if concurrency between the processes E and F is to be allowed, the nodes E and F are continuously designated by a cursor P operated by the input unit 4. The designated nodes are shaded to be visually discriminated from the remaining nodes which are not designated. When all the target nodes are completely designated, the user informs it to the nondeterminism introducing unit 17. With this operation, the serialization information changing unit 36 causes the current value of the priority order field F3 of the corresponding process in the process table in the serialization information storing unit 31 to correspond to the priority order buffer field F4 and at the same time changes the value of the priority order field F3 to "0".

That is, in this embodiment, the values "1" and "2" of the processes E and F in the priority order field F3 are caused to correspond to the priority order buffer field F4, and at the same time, the values of these processes in the priority order field F3 are changed to "0". After the serialization information storing unit 31 is updated by the serialization information changing unit 36, the hyper sequential graph is displayed on the output unit 5 again. At this time, no priority order is set between the processes E and F, so the arc of the corresponding sequential structure is not displayed. That is, it is confirmed on the output unit 5 that the processes E and F are operated in a concurrent manner.

Figure 34:
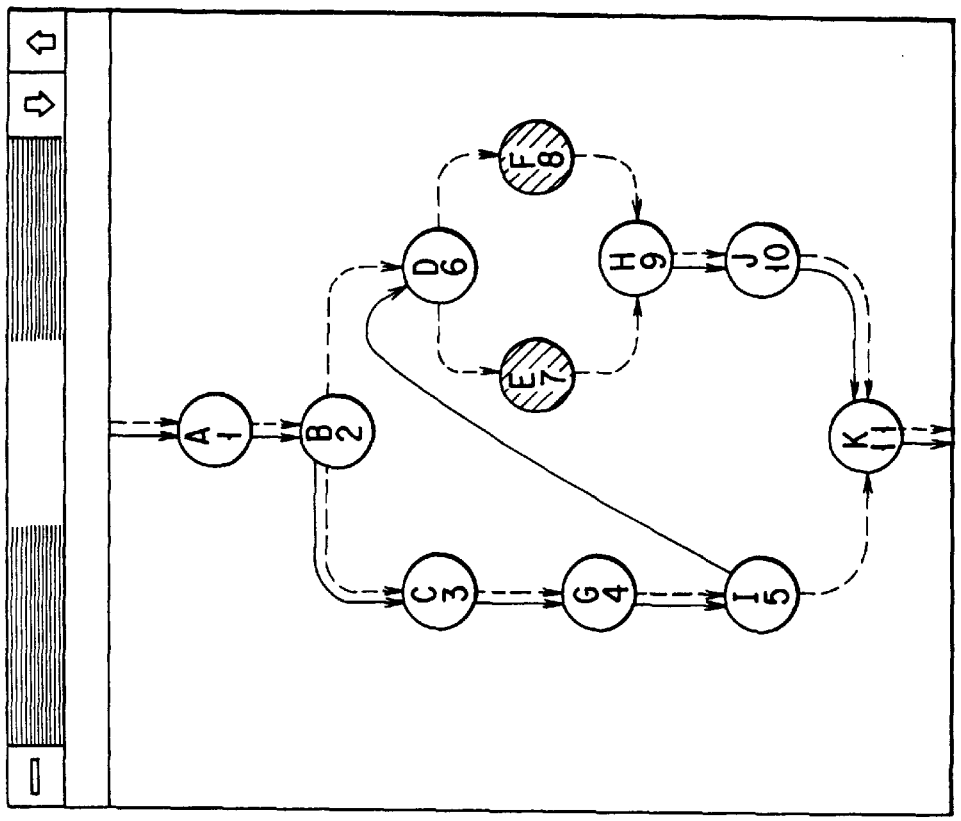
FIG. 34 is a view showing the hyper sequential graph after designation of the concurrent portion in the fourth embodiment.

FIG. 34 is a view showing a hyper sequential graph in which intended nondeterminism is introduced in the above case.

The program in which the intended nondeterministic portion is introduced in the above manner (partial sequential program) is converted into an execution form by a testing and executing unit 15, and a test is executed. The user confirms on the basis of the execution result by the testing and executing unit 15 whether the program is properly operated. This operation confirmation must be executed for all paths based on concurrency. If the testing and executing unit 15 is not properly operated, the portion in which the intended nondeterministic portion is introduced can be regarded as a portion which does not substantially allow parallelization. For this reason, the user designates to cancel parallelization.

Concurrent programming is canceled in a nondeterministic portion cancel mode by a designation as in introduction of an intended nondeterministic portion. With this operation, the serialization information changing portion 36 returns the values stored in the priority order buffer field F4 in the process table in the serialization information storing unit 31 to the priority order field F3.

In this embodiment, in introduction of an intended nondeterministic portion, grouping at each hierarchical level can also be performed.

For example, since the group (to be referred to as group 1) of the processes C, G, and I and the group (to be referred to as group 2) of the processes D, H, and J are at the same hierarchical level, these groups can be operated in a concurrent manner. When these processes are independently operated, the operability becomes poor. Therefore, grouping of these processes is effective. This grouping is performed by selecting a grouping mode. More specifically, in the grouping mode, when target nodes are sequentially selected, and completion of selection is informed, the target nodes are grouped and displayed as a new single node.

Figure 35:
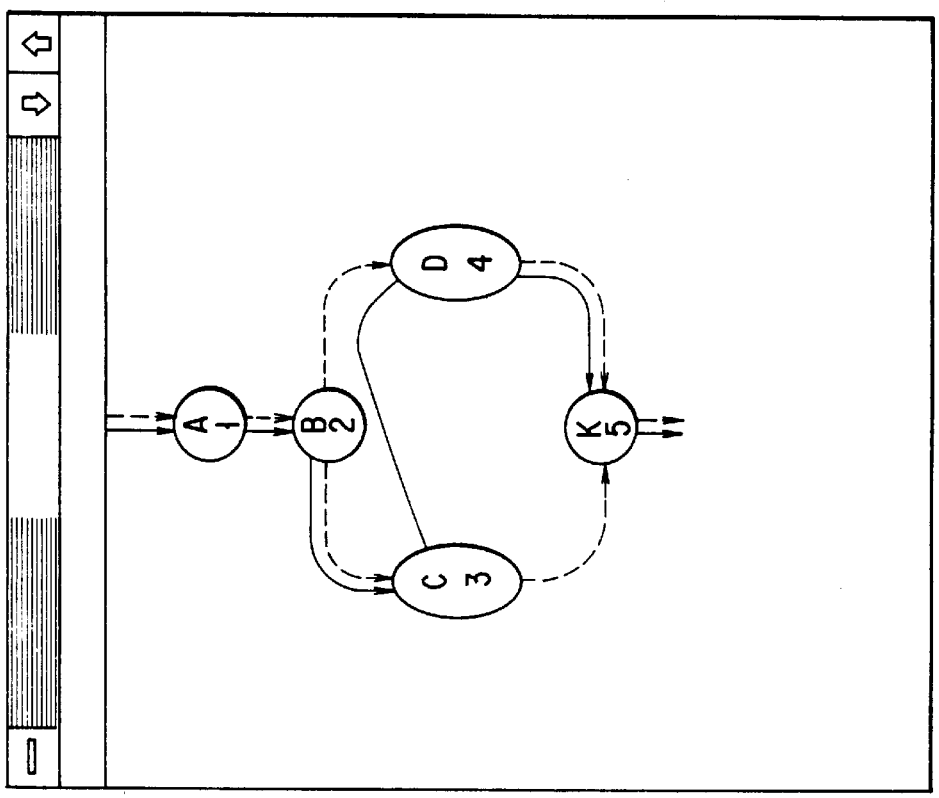
FIG. 35 is a view showing the hyper sequential graph having a grouped node.

FIG. 35 is a view showing a hyper sequential graph having grouped nodes.

Referring to FIG. 35, the nodes of groups 1 and 2 are indicated by ellipses to be visually discriminated from the remaining nodes which are not grouped. Group 2 has a lower hierarchical level (processes E and F) and displayed with shading. The user can designate an intended nondeterministic portion for this hyper sequential graph. Note that, even when an intended nondeterministic portion is introduced in the grouped hyper sequential graph, only an operation for changing the priority order field F3 of the start processes (processes C and D) is required.

When an intended nondeterministic portion is to be introduced in the node of the hyper sequential graph, a desired node is directly designated by the input unit 4, as described above. Instead of this method, a node may be designated by enclosing a specific node group or designating an area overlapping a specific node group.

Since there are many processes and many corresponding nodes, it may be sometimes difficult to make confirmation on the output unit 5. In this case, only node groups can be displayed to cope with this problem.

In this embodiment, the priority order between the processes, which is determined by the serialization unit 12, can be changed. More specifically, the priority order between the target nodes is changed by designating a desired node in a priority order change mode.

Figure 36:
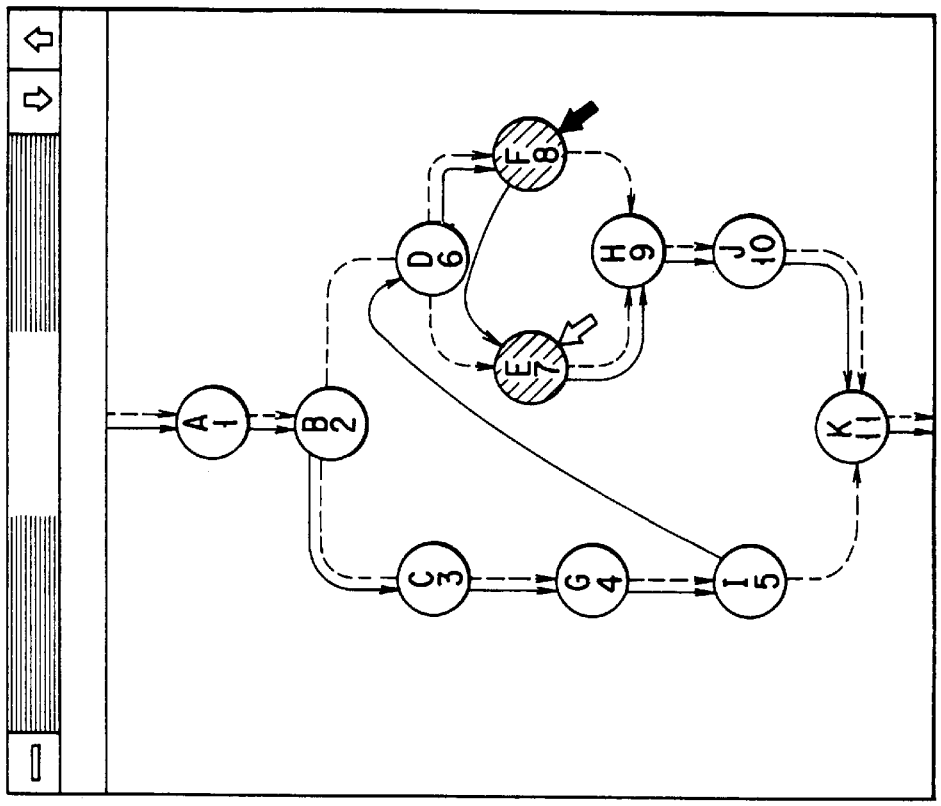
FIG. 36 is a view showing a hyper sequential graph after a change in priority order.

Assume that the priority order between the processes E and F in the hyper sequential graph in FIG. 33 is to be changed in the priority order change mode. The user designates the nodes E and F by the input unit 4, as described above, and informs completion of designation to the nondeterminism introducing unit 17. With this operation, the serialization information change unit 36 changes the value of the priority order field F3 of the process E in the process table in the serialization information storing unit 31 to "2", and the value of the priority order field F3 of the process F to "1". With this processing, a new hyper sequential graph is displayed on the output unit 5. FIG. 36 is a view showing the hyper sequential graph at this time. As shown in FIG. 36, after the priority order is changed, arcs for the sequential structure are changed.

This change of the priority order between the processes can be effectively used to introduce an intended nondeterministic portion because the operation between the processes, which is intended by the user, can be guaranteed. More specifically, the user converts the hyper sequential program in FIG. 33 into an execution form by the testing and executing unit 15 and executes a test. Subsequently, the user similarly executes a test for the hyper sequential graph in FIG. 36 after the priority order is changed. With this operation, if both the test execution results are confirmed to be those intended by the user, it can be considered that either of processes E and F can be executed first. Therefore, an intended nondeterministic portion can be introduced.

In this embodiment, introduction of a nondeterminism between two processes has been described. The same operation can also be performed for three or more processes.

FIG. 37 is a view for explaining introduction of an intended nondeterministic portion among three processes. Concurrent programming can be allowed among the processes B, C, and D having a concurrent structure. In FIG. 37, however, parallelization is allowed only between the processes B and C. With introduction of an intended nondeterministic portion, a hyper sequential graph shown in FIG. 38 is obtained. More specifically, the hyper sequential graph shown in FIG. 38 indicates that the process D is executed after both the processes B and C are executed.

As described above, according to this embodiment, the concurrent information and the serialization information are simultaneously presented to the user by the hyper sequential graph displayed on the output unit 5. For this reason, the user can designate an intended nondeterministic portion while considering the original concurrent structure. In addition, the intended nondeterministic portion is designated/canceled not at the concurrent program description level but for the hyper sequential graph. Therefore, a concurrent program can be easily developed without requiring an advanced parallelization technique.

(Fifth Embodiment)

FIG. 39 is a block diagram of a parallelization supporting apparatus according to the fifth embodiment, in which an HSP file storing unit 14 and a nondeterminism introducing unit 17 in FIG. 3 are particularly shown in detail.

Referring to FIG. 39, the first concurrent program stored in a CP file storing unit 11 is subjected to serialization by a serialization unit 12, as in the above embodiments. An obtained hyper sequential program is stored in a serialization process list storing unit 51 in the HSP file storing unit 14. Note that the hyper sequential program is already debugged in the serialized state by a debugging unit (not shown in FIG. 39) before it is stored in the serialization process list storing unit 51.

The translated hyper sequential program (serialization process) is converted into field data by a field data generating unit 53 and stored in a field data storing unit 52. The pieces of information of the serialization process list storing unit 51 and the field data storing unit 52 are stored in the HSP file storing unit 14 serving as an intermediate file. The field data from the field data storing unit 52 is edited by a field editor 55 through a field tuning section 54.

The nondeterminism introducing unit 17 is constituted by the field data generating unit 53, the field tuning section 54, and the field editor 55. The field data edited by the field editor 55 is converted into a concurrent program corrected by a parallelization unit 18 (field data conversion unit) and stored in a second CP file storing unit 19.

Figures 68, 69:
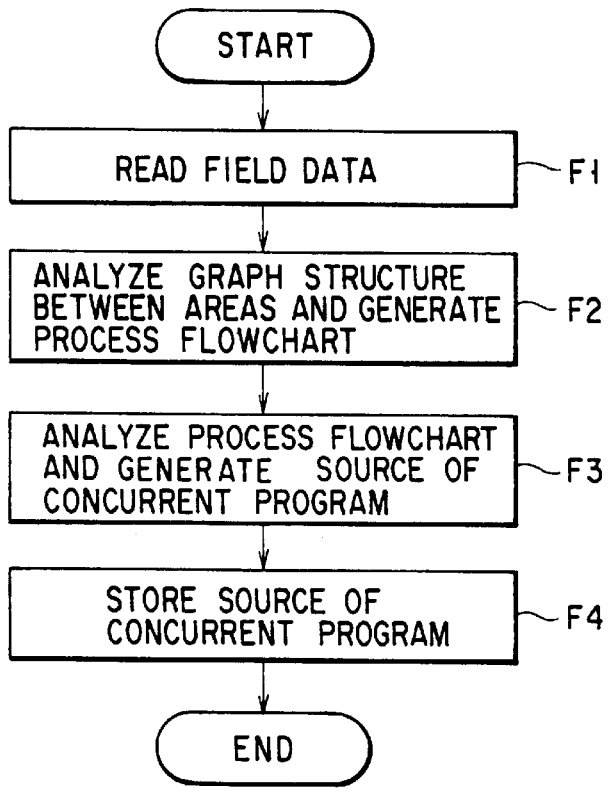
FIG. 68 is a flow chart showing processing executed in a field conversion unit in the fifth embodiment.
FIG. 69 is a view showing a corrected concurrent program in the fifth embodiment.

FIG. 40 is a view showing a first concurrent program stored in the CP file storing unit 11 in FIG. 39, in which a bug is intentionally included for the descriptive convenience. As a bug, processes P4 and P5 are erroneously executed in a concurrent manner while processes P3 and P6 can be executed in a concurrent manner. A correct concurrent program is shown in FIG. 69 (to be described later). FIG. 41 is a view of the image of the flow of processes executed by the first concurrent program in FIG. 40, in which the processes P4 and P5 and processes P7 and P8 are respectively executed in a concurrent manner. FIG. 42 is a view showing an example of serialization process stored in the serialization process list storing unit 51 in FIG. 39. Concurrent portions of the first concurrent program in FIG. 40 are assigned with a certain order in the serialization unit 12, thereby performing serialization.

FIG. 43 is a view showing the image of the flow of processes executed in FIG. 42. In this example, since serialization is accidentally performed in an order of the processes P4 and P5, a bug associated with this point is removed. If serialization is performed in an order of the processes P5 and P4, the above bug must be detected by a conventional debugging method. Therefore, erroneous parallelization (harmful nondeterminism) can be eliminated at the time of serialization.

Figure 44:
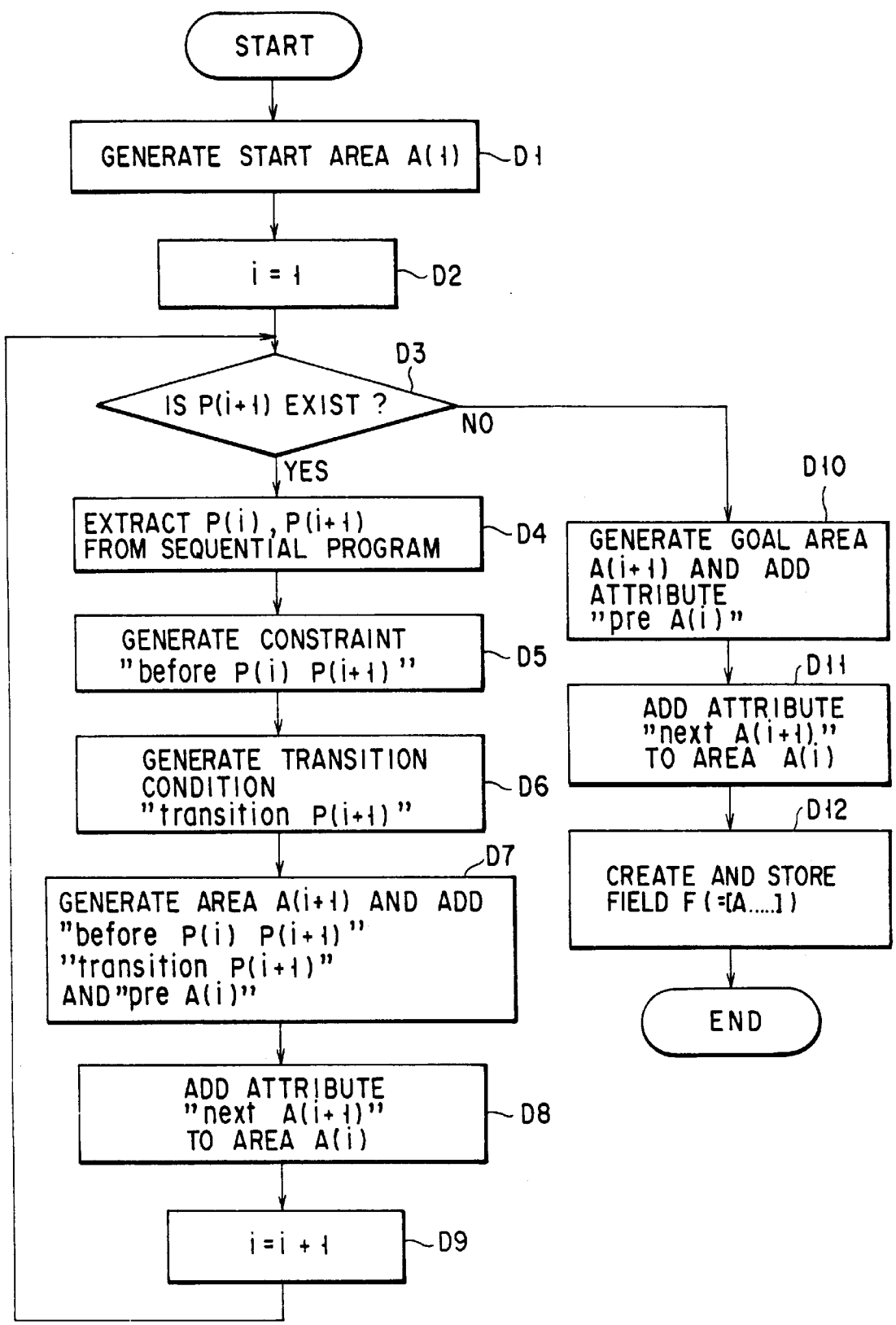
FIG. 44 is a flow chart showing the flow of processing executed in a field data generating unit in the fifth embodiment.

FIG. 44 is a flow chart showing the flow of processes executed in the field data generating unit 53 in FIG. 39. In this case, an advance from one process to another process is regarded as a range (area) where a certain constraint and transition condition are present, thereby converting a hyper sequential program (serialization process) into field data.

As shown in FIG. 44, a start area is generated in step D1, and steps D3 to D9 are repeatedly executed until the last process. In the last process, processes in steps E10 to E12 are executed, thereby ending processing. FIG. 45 is a view showing the data structure of a general area generated by processing shown in FIG. 44. A field is formed as an overall structure constituted by connection of this area.

The following information is described in an area A(i).

(1) In the area A(i), a constraint described in "constraint" is present (e.g., P(x1) is preferentially executed over P(x2)).

(2) A transition condition required for transition from the area A(i) to another area is described in "transition" (e.g., transition to an area A(j) is allowed upon completion of P(z1)).

(3) An area which allows transition from the area A(i) is an area A(j).

(4) A state before transition to the area A(i) is an area A(k).

FIG. 46 shows a state in which the program described in FIG. 42 is converted into a field constituted by a set of areas by processing shown in FIG. 44.

The strongest constraint in this field is that for the order relationship between processes. Introduction of nondeterminism can be realized by changing or eliminating this constraint. More specifically, nondeterminism is introduced by field tuning, thereby performing parallelization. Since this tuning is generally performed in accordance with the constraint, the constraint and transition conditions are presented to the user.

Figure 47:
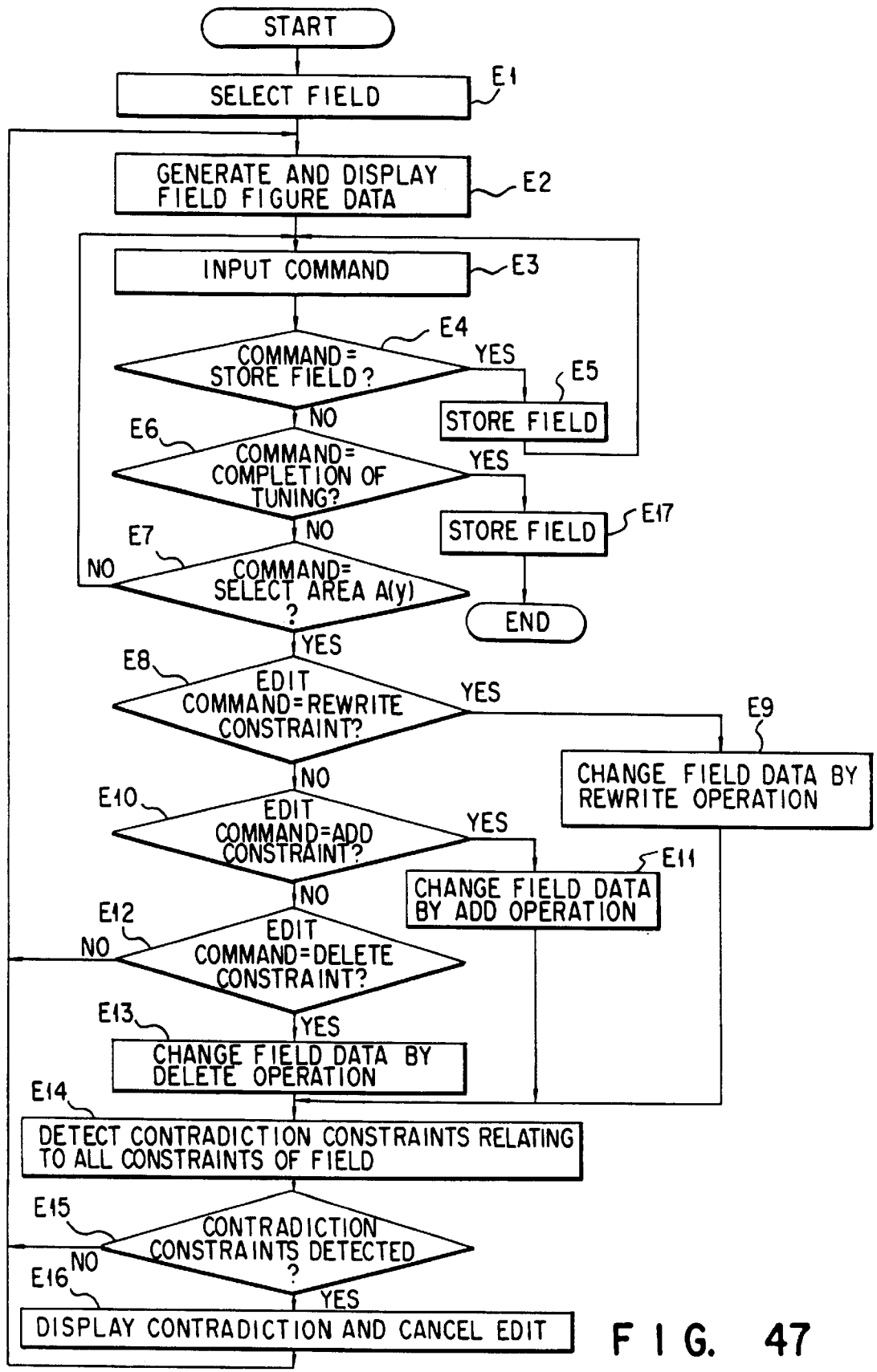
FIG. 47 is a flow chart showing the flow of processing executed in a field tuning section in the fifth embodiment.

FIG. 47 is a flow chart of processing executed in the field tuning section 54 in FIG. 39.

Field data is selected in step E1. In step E2, coupling information between the areas of the field data is analyzed to visually generate a field, and the field is displayed on the field editor 55. In step E3, the user inputs a command while checking the display of the field editor 55, thereby performing field tuning.

In step E5, the field during edition can be stored. If edition is completed, the processing is ended through step E17. Note that a contradiction constraint by edition is detected in steps E14 to E16.

Step E9 is a subroutine associated with constraint rewrite processing. Step E11 is a subroutine associated with constraint add processing. Step E13 is a subroutine associated with constraint delete processing.

Figure 48:
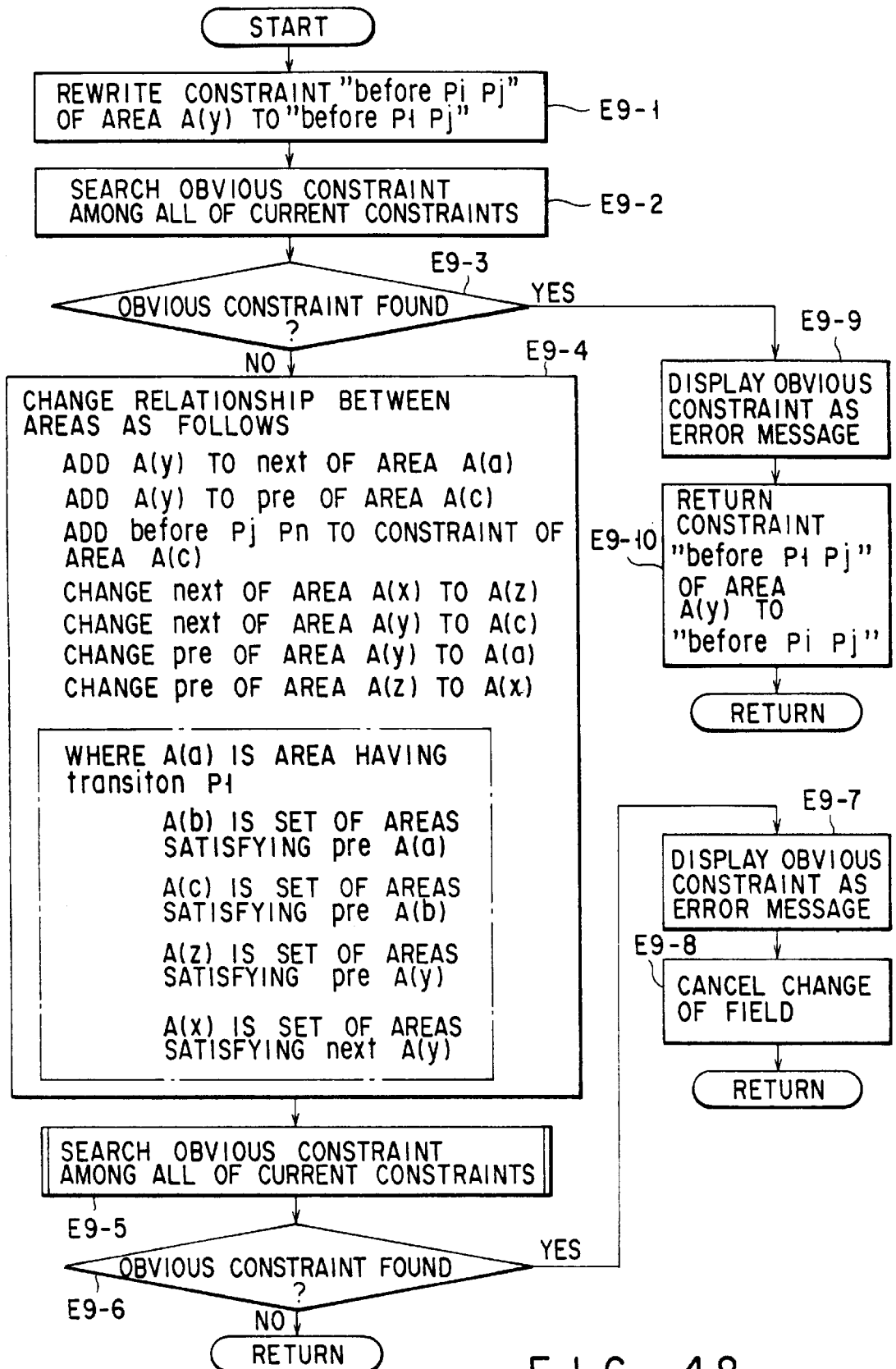
FIG. 48 is a view showing part of FIG. 47 (step E9) in detail.

FIG. 48 is a flow chart showing a subroutine for performing processing in step E9 in FIG. 47.

As for a constraint which is edited in step E9-1, the presence/absence of an obvious constraint is checked in step E9-2. If an obvious constraint is present, in step E9-9, the user is informed of an error present in constraint rewrite processing. In step E9-10, rewrite is invalidated. If no obvious constraint is present, the field is rewritten as in step E9-4. In steps E9-5 to E9-8, field check is performed.

Figure 49:
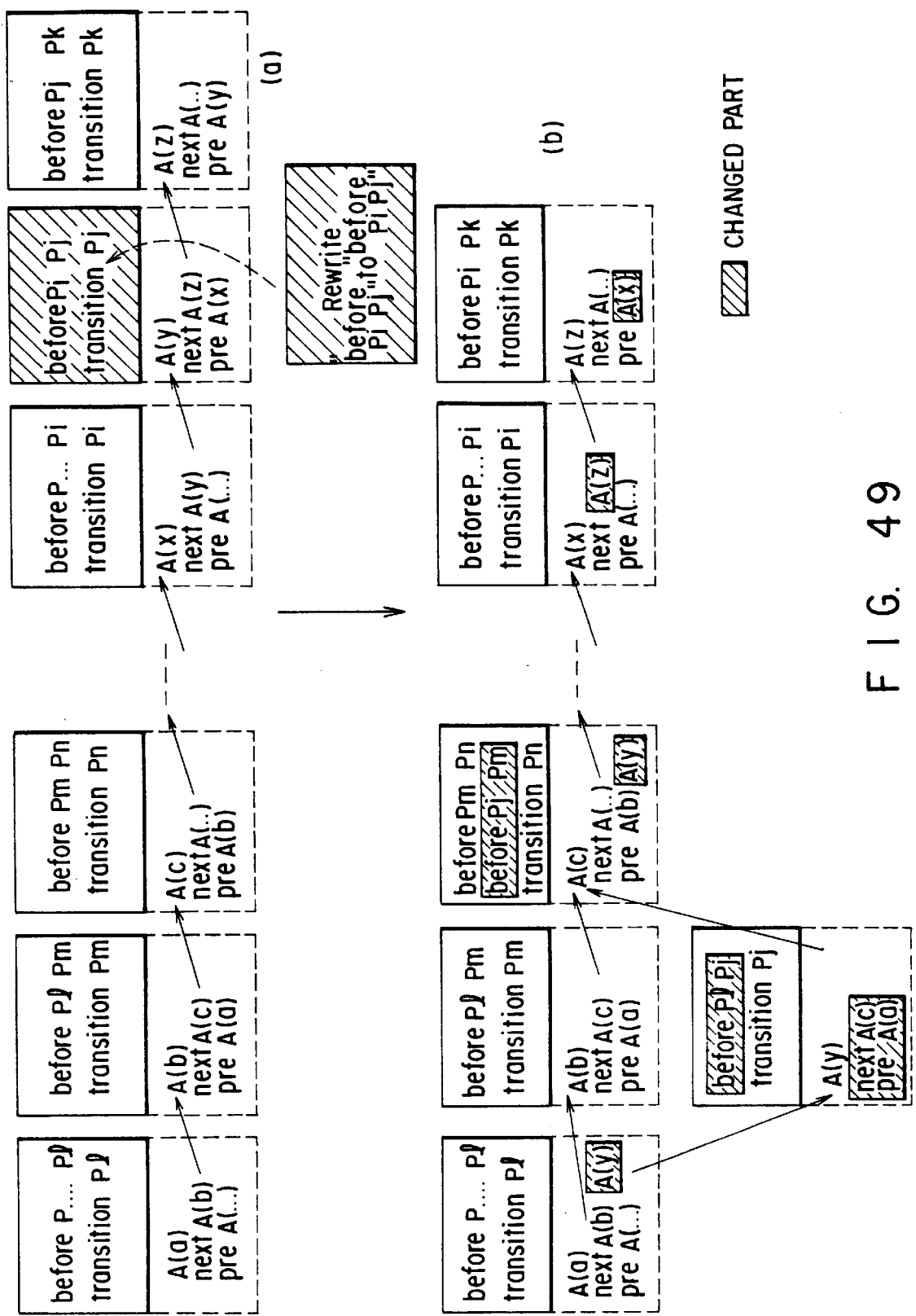
FIG. 49 is a view showing a change in field, which is caused by a constraint change operation in the fifth embodiment.

FIG. 49 is a view showing a change in field, which is caused by the algorithm of a constraint change operation in step E9-4 in FIG. 47. FIG. 49 shows a state in which "before Pi Pj" is changed to "before P1 Pj". The field is changed from (a) to (b) in FIG. 49. In this case, an area A(y) is connected to "next" of an area A(a), and the attributes of the areas change accordingly.

FIG. 50 is a flow chart showing a subroutine for performing processing in step E11 in FIG. 47. As for a constraint which is edited in step E11-1, the presence/absence of an obvious constraint is checked in step E11-2. If an obvious constraint is present, in step E11-9, the user is informed of an error present in constraint rewrite processing. In step E11-10, addition of the constraint is invalidated. If no obvious constraint is present, the field is rewritten as in step E11-4. In steps E11-5 to E11-8, field check is performed.

Figure 51:
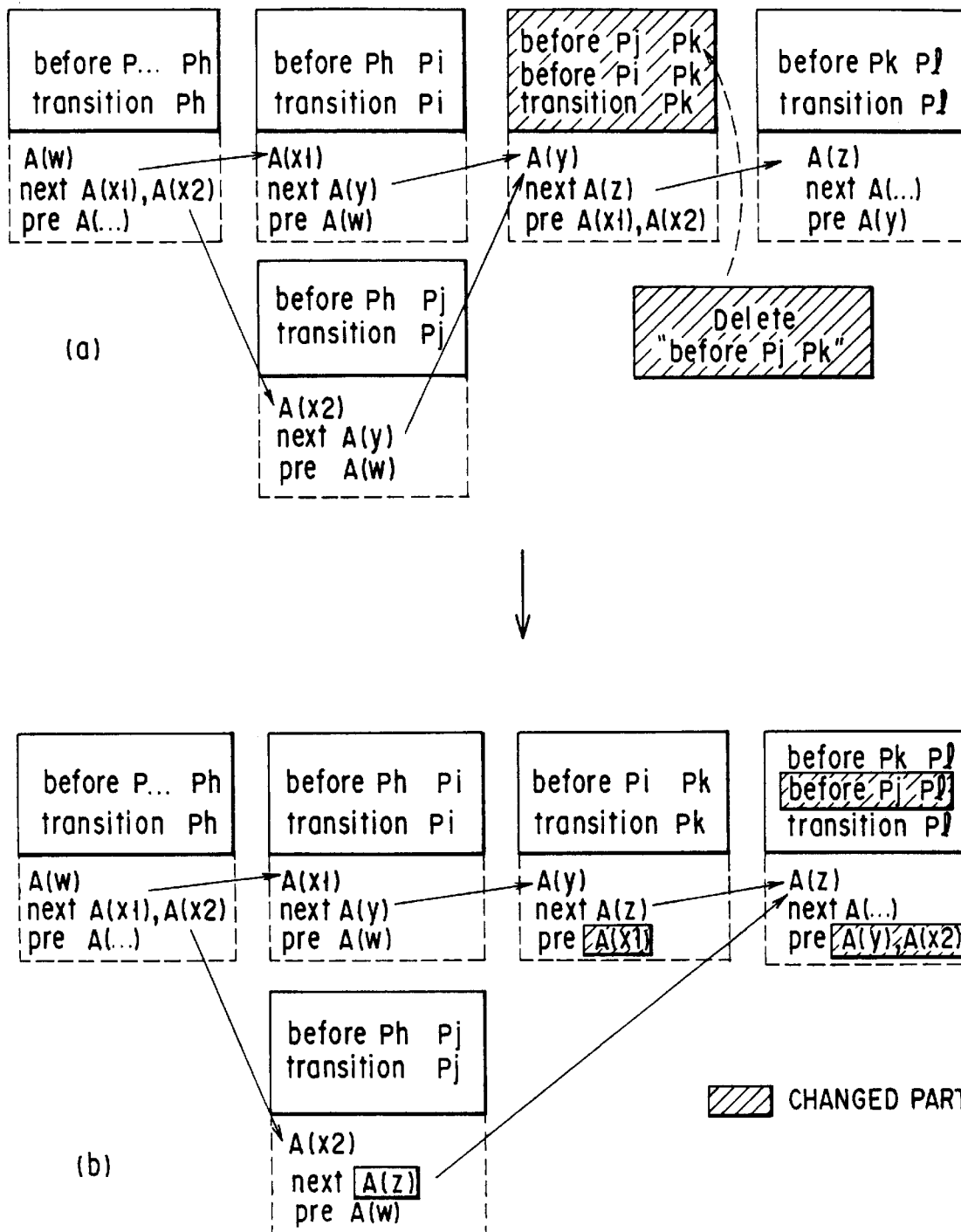
FIG. 51 is a view showing a change in field, which is caused by the constraint change operation in the fifth embodiment.

FIG. 51 is a view showing a change in field, which is caused by the algorithm of a constraint add operation in step E11-4 in FIG. 50. FIG. 51 shows a state in which "before Pj Pk" is added to the area A(y). The field is changed from (a) to (b) in FIG. 51. In this case, the area A(y) is added to "next" of an area A(x2), and the attributes of the areas change accordingly.

FIG. 52 is a flow chart showing a subroutine for performing processing in step E13 in FIG. 48.

Since at least one constraint is necessary in an area, the number of constraints in the designated area A(y) is checked in step E13-1. If the number is one, an error message is displayed in step E13-8, thereby ending the processing. If a plurality of constraints are present, a constraint designated by the user is deleted, and the field is rewritten as in step E13-3. In steps E13-4 to E11-7, field check is performed to prevent generation of an obvious constraint.

FIG. 53 is a view showing a change in field, which is caused by the algorithm of a constraint delete operation in step E13 in FIG. 52.

FIG. 53 shows a state in which "before Pj Pk" is deleted, and the field is changed from (a) to (b) in FIG. 53. In this case, the area A(x2) is connected to "pre" of an area A(z), and the attributes of the areas change accordingly.

FIG. 54 is a flow chart showing processing for detecting an obvious constraint which causes contradiction in the field. This subroutine is commonly executed in steps E9-2 and E9-5 in FIG. 48, E11-2 and E12-5 in FIG. 50, and E13-4 in FIG. 52. In this case, although "before A B" and "before B C" are present, an obvious constraint such as "before A C" is detected.

Referring to FIG. 54, steps E9-3 to E9-2-6 are repeated to generate an obvious constraint, and a common element to the set of constraints is detected in step E9-2-7, thereby realizing the processing. For example, assume a field including an obvious constraint "before A D". In this case, the above processing is executed in an order of a temporary set (a), a temporary set (b), and a temporary set (c) in FIG. 56, thereby detecting the common element "before A D".

Figure 57:
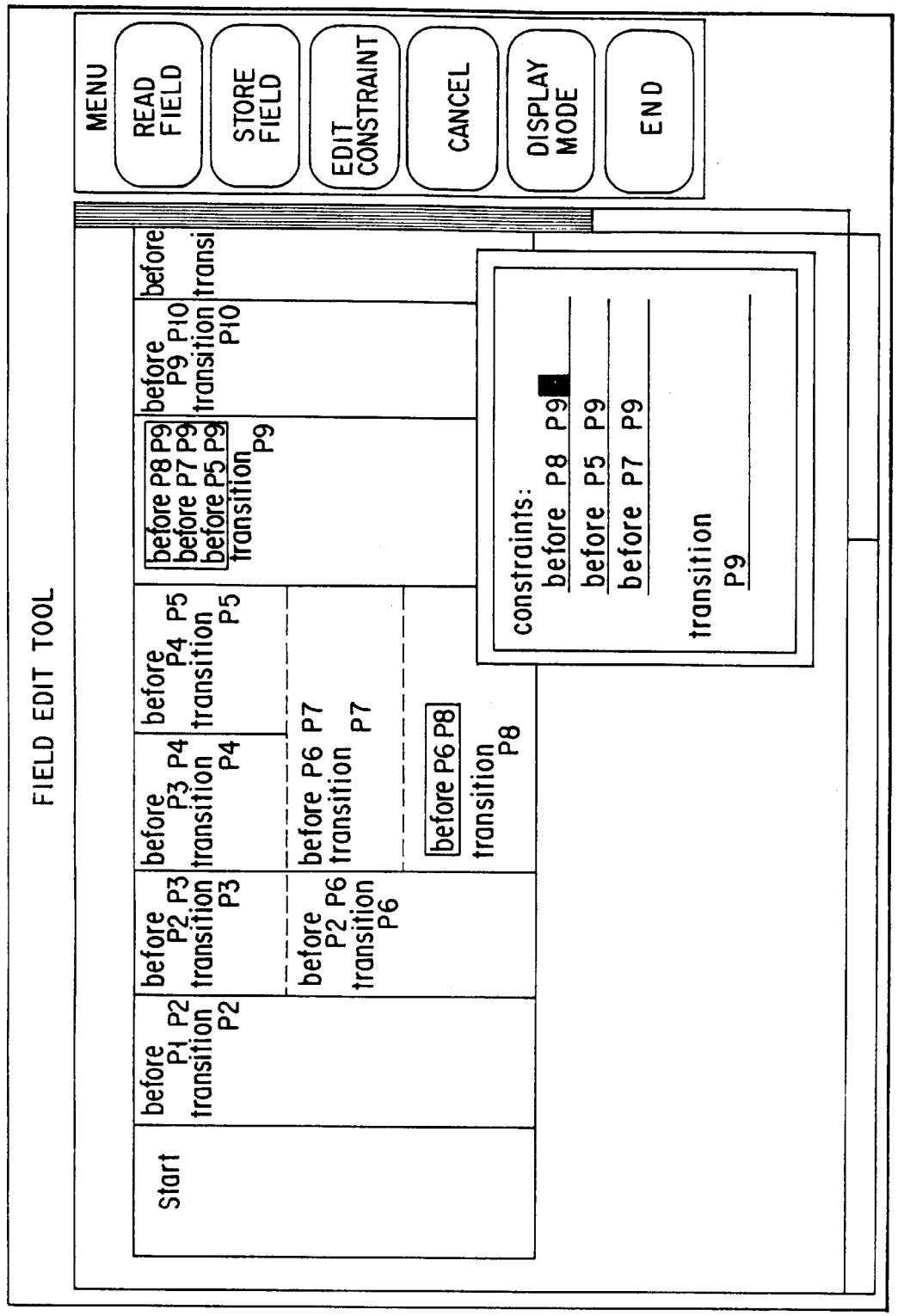
Figure 64:
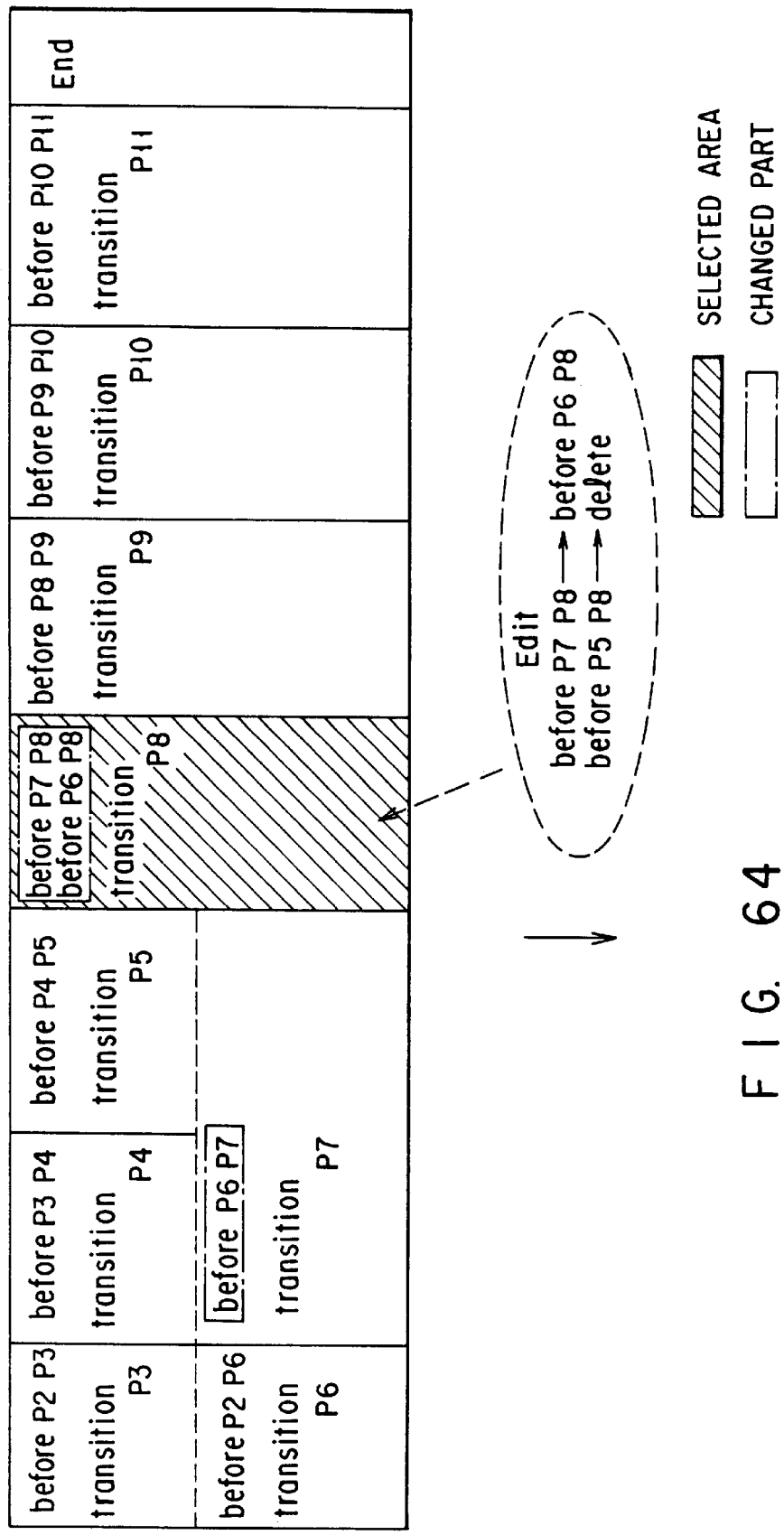
Figure 65:
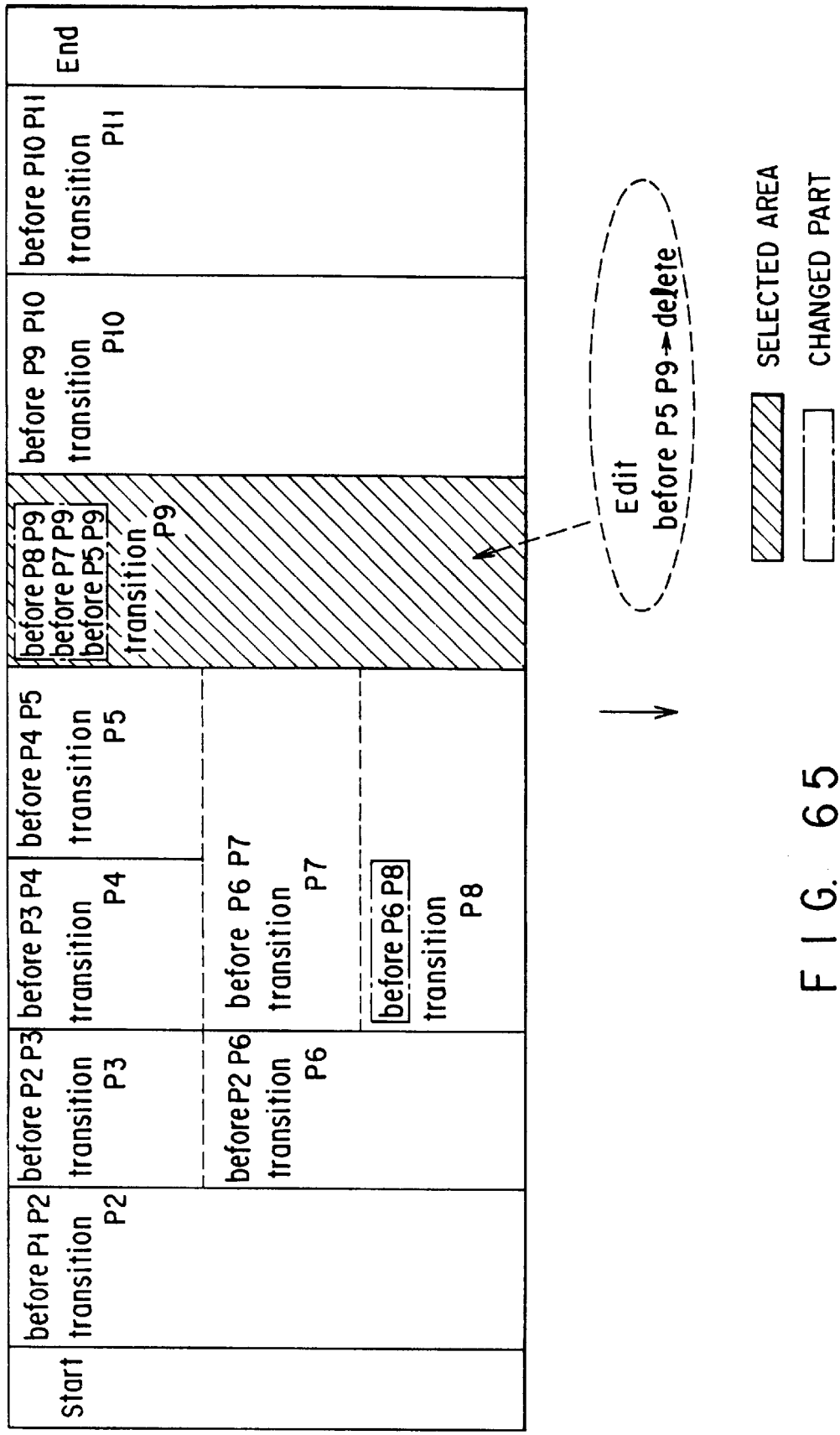

FIG. 57 is a view showing a display on the field editor 55. In the field editor 55, reading and storing of a field, constraint edition, and change in display mode can be performed by designating a menu 71. When an area 72 indicated by a rectangle is selected, an edit screen 73 appears. FIG. 58 is a view showing a field display example when "2D-display mode" is selected as a display mode. In this mode, the field is two-dimensionally displayed. FIG. 59 is a view showing a field display example when "3D-display mode" is selected as a display mode. In this mode, the field is three-dimensionally displayed. Therefore, if the field becomes entirely large, or if many concurrent processing portions are present, the entire field can be easily overlooked.

FIGS. 60 to 67 are views showing states in which the field data shown in FIG. 45 is gradually tuned by the algorithm in FIG. 47.

Figures 60, 61:
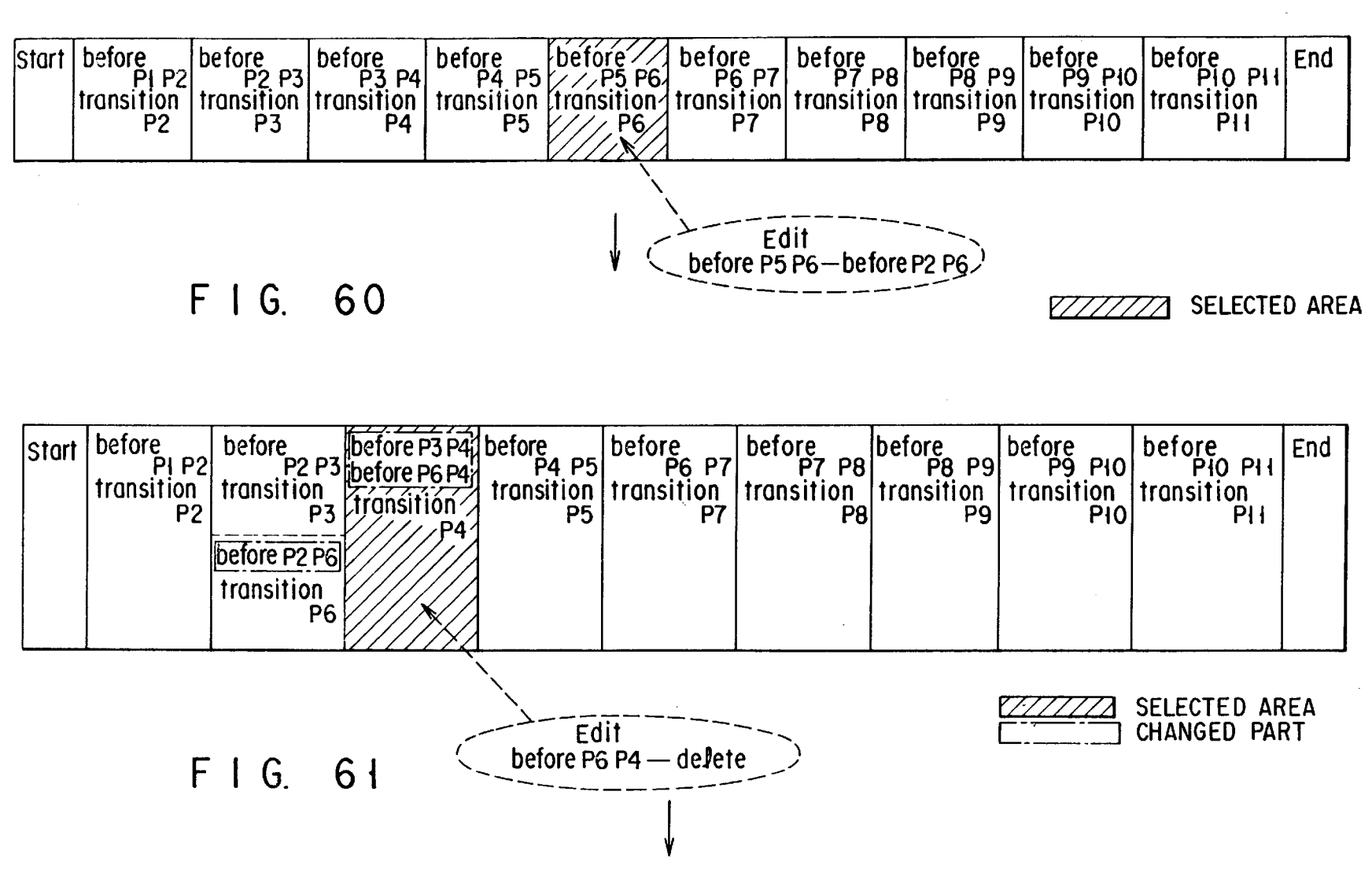
Figures 62, 63:
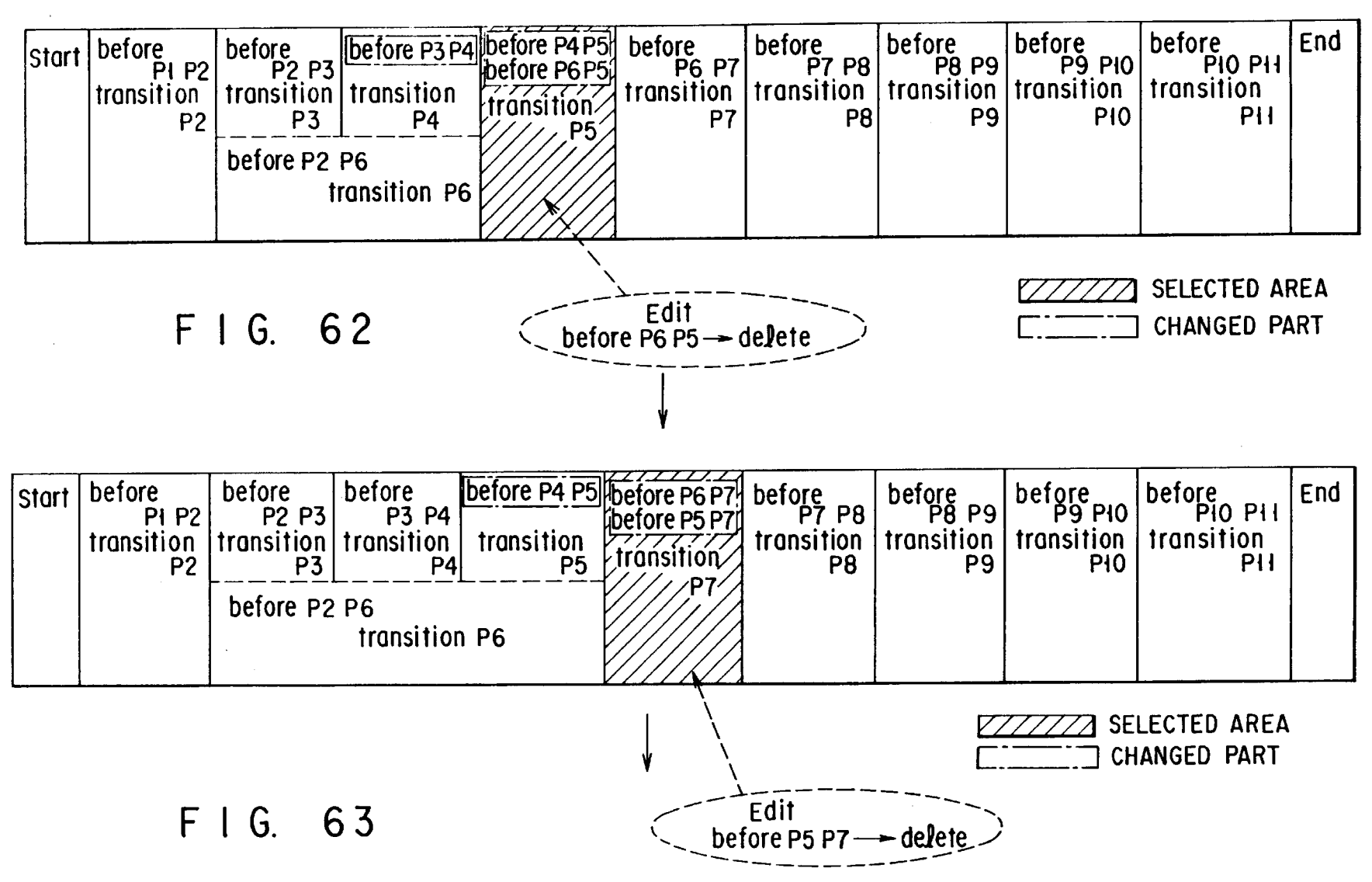

In FIG. 60, assume that the user determines that no causal relationship is present between processes P5 and P6, and the process P6 does not exhibit a harmful nondeterministic behavior after the process P2. In this case, when edition is performed to rewrite the constraint, as shown in FIG. 60, a display as shown in FIG. 61 is obtained. In FIG. 61, assume that the user determines that no causal relationship is present between the process P6 and P4, and a correct order is present only between the processes P4 and P3. In this case, when edition is performed to delete a constraint ("before P6 P4"), as shown in FIG. 61, a display as shown in FIG. 62 is obtained. Similarly, when the user checks constraints in the area and gradually edit the field, the field data changes such as FIG. 63→FIG. 64→ . . . →FIG. 67.

FIG. 68 is a flow chart showing processing executed by the parallelization unit (field data converting unit) 18 in FIG. 39. As shown in FIG. 68, the parallelization unit 18 reads field data from the field data storing unit 52 (step F1), analyzes a graph structure between areas to generate a process flow (step F2), analyzes the resultant process flow to generate a concurrent program source in which only nondeterminism is introduced (step F3), and stores this concurrent program source in the second CP file storing unit 19 (step F4).

Figure 67:
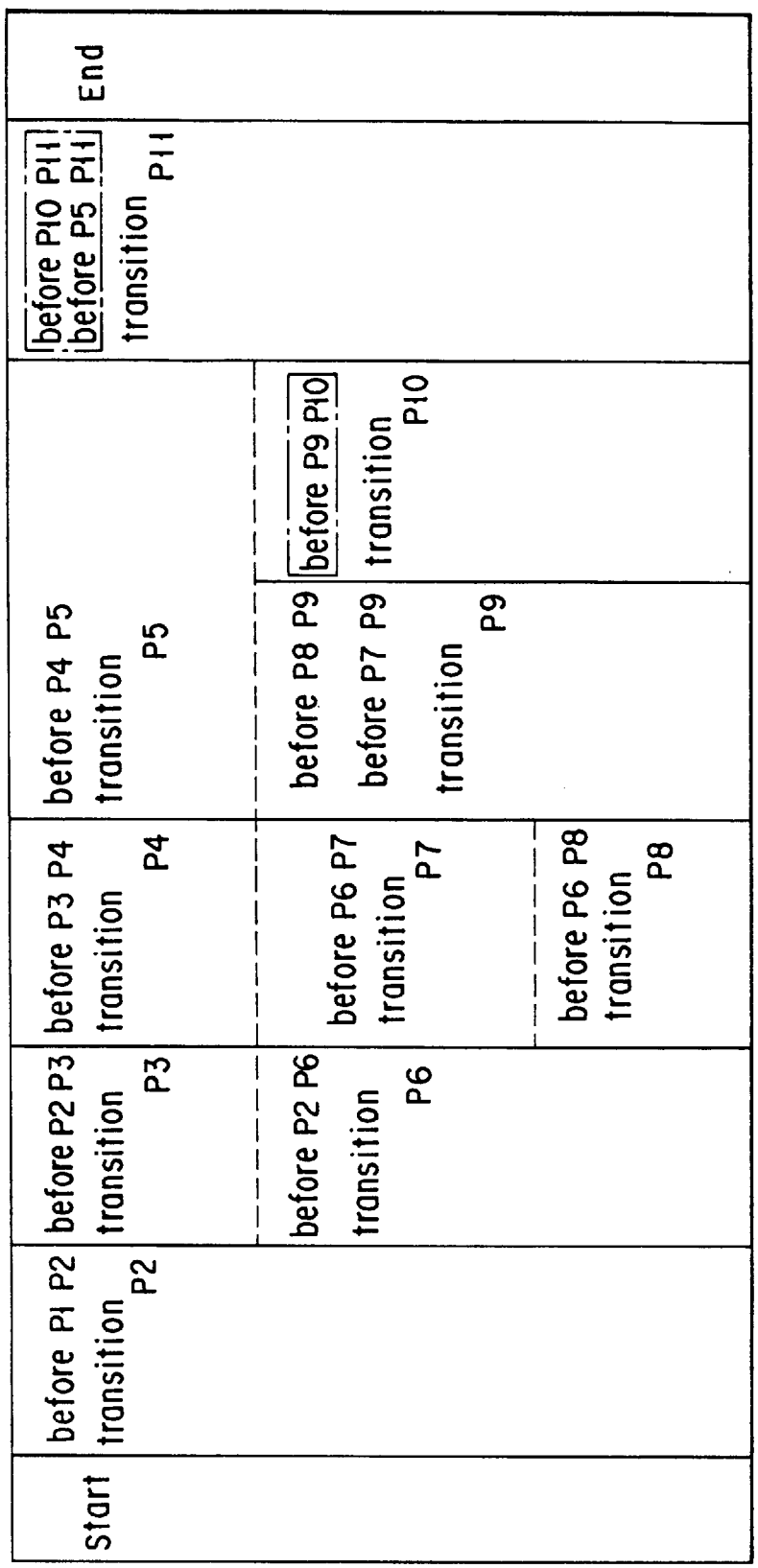

FIG. 69 shows a concurrent program obtained by causing the parallelization unit 18 to analyze and convert a field in a state shown in FIG. 67. As shown in FIG. 69, concurrent execution of the processes P4 and P5, which is a bug assumed in the first concurrent program in FIG. 40, is corrected. Concurrent programming of the processes P3 and P6, which is intended nondeterminism, is performed instead.

FIG. 70 is a view showing the image of a process flow executed by the concurrent program in FIG. 69.

According to this embodiment, the process flow of the serialized concurrent program is defined as a field consisting of a constraint and a transition condition. This field is tuned to introduce intended nondeterminism, thereby efficiently generating a high-quality concurrent program free from any bug. In this embodiment, when the serialized program cancels the constraint to proceed the parallelization, a graphically elongated field extends vertically. Therefore, the parallelization can be intuitively understood to advantageously facilitate manipulations.

(Sixth Embodiment)

In a method of programming a concurrent program and a programming supporting apparatus thereof according to this embodiment, a hyper sequential program is tested/debugged. In addition, information associated with intended nondeterminism is introduced in the hyper sequential program.

FIG. 71 is a block diagram schematically showing the arrangement of a parallelization supporting apparatus according to the sixth embodiment. Referring to FIG. 71, a first concurrent program stored in a CP file storing unit 11 is read out in accordance with a user command from an input unit 4 and input to a serialization unit 12. The first concurrent program input to the serialization unit 12 is converted into a complete hyper sequential program HSP in accordance with the serializing rules stored in a serializing rule storing unit 13, and this complete hyper sequential program HSP is stored in an HSP file storing unit 14 capable of storing a plurality of hyper sequential programs.

The complete hyper sequential program HSP is tested by a testing and executing unit 15. If a bug is found in the complete hyper sequential program HSP, the bug is corrected using a debugging unit 16. When the testing and debugging operation is completed, the resultant complete hyper sequential program HSP is stored in the HSP file storing unit 14.

The execution order of the complete hyper sequential program HSP is changed by a nondeterminism introducing unit 17 through a changing unit 25 to generate another complete hyper sequential program HSP. This complete hyper sequential program HSP is repeatedly tested/debugged to store a resultant complete hyper sequential program HSP in the HSP file storing unit 14. That is, intended nondeterminism is presented as a plurality of complete hyper sequential programs instead of a partial hyper sequential program. If introduction of intended nondeterminism by the nondeterminism introducing unit 17 is completed, a concurrent program is generated by the parallelization unit 18 in accordance with a set of complete hyper sequential programs HSP finally stored in the HSP file storing unit 14 and is stored in a second CP file storing unit 19.

(Seventh Embodiment)

Figure 72:
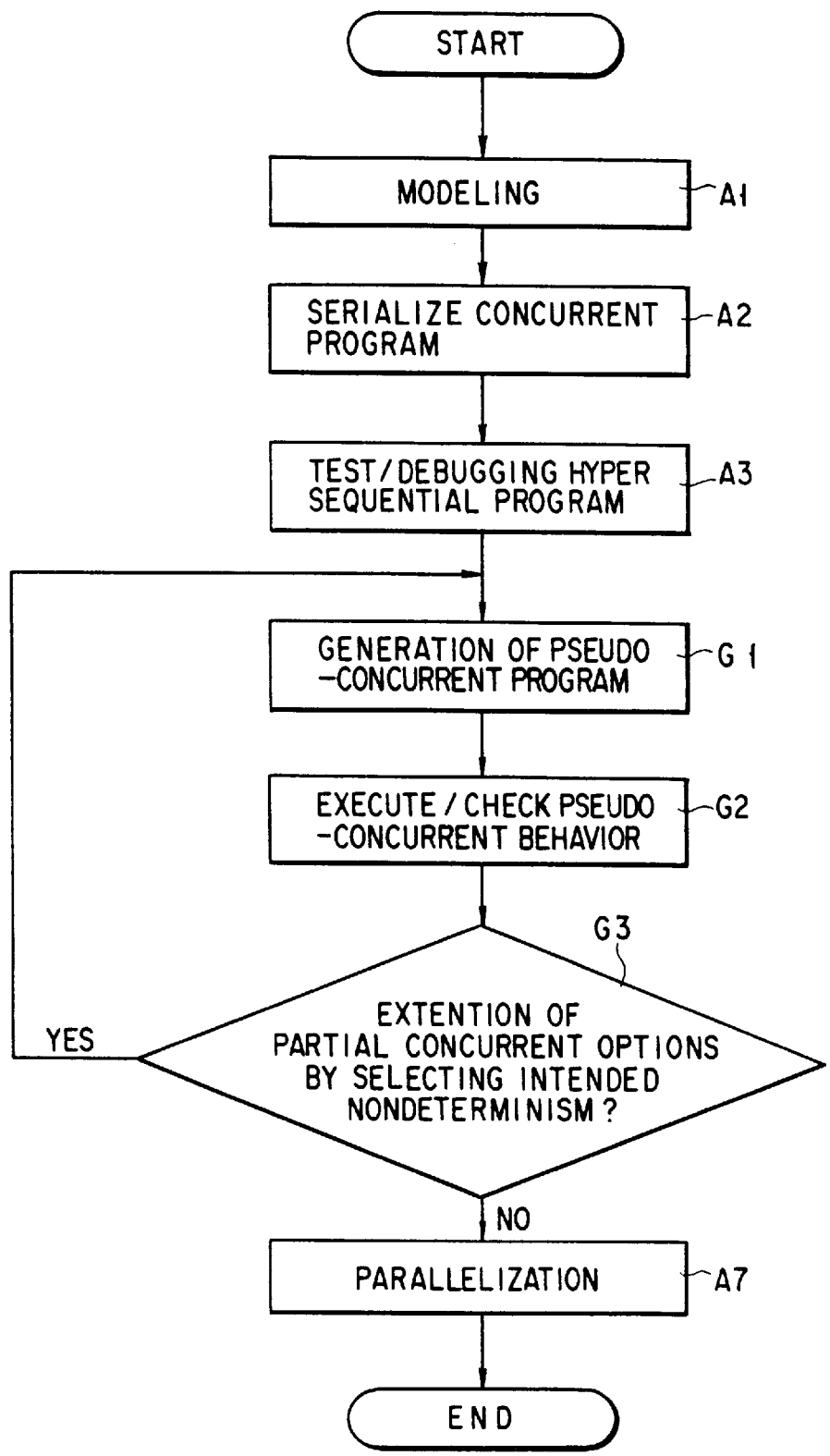
FIG. 72 is a flow chart showing the main procedures of a method of programming a concurrent program according to the seventh embodiment.

The constituent elements of this embodiment are the same as those in the sixth embodiment (FIG. 71) which is different from programming procedure thereof, and a detailed description thereof will be omitted. FIG. 72 is a flow chart showing the main procedures of a method of programming a concurrent program according to the seventh embodiment.

(1) Step A1: Modeling Concurrent System

Natural modeling using concurrency is performed for a target concurrent system. Each process structure of the concurrent system is determined. In addition, a concurrent program having a concurrent structure is described as a source program in each process in accordance with programming using a concurrent program. A latent bug may be present in this source program.

(2) Step A2: Serializing Concurrent Program

Default serialization is introduced to convert the first concurrent program into a hyper sequential program having a sequential structure. In this embodiment, serialization is introduced at a meta-level. The meta-level is defined not as the level of the source program itself (i.e., the first concurrent program) but as a level for managing execution of the source program. For example, a source program described in a concurrent program is converted into a source program as a program which assures sequential execution by means of a scheduler managed independently of the source program.

(3) Step A3: Testing and Debugging Hyper Sequential Program

A hyper sequential program is tested/debugged. Bugs are eliminated from the hyper sequential program by the debugging unit on the basis of a hyper sequential program test result obtained by the testing and executing unit. The testing and debugging operation can be performed in the same manner as in the normal testing and debugging method in a sequential program. The testing and debugging operation is repeated until the correctness of the sequential program is assured.

(4) Step G1: Generation of Pseudo-Concurrent Programs

Process groups which become candidates of concurrency are introduced for the hyper sequential program tested/debugged in step A3, and a plurality of pseudo-concurrent behaviors are generated by the changing unit 20. In this embodiment, the pseudo-concurrent behaviors are introduced at the meta-level.

(5) Step G2: Execute/Check Pseudo-Concurrent Behavior

The pseudo-concurrent behavior obtained step G1 are executed using the tested/debugged hyper sequential program in step A3 and execution result is checked. This execution reproduces a simulation state of concurrent operation of the program on the hyper sequential program. User records whether or not each operation result is correct to a concurrent simulated execution unit (not shown).

(6) Step G3: Partial Serializing Concurrent Program by Selecting Intended Nondeterminism The nondeterminism, which permits a pseudo-concurrent behavior correctly executed and eliminates a pseudo-concurrent behavior incorrectly executed, is introduced and registered as intended nondeterminism. Steps G1 to G3 are an adequate number of times to gradually extend intended nondeterminism.

(7) Step A7: Parallelizing Hyper Sequential Program

A harmless nondeterministic portion is extracted from the partial hyper sequential program in which an information relating to intended nondeterminism is introduced. The nondeterministic portion is concurrently translated to convert all the partial hyper sequential program into a concurrent program. Serialization given by default serialization at the meta-level is reflected (e.g., embedded in the source program itself) on the concurrent program and default serialization of meta-level is canceled.

FIG. 73 is an example of a concurrent program supposed by the user. P1, P2, P3, etc. present an execution unit of program and are called processes. FIG. 73 shows that processes P3, P4 and P5 are concurrently executed and processes P7, P8 and P9 are sequentially executed. In addition, a process group consists of processes P2, P3, P4, P5 and P6 and a process group consisting of processes P7, P8 and P9 can be concurrently executed.

The hyper sequential program HSP is obtained by placing all processes in a line with remaining order of process in a concurrent model.

FIG. 74 is an example of modeling an execution series of the hyper sequential program obtained by the concurrent program of FIG. 73. In a sequencing model, concurrently executed processes P3, P4, P5, etc. are placed in a certain order or at a distance as the case may be. Processes P1 and P2 to be executed before them are placed before any one of processes P3, P4 and P5. Processes P6 and P10 to be executed after them are placed after any one of processes P3, P4 and P5. An order among groups serialized the process group consisting of processes P2, P3, P4, P5 and P6 and a process group consisting of processes P7, P8 and P9 are optional, then processes of both groups are alternately presented as the case may be.

The hyper sequential program HSP is input to the testing and executing unit 15 by the instruction from the input unit 14 by the user and test execution is performed. The testing and executing unit 15 presents test execution result to the output unit. User can perform a predetermined debugging for the hyper sequential program by using the input unit 4 on the basis of the test execution result. The user gives the instruction of performing retest execution from the input unit 4 after performing a predetermined debugging to the hyper sequential program. With this procedure, the debugged hyper sequential program is input to the test execution unit 15 and is tested again.

The hyper sequential program is checked whether an operation is normal by testing/debugging and is converted to partial hyper sequential by the nondeterminism input unit 17. First, the hyper sequential program is converted to a plurality of pseudo-concurrent programs and information relating to intended nondeterminism are accumulated from execution result of the pseudo-concurrent programs. This procedure is shown in FIG. 75. According to the procedure of FIG. 75, FIGS. 76A to 79B show examples of process for converting the sequential model of FIG. 74 to the concurrent simulated model and obtaining the partial sequential model.

The procedure of this example will be explained.

Figure 76A:
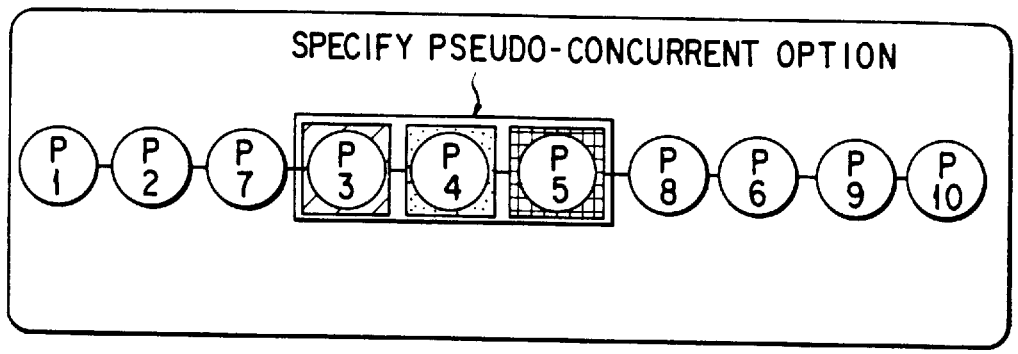
Figure 76B:
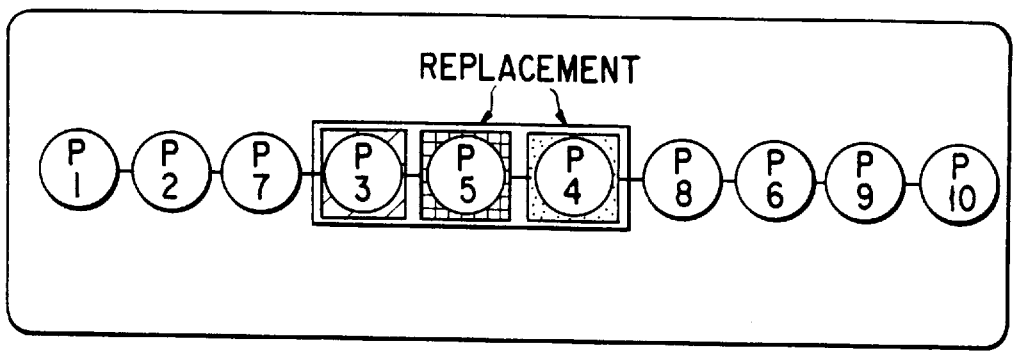
Figure 76C:
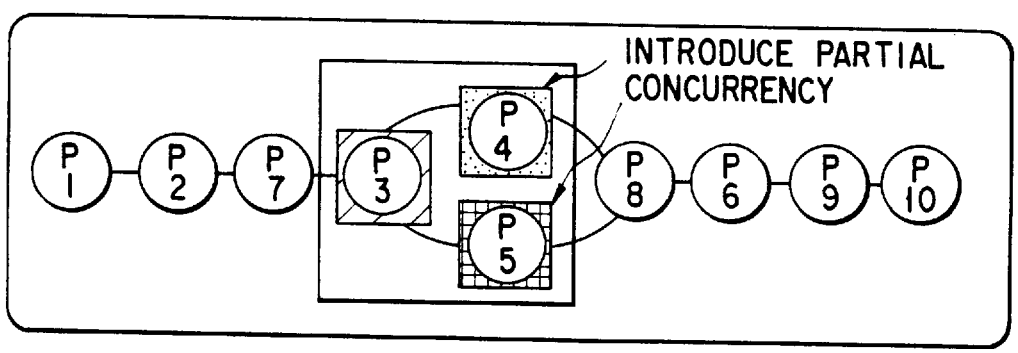
Figure 78A:
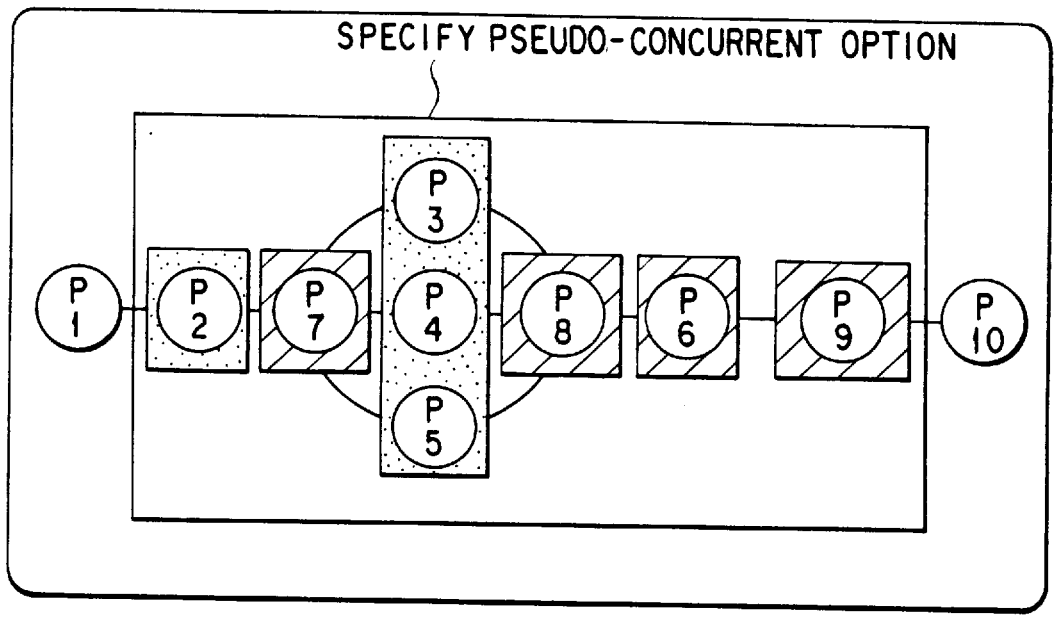
Figure 78B:
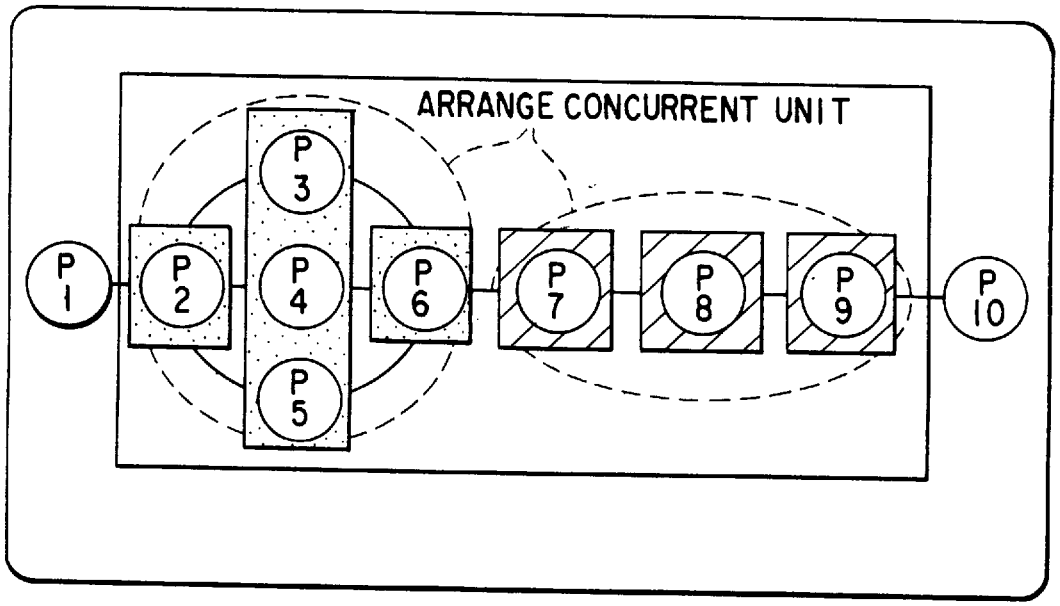
Figure 79A:
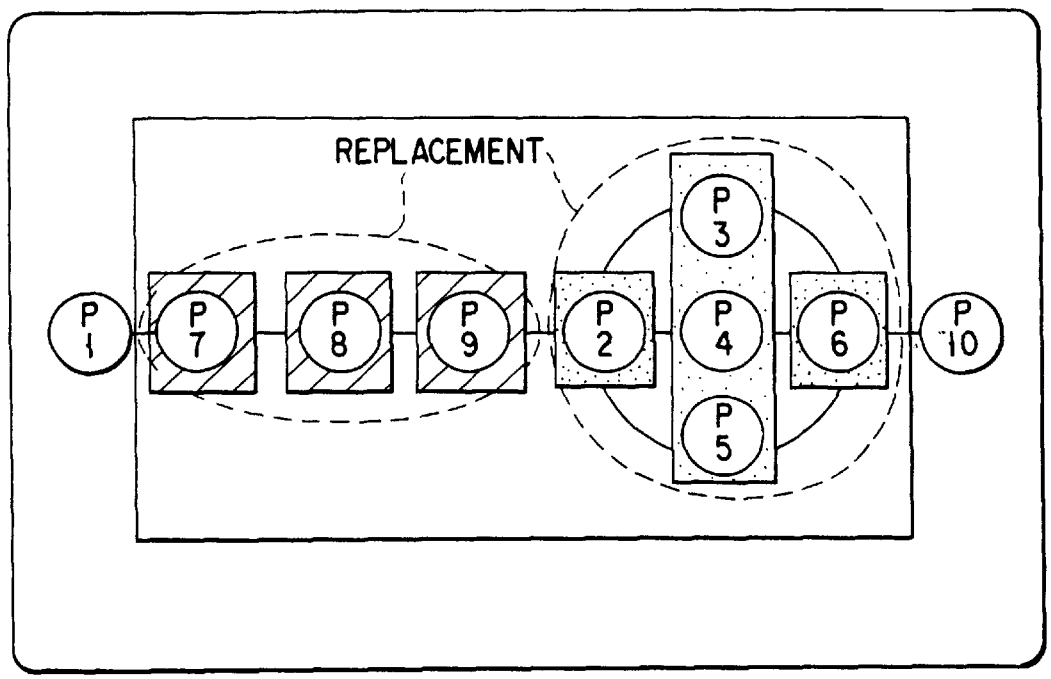
Figure 79B:
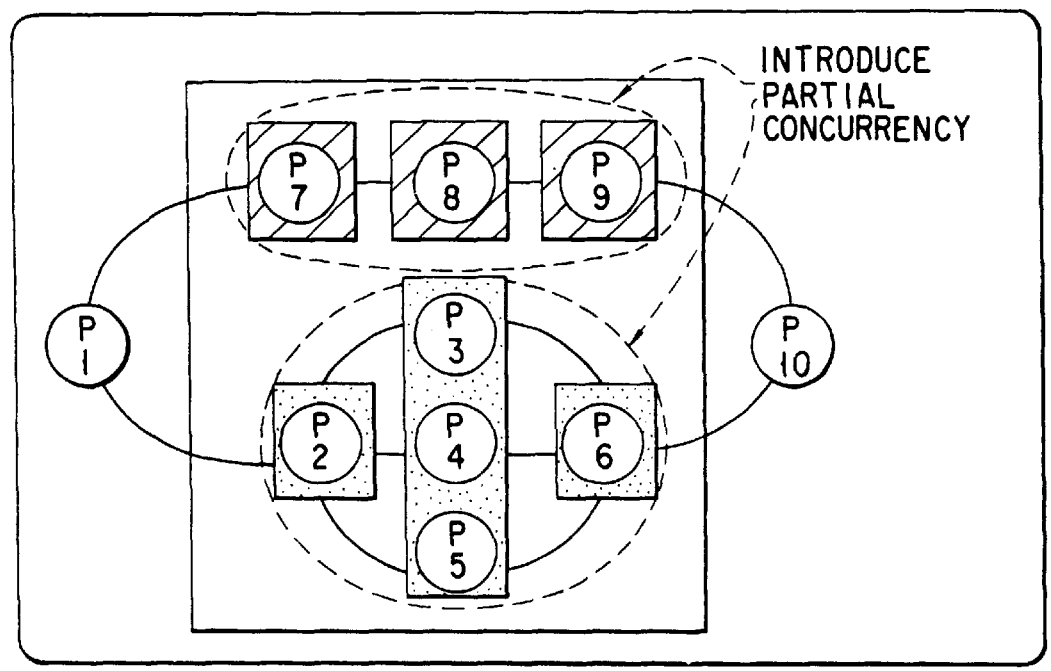

In FIG. 76A, P3, P4 and P5 are selected as the concurrent simulated options by such as pointing device (step H1). Further, each of processes is individually indicated unit of concurrency. (step H2). In FIGS. 76A to 76C, concurrent unit is discriminated by the difference of color. In the hyper sequential program, processes in the internal of the concurrent simulated options are executed in order of P3, P4 and P5.

In FIG. 76B, P4 and P5 are replaced as a replacement of concurrent unit (step H3), and a pseudo-concurrent behavior is obtained. In the pseudo-concurrent behavior, processes in the internal of the concurrent simulated options are executed in order of P3, P4 and P5. If execution result is guaranteed with executing this program (step H4), a program shown in FIG. 76C is acquired (step H5). In the hyper sequential program, processes P4 and P5 are concurrently executed after process P3 in the internal of the concurrent simulated options is executed.

The extension of nondeterminism is indicated by user in the same option (step H6), a pair of process P3 and two processes P4 and P5 are replaced in FIG. 77A (step H3) to acquire another pseudo-concurrent behavior. In the pseudo-concurrent behavior, process P3 is executed after processes P4 and P5 in the internal of the concurrent simulated options are executed. The correctness is checked by executing this program (step H4), thereby a program having nondeterminism of FIG. 77B is acquired (step H5). In the partial hyper sequential program, processes P3, P4 and P5 are concurrently executed in the internal of the concurrent simulated options. With this operation, since nondeterminism in the internal of the concurrent simulated options become sufficient, procedure advances from step H6 to step H7. When extension of concurrent options are indicated by user (step H7), the same procedure is repeated by returning to step H1 as shown in FIGS. 78A to 79B.

The partial hyper sequential program obtained by incrementally introducing information relating to intended nondeterminism is input to the parallelization unit 18 by the instruction from user. The parallelization unit 18 records the partial hyper sequential program PHSP having only intended nondeterminism to second CP file storing unit 19 as a second concurrent program. User can observe the second concurrent program by the output unit 5 and can finally perform testing/debugging.

According to the embodiment, an operation of the concurrent program can be sufficiently checked on the hyper sequential program. The hyper sequential program can be converted to the concurrent program step by step by indicating concurrent candidate options for the hyper sequential program. In addition, the concurrent program which is correctly operates can be acquired by introducing the concurrency permitting only nondeterminism checked whether correct operation is performed at sequential execution on the basis of the pseudo-concurrent behavior. Accordingly, testing and debugging of the concurrent program is easier.

(Eighth Embodiment)

According to this embodiment, in a computer system arranged as shown in FIG. 2, at least one process (i.e., processes A to D) is registered in processors 1-1 to 1-N, as shown in FIG. 80. In a process execution environment wherein each process is operated concurrently/parallelly, and the processes exchange messages to perform information exchange and processing, a concurrent program is translated.

In this embodiment, a hyper sequential program is tested using a concurrent program test. When a bug is present in the hyper sequential program, the concurrent program serving as source codes is not corrected, but the serializing rules are corrected to testing and debugging the hyper sequential program.

FIG. 81 is a schematic block diagram showing the arrangement of a parallelization supporting apparatus according to this embodiment.

Referring to FIG. 81, a serialization unit 12 introduces default serialization at a meta-level to a first concurrent program from a CP file storing unit 11 in accordance with serializing rules stored in a serializing rule storing unit 13, so that the first concurrent program is converted into a hyper sequential program (HSP) which is then recorded in an HSP file storing unit 14. The serializing rules become execute log information obtained upon execution of a source program (CP file) in an execution unit 22. The HSP file storing unit 14 stores a pair of a CP file and execute log information serving as the serializing rule. The user can check this hyper sequential program HSP at an output unit 5. This hyper sequential program HSP is input to and tested in a testing and executing unit 15 in accordance with a user command from an input unit 4.

The testing and executing unit 15 outputs a test execution result (execute log) to the output unit 5. The user corrects the serializing rules in the serializing rule storing unit 13 in accordance with this test execution result using a serializing rule correcting unit 21, so that the predetermined testing and debugging operation can be performed for the hyper sequential program HSP.

Upon completion of the predetermined testing and debugging operation for the hyper sequential program HSP after correction of the serializing rules, a command for executing a test again is input from the input unit 4. The tested/debugged hyper sequential program HSP is input to the testing and executing unit 15 and tested again. This testing and debugging operation is repeated until it is confirmed that the hyper sequential program HSP is normally operated.

When it is confirmed that the hyper sequential program is normally operated by the testing and debugging operation, the serializing rules stored in the serializing rule storing unit 13 are corrected by the serializing rule correcting unit 21. The corrected serializing rules are newly stored in the serializing rule storing unit 13. By this serializing rule correction, information associated with nondeterminism is partially introduced in the hyper sequential program. The hyper sequential program HSP is converted into a partial hyper sequential program PHSP.

To actualize harmless concurrency latently present in the partial hyper sequential program PHSP, a portion of the serializing rule which corresponds to the partial hyper sequential program PHSP is divided by a serialization unit 18 in units of processes in accordance with a command from a division criterion designating unit 23. The partial hyper sequential program PHSP is then converted into a second concurrent program 19 which allows start order control in units of processes.

Figure 82:
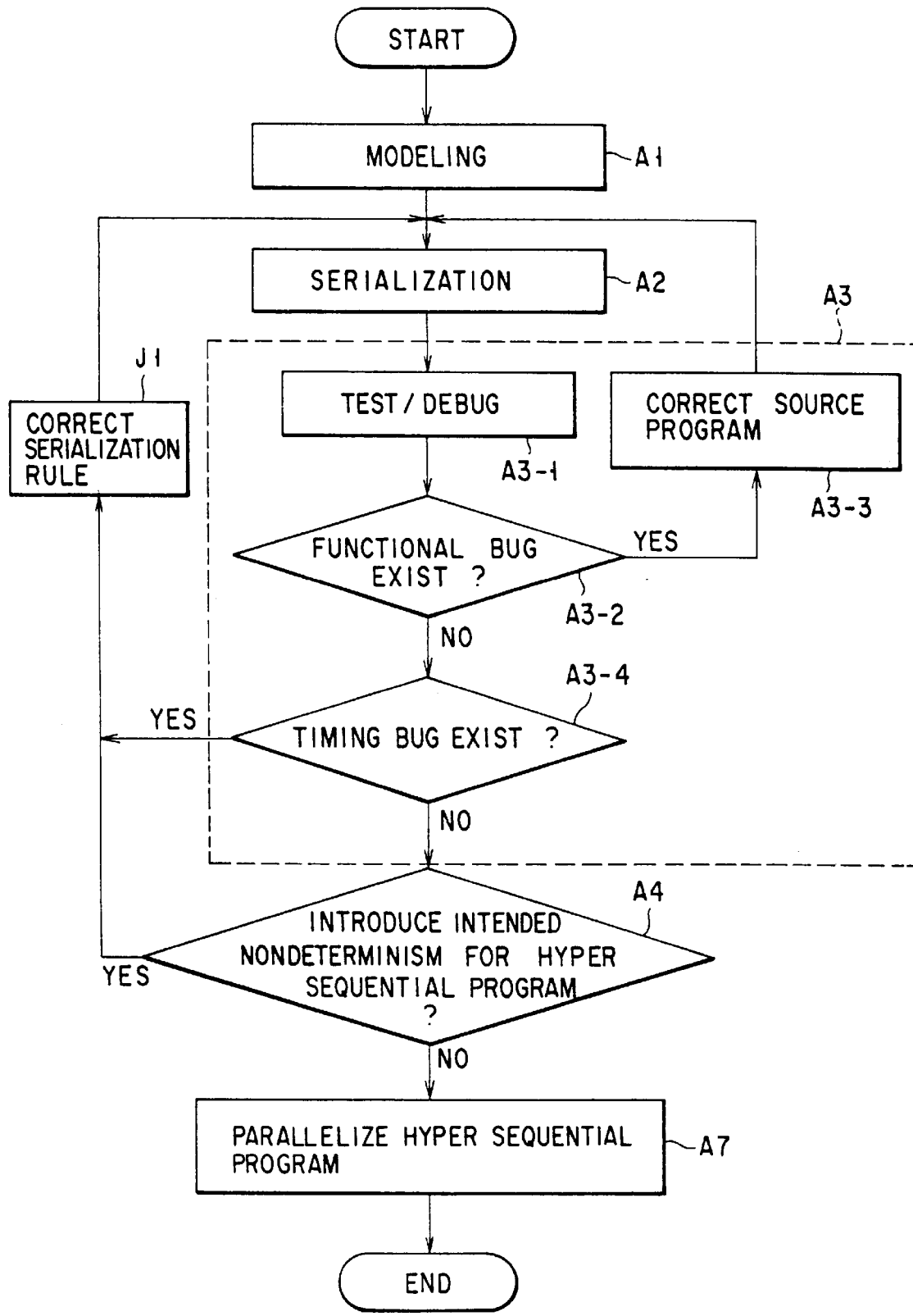
FIG. 82 is a flow chart schematically showing the procedures of a parallelization method according to the eighth embodiment.

FIG. 82 is a schematic flow chart for explaining the sequence of a method of programming a concurrent program according to this embodiment.

(1) Step A1: Modeling Concurrent System

Natural modeling using concurrency is performed for a target concurrent system. Each process structure of the concurrent system is determined. In addition, a concurrent program having a concurrent structure is described as a source program in each process in accordance with programming using a first concurrent program. This source program may latently contain a bug.

(2) Step A2: Serializing Concurrent Program

Default serialization is introduced to convert the first concurrent program into a hyper sequential program having a sequential structure. In this embodiment, default serialization is introduced at a meta-level. The meta-level is defined not as the level of the source program itself but as a level for managing execution of the source program. For example, sequencing is defined as sequential execution for executing a first concurrent program described in a concurrent program by a scheduler managed independently of the source program. That is, sequencing is to cause the CP file storing unit 11 to correspond to the serializing rule storing unit 13. Therefore, the resultant sequential program consists of a pair of a first concurrent program and a serializing rule.

(3) Step A3: Testing and Debugging Hyper Sequential Program

The hyper sequential program serialized in step A2 is executed to conduct a test. In this case, test execution is to operate the first concurrent program on the basis of the serializing rules. If a functional bug is present, the first concurrent program is corrected, and the flow returns to step A2. If a timing bug is present, the flow advances to step G1. If no timing bug is present, this serializing rule is stored, and the flow advances to step A4.

(4) Step G1: Correction of Serialization Rule

If a timing bug is present in step A3, the serializing rule is corrected, and the flow returns to step A2.

(5) Step A4: Introduction of Intended Nondeterminism

If intended nondeterminism is required to be added, the serializing rules are corrected, and the flow returns to step A2. If intended nondeterminism need not be added, the flow advances to step A7.

(6) Step A7: Parallelizing Hyper Sequential Program

A harmless nondeterministic portion is extracted from the serializing rule stored in step A3, and the extracted portion is concurrently translated, so that all the partial hyper sequential program is converted into a second concurrent program.

FIG. 83 is a view showing log information representing an execution history when a concurrent program having interprocess communication shown in FIG. 80 in which default serialization is introduced at the meta-level is executed.

The user can check this log information at the output unit 5. Referring to FIG. 83, a vertical scroll bar is used to scroll display information to check log information at arbitrary time, and a horizontal scroll bar is used to check candidate information if intended nondeterminism is introduced and a plurality of executable candidates are available. By using the vertical and horizontal scroll bars, an arbitrary location in all the log information can be checked. "Order Correction" and "Nondeterminism Introduction" displayed in the upper portion of the screen are selected to designate processing when corresponding manipulations (to be described later) are designated.

In addition, a user command can be input through the input unit 4 to input the first concurrent program stored in the HSP file storing unit 14 and the execute log information file to the testing and executing unit 15 to test the resultant program as the hyper sequential program HSP.

The testing and executing unit 15 outputs a test execution result to the output unit 5. The user can perform predetermined testing and debugging operation for the hyper sequential program HSP on the basis of this test execution result using the input unit 4. If a functional bug is present, the testing and debugging operation can be performed upon correcting the first concurrent program in the CP file storing unit 11. If a timing bug is present, the execute log file in the serializing rule storing unit 13 is corrected to cause the corrected first concurrent program to correspond to the execute log information, thereby programming a hyper sequential program again.

After the user performs the testing and debugging operation for the hyper sequential program HSP, he inputs a command for executing a test from the input unit 4 again. The tested/debugged hyper sequential program HSP is input to the testing and executing unit 15, and the test is executed again. This testing and debugging operation is repeatedly performed until it is confirmed that the hyper sequential program HSP is normally operated.

When it is confirmed by the testing and debugging operation that the program HSP is normally operated, information associated with intended nondeterminism is partially introduced in the hyper sequential program by the serializing rule correcting unit 21. The information associated with intended nondeterminism, introduced by the serializing rule correcting unit 21, is reflected on log information and recorded in the HSP file storing unit 14.

The hyper sequential program (partial hyper sequential program PHSP) in which the information associated with intended nondeterminism by the serializing rule correcting unit 21 is tested by the testing and executing unit 15 in accordance with a user command, thereby performing a testing and debugging operation. In this case, the behavior of the partial hyper sequential program PHSP is nondeterministic in a portion in which the information associated with intended nondeterminism is introduced. For this reason, all the behaviors are preferably tested/debugged. In this manner, the testing and debugging operation and introduction of the information associated with intended nondeterminism are repeated to gradually add information associated with intended nondeterminism.

A partial hyper sequential program PHSP obtained by incrementally introducing information associated with intended nondeterminism is input to the parallelization unit 18 in accordance with a user command. The parallelization unit 18 extracts a harmless nondeterministic portion from the partial hyper sequential program PHSP and generates all the partial hyper sequential program PHSP into a concurrent program. More specifically, integrated log information is divided in units of processes so as to define a start order, and start control is performed in units of processes, thereby canceling default serialization. The partial hyper sequential program is converted into a concurrent program which is then recorded in the second CP file storing unit 19. The user checks this concurrent program at the output unit, thereby performing the final testing and debugging operation.

FIG. 84 shows an arrangement until a partial hyper sequential program associated with processing in steps A2 to A4 is translated. A method of realizing the functions of the respective constituent parts will be described below.

Figure 85:
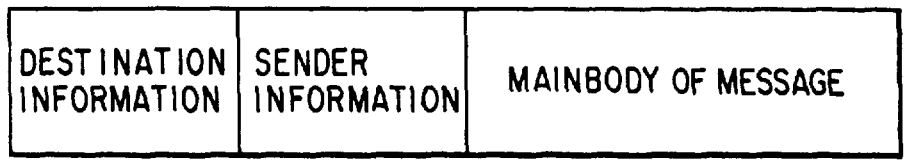
FIG. 85 is a view showing a message format in the eighth embodiment.

FIG. 85 shows the format of a message exchanged between processes. Information for designating an information destination such as a destination process name is set in "destination information", and information defining a source such as a source process name is set in "source information". Data to be exchanged between processes is set in a "message body".

Information stored as log information is generated using the destination information and the source information in the message format in FIG. 85. In the following description, as log information, only a destination process name is used as the destination information, and only a source process name is used as the source information. However, when a process is utilized a plurality of times, the source information can be expanded in the form of {process name, process start count} because the ordinary numbers of identical processes cannot be distinguished from each other. In addition, assume that a message is transmitted a plurality of times during one operation of a given process. In this case, to specify the ordinary number of a specific transmission operation, the source information can be expanded in the form of {process name, process start count, message transmission count}. If each process has a unit (to be referred to as a method hereinafter) of a plurality of processing operations, its information is also added to obtain source information in the form of {process name, method mane, message transmission count}.

The destination information need not be limited to only the destination process name, but can be in the form of {destination process name, method name}. Since the destination information and the source information can be combined in accordance with execution forms, a total of eight combinations are available.

First of all, the execution unit 22 will be described in detail.

As described above, the first concurrent program is executed at random. In this case, the execution log serves as serializing rules, all communications between processes are sent as serializing rules to a process group controlling unit 203 and stored in a received message holding unit 204. The process group controlling unit 203 sequentially extracts the messages from the message holding unit 204 and sends them to authentic destinations again. For this reason, the start operations of all the processes are sequentially controlled by the process group controlling unit 203, so that the first concurrent program can be sequentially processed.

At this time, messages sequentially processed by the process group controlling unit 203 are held time-serially as log information in a log information storing unit 201 by a log information acquiring unit 202. This log information serves to constitute the serializing rule storing unit 13 and becomes an execution constraint condition in subsequent sequential execution.

Figure 86:
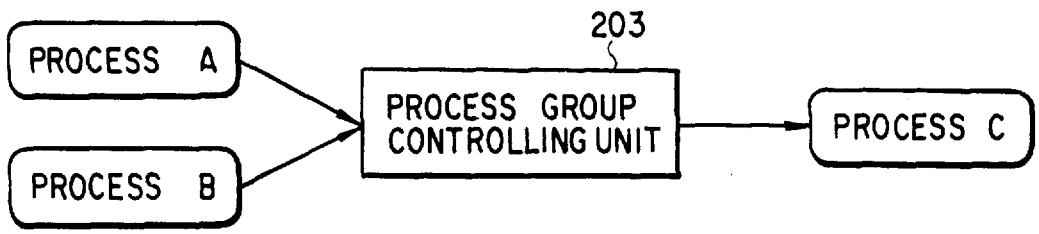
FIG. 86 is a view showing information exchange between processes in the eighth embodiment.
Figure 87:
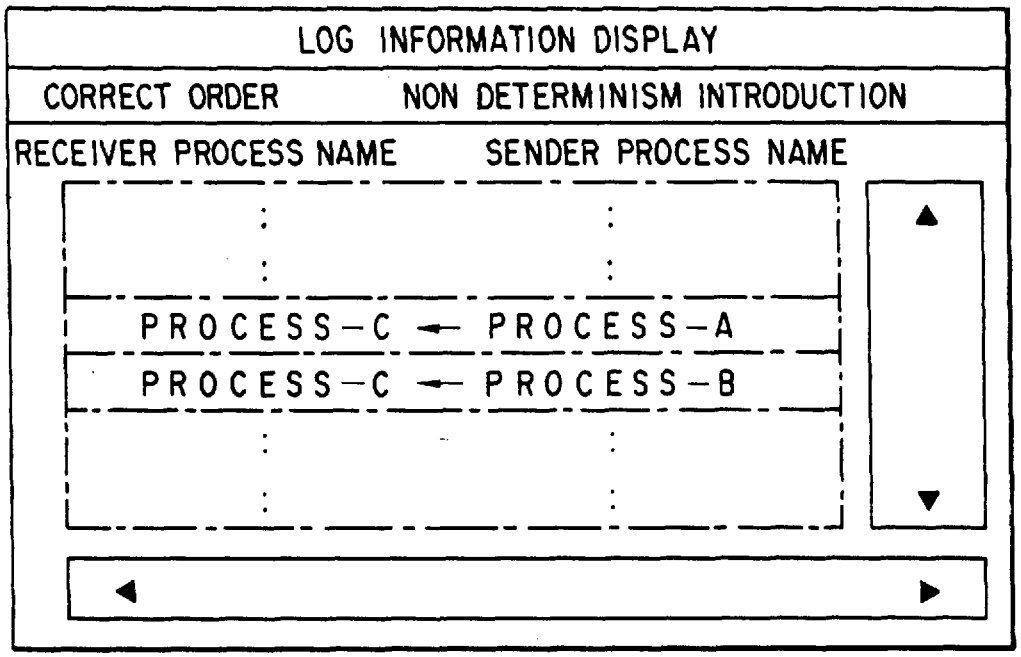
FIG. 87 is a view showing log information in the eighth embodiment.

FIG. 86 shows a state in which interprocess communication is performed through the process group controlling unit 203. Assume that messages are transmitted from processes A and B to a process C. Also assume that intended nondeterminism representing that the message from either of the processes A and B can be sent first to the process C is present. In this case, when the message from the process A is accidentally sent earlier than the process B in execution, {process A→process C} is stored in the log information first, and then {process B→process C} is stored in the log information. The log information as the serializing rules is shown in FIG. 87.

In the serialization unit 12, the first concurrent program stored in the CP file storing unit 11 is caused to correspond to the log information serving as the serializing rules obtained as described above. A first concurrent program having concurrency is converted into a hyper sequential program to which serialization information is added.

In the stage of the testing and debugging operation, messages exchanged between processes are temporarily received by the process group controlling unit 203 and transmitted to the authentic destinations in accordance with an order represented by the log information stored in the log information storing unit 201. For this reason, the process group controlling unit 203 has a mechanism for extracting messages from the messages held in the received message holding unit 204 and transmitting the extracted messages.

As described above, since the messages are transmitted in the order designated by the log information by the process group controlling unit 203, nondeterminism of a processing order which is one of the difficulties in a concurrent program can be solved, thereby realizing good processing reproducibility. More specifically, in FIG. 86, in a given test, even if the process B sends a message to the process C earlier than the process A, the following operation can be performed, provided that the process group controlling unit 203 designates in the log information that the message from the process A is sent to the process C first, as shown in FIG. 87. The message from the process B is held in the received message holding unit 204. After the message from the process A is received and transmitted to the process C, the message from the process B which is held in the received message holding unit 204 is then sent to the process C.

The processing flow of the process group controlling unit 203 is shown in FIG. 88.

If a functional bug is present, the testing and debugging operation of a hyper sequential program whose execution order is defined uniquely in accordance with the log information stored in the log information storing unit 201 must be performed from step A2 again after the source program is corrected. However, if a timing bug is present, the testing and debugging operation can be easily performed. More specifically, the log information serving as the serializing rules is corrected to rewrite the log information so as to represent an intended order. This rewriting is performed by a log information correcting unit 205.

Figure 90:
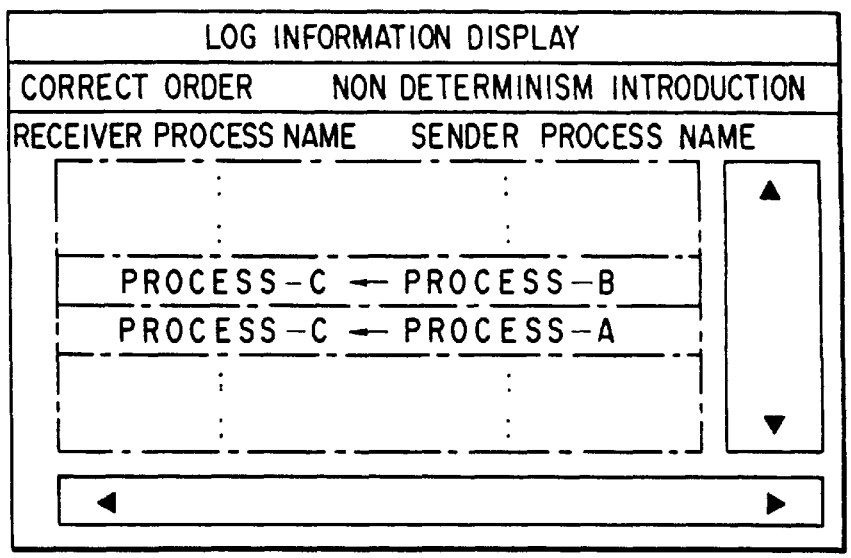
FIG. 90 is a view showing corrected log information in the eighth embodiment.

The log information correcting unit 205 in the serializing rule correcting unit 21 corrects log information serving as serializing rules in accordance with a user command. As shown in FIG. 83, the log information correcting unit 205 has a display section capable of displaying log information in a processing order (time-serially). A user who wants to correct a timing bug starts to operate a replacement section for replacing log information or changing the order of log information and designates a message whose processing order is to be changed, as shown in FIG. 89. In FIG. 89, the replacement of order of two messages are indicated, but the order of a plurality of messages can be changed. At least one message can be defined as a set, and the order of sets may be changed. The log information correcting unit 205 has a rewrite section for rewriting the log information in the log information storing unit 201 in accordance with the designation from the replacing section. The information in FIG. 89 is rewritten, as shown in FIG. 90. As a method of designating a message to be replaced, a method of designating this message using a pointing device, a method of inputting the line number of this message on the screen, or the like may be used.

When the log information is replaced in the intended order as described above, the process group controlling unit 203 changes the order of reception messages to be transmitted to the authentic destination processes in execution of a test, thereby easily correcting timing bugs.

For example, referring to FIG. 86, assume that the process B is supposed to process the message from the process B earlier than the message from the process A. In this case, if the log information represents that the message from the process A is processed first, as shown in FIG. 89, the log information is corrected in accordance with the above procedures, as shown in FIG. 90. Therefore, the message processing order of the process group controlling unit 203 is changed to eliminate the timing bugs.

By using the timing bug elimination method, the processing order of the processes is changed, so that the testing and debugging operation can be easily performed without correcting the source program, thereby improving productivity in program developments.

A method of introducing intended nondeterminism will be described below.

Figure 91:
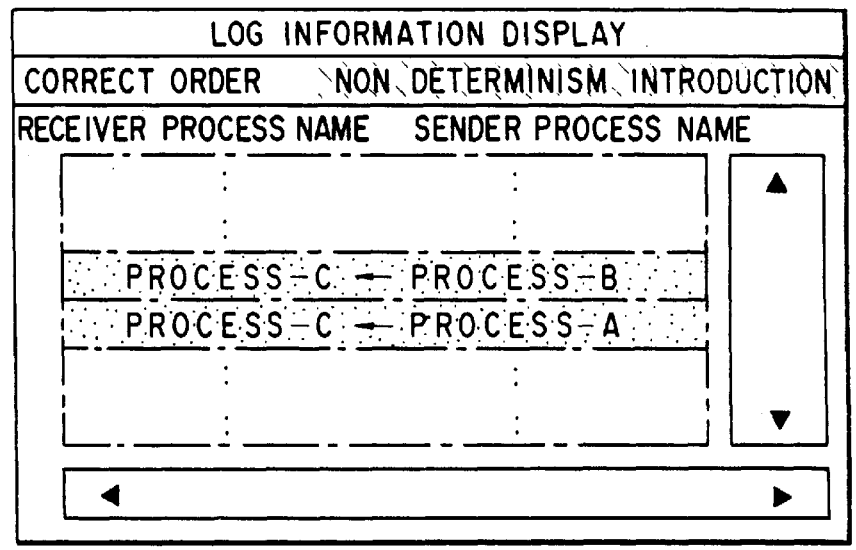
FIG. 91 is a view showing a state in which a target portion is designated to introduce intended nondeterminism to the log information in the eighth embodiment.
Figure 92A:
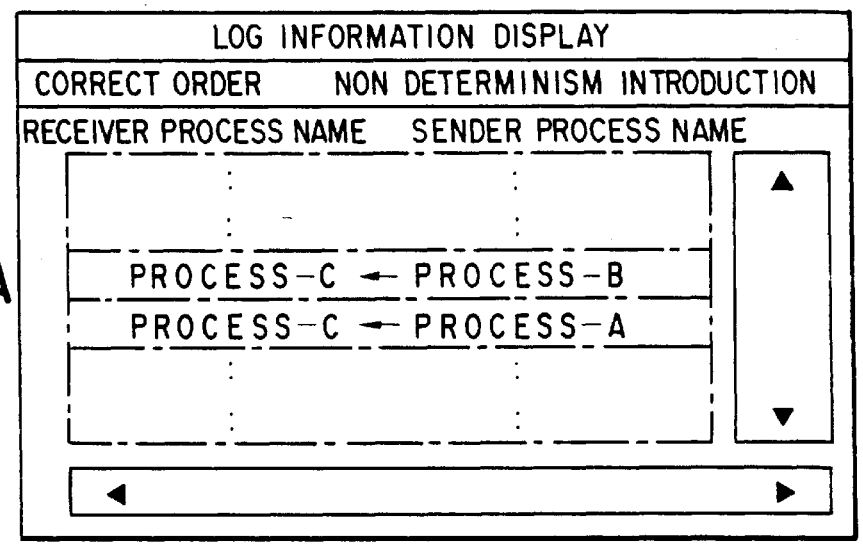
FIGS. 92A and 92B are views showing log information after introduction of intended nondeterminism in the eighth embodiment.
Figure 92B:
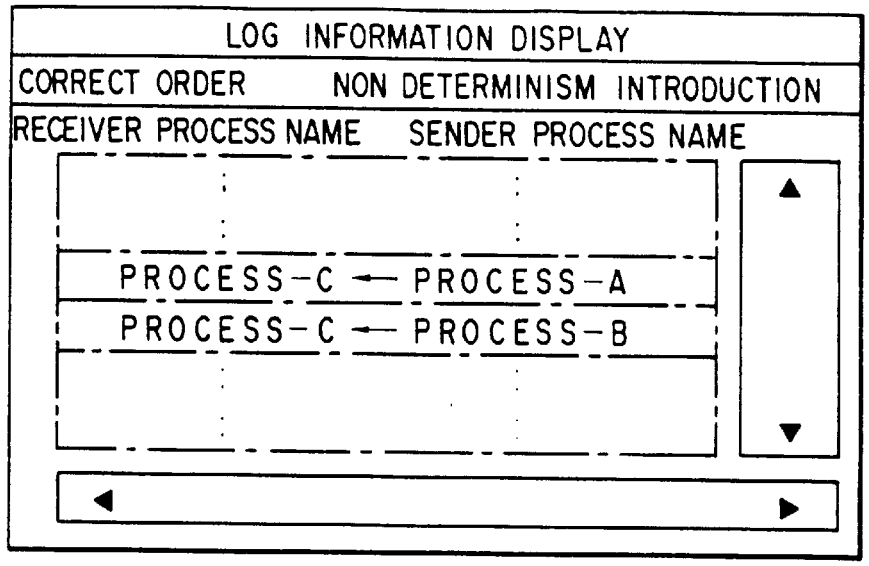

Intended nondeterminism is introduced by correcting log information in a nondeterminism introducing section in the log information correcting unit 205. This indicates that the user intentionally introduces nondeterminism to a hyper sequential program. In the processing shown in FIG. 86, if either of the processes A and B can send the message to the process C first, target log information can be designated, as shown in FIG. 91. The nondeterminism introducing section corrects the log information stored in the log information storing unit 201, as shown in FIGS. 92A and 92B, in the form wherein the order constraint of the designated message is canceled. FIG. 92B shows the log information obtained by designation for shifting the information in FIG. 92A to the right using the horizontal scroll bar. In this case, the nondeterminism of the order of two messages is introduced. In addition, to introduce the order of a large number of messages, information is sequentially shifted to check the list of messages.

Referring to FIGS. 92A and 92B, if a message is the message from the process A or B, the message is translated to be sent to the process C. Even at the subsequent timing, if a message is the message from the process A or B, the message is translated to be sent to the process C. When the process group controlling unit 203 translates the log information as described above, the manipulation of intended nondeterminism can be facilitated. This can be realized as follows. In step K3 (FIG. 88) of processing of the process group controlling unit 203, a target checked whether to coincide as a message source can be expanded from one check target to a plurality of check targets. Upon introduction of this intended nondeterminism, a program can properly react with an external nondeterministic stimulus, thereby realizing flexibility, reutilization, and expansibility of processes.

The above embodiment has a problem processing two messages which a process C successively receives messages from a process A or a process B. This problem can be easily prevented by deleting a message to be deleted from next activate candidate. In this embodiment, the message to be deleted is indicated by only process name as destination information for simplicity of explanation. Since the message to be deleted can be uniquely specified as explained in destination information explanation, a message which has not been processed is not deleted.

Therefore, intended nondeterminism is associated with the input order of two messages. However, it is possible to introduce intended nondeterminism to the input order of three or more messages. Even in this case, the process group controlling unit 203 checks a target in step K3 of FIG. 88 whether to coincide as a message source can be solved by expanding the target from one target to a plurality of targets. Therefore, a program can be apparently properly operated.

The phase of concurrent compiling in step A7 of FIG. 82 and the parallelization unit 18 will be described in detail below. An integrated log information storing unit 301 is a storing unit for storing an execution log information after introducing intended nondeterminism stored in the HSP file storing unit 14. Assume that the integrated log information storing unit 301 stores integrated log information (shown in FIG. 95) having intended nondeterminism introduced therein, which information is converted from integrated log information (FIG. 83) for hyper sequential programs when, for example, a process group in FIG. 80 exchanges messages, as shown in FIG. 94.

Figure 93:
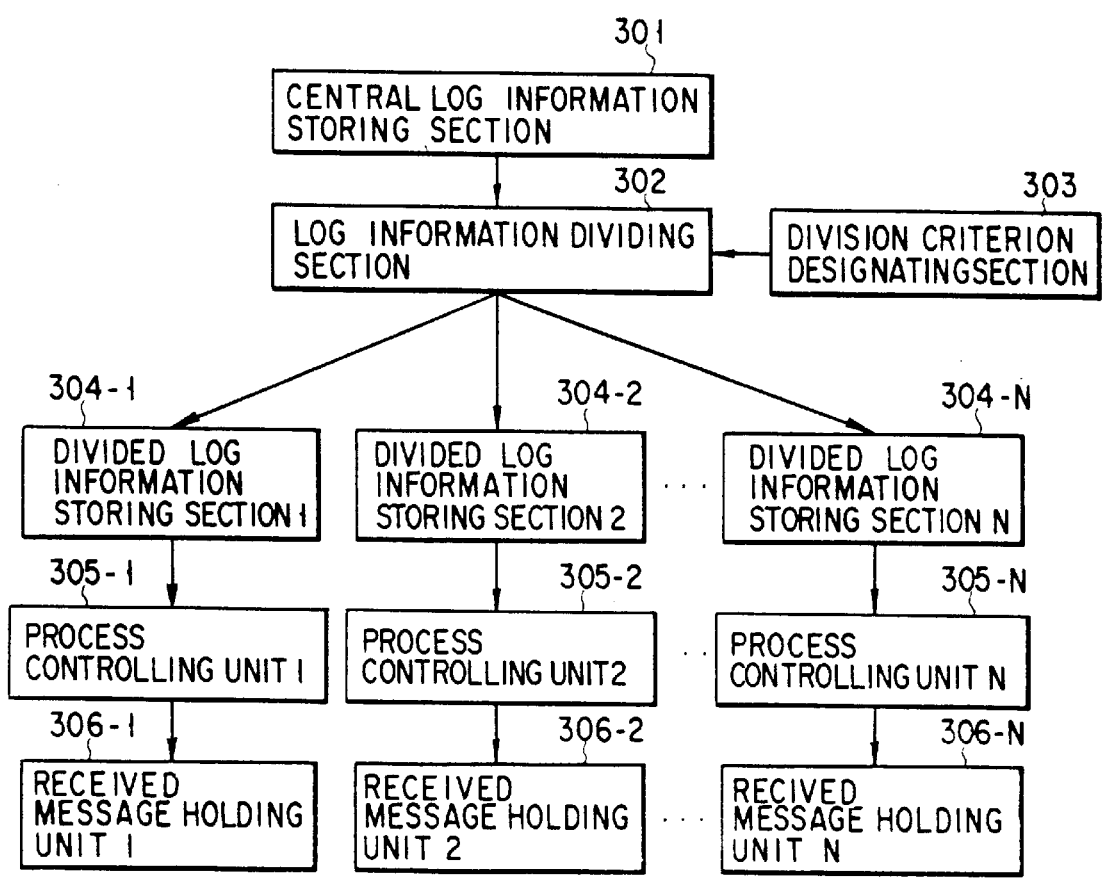
FIG. 93 is a block diagram showing the arrangement of a concurrent program executing system based on the log information in the eighth embodiment.

In the following description, procedures for dividing intended-nondeterminism-introduced, integrated log information in units of processes will be described with reference to FIGS. 93, 95, and 96. A criterion for dividing integrated log information is designated by a division criterion designating section 303 in the division criterion designating unit 23. This criterion is, e.g., a destination process name or a destination computer number. In the following description, the criterion is the destination process name. If a method name is also added to the destination name, the division criterion can be set in the form of {destination process name, method name} to divide the log information in units of destination methods to obtain divided logs. The division criterion designating section 303 holds this division criterion.

To divide integrated log information in accordance with a user command, the log information dividing section 302 is started. The log information dividing section 302 divides the integrated log information with the criterion designated by the division criterion designating section 303 in accordance with procedures shown in FIG. 96.

When the log information dividing section 302 is started, a division criterion value is read from the division criterion designating section 303 (step L1) to grasp the division criterion. One record of the log information stored in the integrated log information storing section 301 is read (step L2) to determine whether the read record is the final record (step L3). In this case, since the first record of the integrated log information is a message from the process A to the process D, as shown in FIG. 95, it is determined that this record is not the last record. This record is stored in the corresponding division log information storing section (in this case, a division log information storing section D) in accordance with a division criterion (destination process name=process D) (step L4). This operation is repeated until the end of log information stored in the integrated log information storing section 301. As a result, the pieces of log information divided in units of destination processes are stored in division log information storing sections A, B, and C, and the division log information storing section D, respectively, as shown in FIGS. 97A to 97D.

FIG. 97A defines that the process A processes the message from the process C and then the message from the process D. The process C in FIG. 97C is a process in which so-called intended nondeterminism is introduced. FIG. 97C defines that a message from either of the processes A and B is processed first, and then the message from either of the processes A and B is processed. In other words, this process indicates intended nondeterminism representing that the message from either of the processes A and B can be input first. This case exemplifies that the constraint of the order of the two messages is canceled. To cancel the constraint of the order of a large number of messages and introduce intended nondeterminism, a desired number of messages can be listed on the same line.

The division log information is divided for destination processes, thereby destination process name in the division log information can be omitted.

A scheme for operating each process in accordance with the log information divided in units of processes will be described below. For example, each process calls a process controlling unit 305 prior to the start of actual processing upon reception of a message, as shown in FIG. 98, and performs processing shown in FIG. 99. The process controlling unit can be called in such a manner that a source program is rewritten so as to insert a call process at the start of processing of each process in the first concurrent program as part of the parallelization unit 18. That is, as shown in FIG. 100, each process consists of a processing portion inherent to the process and further consists of the process controlling unit 305, the division log information storing unit 306 and the received message holding unit 306.

The process controlling unit 305 processes a message with reference to the log information stored in the division log information storing section 304 incorporated in this process. If the message is not a message to be processed, the message is stored in a received message holding unit 306.

Processing of the process controlling unit 305 will be described with reference to FIGS. 97A to 97D and 99.

For example, in a processing flow of FIG. 94, the process A is not determined to receive a message from the process C or D first, and nondeterminism of processing timing is present here. However, in this case, the execution log (corresponding to FIG. 83) executed in hyper sequential processing defines that the message from the process C is processed first and then the message from the process C is processed. Even if harmless nondeterminism is introduced, the definition of the order of message processing must be maintained.

As the first operation, assume that the process A is started upon reception of the message from the process C first. When the process A receives the message from the process C and is started, the process controlling unit is called to obtain source information of the message by which the process A is started (step M1). In this case, source information Is={process C}. Subsequently, message information Ir1 supposed to be input first from the division log information storing section is obtained (step M2). In this case, Ir1= {process C}.

To check whether the order of the currently received message coincides with that stored in the division log information, it is determined whether Is is included in Ir1 (step M3). In this case, the orders coincide with each other in the process C, so that processing based on the received message is allowed to be performed. For this reason, the record to be read out from the division log information storing section to perform the next start check is incremented by one (step M4). Prior to the start of processing of the process body, if an execute waiting message is present in the received message holding unit, it is determined whether the held message can be started. That is, message information Ir2 to be processed next is extracted from the information stored in the division log information storing unit (step M5), and it is determined whether a message included in it is present in the process wait message holding unit (step M6). In this case, Ir2={process D}. However, since any message is not present in the received message holding unit, processing is ended, and main processing based on the message from the process C is performed.

When the process A receives a message from the process D, processing is performed in the same manner as described above, thereby obtaining Is={process D} and Ir1={process D}. A set Is is equal to or included in a set Ir1. Since no Ir2 is present, a message in the process wait message holding unit need not be checked, and processing is ended. Processing based on the message from the process D is performed.

To the contrary, a processing flow upon reception of a message from the process D first by the process A is shown. That is, when the process A is started upon reception of the message from the process D first, the process controlling unit is called to obtain source information of the message by which the process A is started (step M1). In this case, Is={process D}. Message information Ir1 to be input next from the division log information storing unit is obtained (step M2). In this case, Ir1={process C}.

To check whether the order of the currently received message coincides with that stored in the division log information, it is determined whether Is is included in Ir1 (step M3). In this case, since Is is not included in Ir1, it is determined that the message from the process D cannot be immediately processed. The message from the process D is held in the received message holding unit 306 (step M8), and processing of the process A is forcibly ended (step M9). That is, processing of the process A is ended unless processing based on the message from the process D is performed.

When a message from the process C is input to the process A, processing is performed in the same manner as described above, thereby obtaining Is={process C} and Ir1={process C}. Is is included in Ir1, so that processing based on the received message is allowed to be immediately performed. The record to be read out from the division log information storing section to perform the next start check is incremented by one (step M4). Prior to the start of processing of the process body, if an execute waiting message is present in the received message holding unit, it is determined whether the held message can be started. That is, message information Ir2 to be processed next is extracted from the information stored in the division log information storing unit (step M5), and it is determined whether a message included in it is present in the process wait message holding unit (step M6). In this case, Ir2={process D}. The message previously held in the process wait message holding unit is present. To process the message to be executable, source information or the like (in this case, the process D) is transmitted to the destination (in this case, the process A) without modifications (step M7). The process A completes processing of the process controlling unit so as to perform processing based on the message sent as the received message from the process C.

The process A receives the message extracted and transmitted from the received message holding unit, and processing is performed in the same manner as described above to obtain Is={process D} and Ir1={process D}. Is becomes Ir1. Since Ir2 is no longer present, processing is completed without checking a message in the received message holding unit. Processing based on the message from the process D is performed.

Even if the order of message inputs is different from that described in the execution log, processing is performed in the order described in the execution log, thereby assuring reproducibility of nondeterministic processing.

An operation of the process C will be exemplified as a processing operation upon introduction of intended nondeterminism. When the process C is started upon reception of a message from the process A first, the process controlling unit is called to obtain source information of the message by which the process C is started (step M1). In this case, source information Is={process A}. Message information Ir1 to be input first from the division log information storing section is obtained (step M2). In this case, Ir1={process A, process B}. A message from either of the processes A and B can be received first.

To check whether the order of the currently received message coincides with that stored in the division log information, it is determined whether Is is included in Ir1 (step M3). In this case, since a set Is is equal to or included in a set Ir1, processing based on the received message is allowed to be immediately performed. For this reason, the record to be read out from the division log information storing section to perform the next start check is incremented by one (step M4). Prior to the start of processing of the process body, if an execute waiting message is present in the received message holding unit, it is determined whether the held message can be started. That is, message information Ir2 to be processed next is extracted from the information stored in the division log information storing unit (step M5), and it is determined whether a message included in it is present in the process wait message holding unit (step M6). In this case, Ir2={process A, process B}. Since no message is present in the received message holding unit, processing is ended, and main processing based on the message from the process A is performed.

When a message from the process B is then input to the process C, processing is performed in the same manner as described above to obtain Is={process B} and Ir1={process A, process B}. Is is equal to or included in Ir1. Since Ir2 is not present, processing is ended without checking the message in the received message holding unit, and processing based on the message from the process B is performed.

As a case in which intended nondeterminism is introduced, a state in which the message input order is reversed can be processed in the same manner as described above. That is, even if the message from the process B is input to the process C first and then the message from the process A is input to the process C, the same processing can be performed as described above.

The above embodiment has a problem processing two messages which a process C successively receives messages from a process A or a process B. This problem can be easily prevented by deleting a message to be deleted from next activate candidate. In this embodiment, the message to be deleted is indicated by only process name as destination information for simplicity of explanation. Since the message to be deleted can be uniquely specified as explained in destination information explanation, a message which has not been processed is not deleted.

As described above, the execution log information is divided in units of objects. For this reason, while harmless nondeterminism latently present in the concurrent program is realized, sequencing extracted by the hyper sequential program is maintained. Reproducibility of processing is maintained, and the same result as in execution of the hyper sequential program can be realized with higher processing performance.

Intended nondeterminism is exhibited in the input order of the two messages in the above case. However, it is possible to assign intended nondeterminism to the input order of three or more messages. Even in this case, the above processing can be solved by causing Ir1 or Ir2 to have a plurality of factors. Therefore, processing can be correctly performed, as a matter of course.

The above case exemplifies the embodiment in which the process controlling unit is called at the start of each process or method to realize the process or method. However, it is also possible that an operating system of each computer holds a received message holding unit for each destination process, and the corresponding division information is referred to every message processing to start the corresponding process or holds this process in the received message holding unit.

In this case, a process may be changed as an successively activable process from execute waiting state to scheduling object without transmitting next message to be processed in step M7 in FIG. 99.

According to this embodiment, log information as serializing rules is rewritten without correcting a source program to easily solve a drawback caused by nondeterminism of a processing timing. The development of a concurrent/parallel/distributed program in which nondeterminism of a processing timing is inherent can be facilitated, thereby improving productivity.

In this embodiment, since only intended nondeterminism intended by a user can be easily introduced, flexibility, reutilization, and expansibility of a concurrent program can be maintained.

In addition, integrated log information of all processes obtained by sequencing a concurrent program can be divided in units of processes. Each process is controlled on the basis of the divided log information to naturally introduce harmless nondeterminism, and the same result as in execution of a hyper sequential program on the basis of integrated log information can be obtained with a higher processing efficiency.

Note that possible arrangements of a computer system according to the present invention are as follows in FIG. 2:

(a) an arrangement in which the shared memory 3 is not present;

(b) a parallel computer in which the processors 1-1 to 1-N are densely connected through the I/O interface 2 serving as a bus;

(c) a distributed network computer system in which processors are sparsely connected through an I/O interface serving as a communication line; and (d) an arrangement constituted by a single processor, and a combination of such arrangements.

Various changes and modifications may be made without departing from the spirit and scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for supporting parallelization comprising:

serialization means for converting a first concurrent program having a concurrent structure into a sequential program capable of being sequentially executed;

parallelization means for performing parallelization of the sequential program to convert the sequential program into a second concurrent program; and concurrency introduction means for introducing information associated with concurrency to the sequential program.

2. An apparatus according to claim 1, wherein said serialization means includes execution means for executing the first concurrent program, storing means for storing a set of execution logs generated by said execution means, analysis means for analyzing the set of execution logs stored in said storing means and the first concurrent program, and rearranging means for rearranging execution logs stored in said storing means on the basis of an analysis result from said analysis means.

3. An apparatus according to claim 1, wherein said concurrency introduction means includes field data generating means for converting a flow of processes of the sequential program into a field consisting of a constraint and a transition condition to generate field data representing said field, tuning means for tuning said field represented by the field data generated by said field data generating means, and display means for displaying said field represented by the field data generated by said field data generating means.

4. An apparatus according to claim 1, wherein said serialization means includes execution means for executing the first concurrent program and storing means for storing a set of execution logs generated by said execution means, and said concurrency introduction means includes rearranging means for rearranging execution logs stored in said storing means.

5. An apparatus for supporting parallelization comprising:

serialization means for converting a first concurrent program having a concurrent structure into a sequential program capable of being sequentially executed;

parallelization means for performing parallelization of the sequential program to convert the sequential program into a second concurrent program; and first analysis means for analyzing dependency relations between instructions in the first concurrent program, and wherein said parallelization means includes means for using an analysis result from said first analysis means to parallelize the sequential program, thereby converting the sequential program into the second concurrent program.

6. An apparatus according to claim 5, wherein said serialization means includes execution means for executing the first concurrent program, storing means for storing a set of execution logs generated by said execution means, second analysis means for analyzing the set of execution logs stored in said storing means and the first concurrent program, and rearranging means for rearranging execution logs stored in said storing means on the basis of an analysis result from said second analysis means.

7. An apparatus according to claim 5, further comprising:

field data generating means for converting a flow of processes of the sequential program into a field consisting of a constraint and a transition condition to generate field data representing said field, tuning means for tuning said field represented by the field data generated by said field data generating means, and display means for displaying said field represented by the field data generated by said field data generating means.

8. An apparatus for supporting parallelization, comprising:

serialization means for converting a predetermined section of a first concurrent program having a concurrent structure into a sequential program capable of being sequentially executed;

concurrent structure analysis means for analyzing the concurrent structure of the predetermined section of the first concurrent program;

sequential structure analysis means for analyzing a sequential structure of a predetermined section of the sequential program;

graph information display means for displaying, as graph information, a correlation associated with the concurrent structure analyzed by said concurrent structure analysis means and a correlation associated with the sequential structure analyzed by said sequential structure analysis means;

concurrency introduction means for performing parallelization of selected sections of the sequential program to convert the sections into a partial sequential program partially having the concurrent structure; and parallelization means for performing parallelization of the partial sequential program to convert the partial sequential program into a second concurrent program.

9. An apparatus according to claim 8, wherein said serialization means includes execution means for executing the first concurrent program, storing means for storing a set of execution logs generated by said execution means, analysis means for analyzing the set of execution logs stored in said storing means and the first concurrent program, and rearranging means for rearranging execution logs stored in said storing means on the basis of an analysis result from said analysis means.

10. An apparatus according to claim 4, wherein said concurrency introduction means includes field data generating means for converting a flow of processes of the sequential program into a field consisting of a constraint and a transition condition to generate field data representing said field, tuning means for tuning said field represented by the field data generated by said field data generating means, and display means for displaying said field represented by the field data generated by said field data generating means.

11. An apparatus for supporting parallelization comprising:

serialization means for converting a first concurrent program having a concurrent structure into a sequential program capable of being sequentially executed;

parallelization means for performing parallelization of the sequential program to convert the sequential program into a second concurrent program;

field data generating means for converting a flow of processes of the sequential program into a field consisting of a constraint and a transition condition to generate field data representing said field;

tuning means for tuning said field represented by the field data generated by said field data generating means; and display means for displaying said field represented by the field data generated by said field data generating means.

12. An apparatus for supporting parallelization, comprising:

serialization means for converting a first concurrent program to a plurality of sequential programs;

concurrency introduction means for introducing information associated with concurrency to the plurality of sequential programs;

debugging means for independently debugging the plurality of sequential programs; and parallelization means for performing parallelization of the debugged plurality of sequential programs to convert the plurality of debugged sequential programs into a second concurrent program.

13. An apparatus for supporting parallelization, comprising:

serialization means for converting a first concurrent program to a plurality of sequential programs;

first analysis means for analyzing dependency relations between instructions in the first concurrent program;

debugging means for independently debugging the plurality of sequential programs; and parallelization means for performing parallelization of the debugged plurality of sequential programs to convert the plurality of debugged sequential programs into a second concurrent program by using an analysis result from said first analysis means.

14. An apparatus for supporting parallelization, comprising:

serialization rule storing means for storing a serializing rule;

serialization means for converting a first concurrent program having a concurrent structure into a sequential program capable of being sequentially executed in accordance with the serializing rule stored in said serializing rule storing means;

serializing rule changing means for changing the serializing rule stored in said serializing rule storing means to introduce information associated with concurrency to the sequential program;

debugging means for debugging the sequential program; and parallelization means for performing parallelization of the sequential program, debugged by said debugging means, in which the information associated with the concurrency is introduced by said serializing rule changing means, to convert the sequential program into a second concurrent program.

15. A method of programming a concurrent program, comprising:

the step of converting a first concurrent program having a concurrent structure into a sequential program capable of being sequentially executed;

the step of introducing information associated with concurrency to the sequential program; and the step of performing parallelization of the sequential program to convert the sequential program into a second concurrent program.

16. A method according to claim 15, wherein the step of introducing information includes the substep of introducing designated nondeterminism to the sequential program.

17. A method according to claim 15, wherein the step of converting a first concurrent program includes the first substep of executing the first concurrent program, the second substep of storing a set of execution logs generated in the first substep, the third substep of analyzing the set of execution logs stored in the second substep and the first concurrent program, and the fourth substep of rearranging execution logs stored in the second substep on the basis of an analysis result in the third substep.

18. A method according to claim 17, wherein the third substep includes the substep of extracting precedence constraints between processes from the set of execution logs stored in the second substep and the first concurrent program and storing the precedence constraints as an analysis result.

19. A method according to claim 15, wherein the step of introducing information includes the substep of converting a flow of processes of the sequential program into a field consisting of a constraint and a transition condition, the substep of tuning said field, and the substep of introducing the information associated with the concurrency.

20. A method according to claim 15, wherein the step of converting a first concurrent program includes the first substep of executing the first concurrent program and the second substep of storing a set of execution logs generated in the first substep, and the step of introducing information includes the substep of rearranging execution logs stored in the second substep to introduce the information associated with concurrency.

21. A method of programming a concurrent program, comprising:

the first step of converting a first concurrent program having a concurrent structure into a sequential program capable of being sequentially executed;

the second step of performing parallelization of the sequential program to convert the sequential program into a second concurrent program, wherein the first step includes the substep of analyzing a dependency relation between instructions in the first concurrent program, and the second step includes the substep of performing parallelization of the sequential program by using the concurrent structure of the first concurrent program.

22. A method according to claim 21, further comprising the step of introducing designated nondeterminism to the sequential program.

23. A method according to claim 21, wherein the first step includes the first substep of executing the first concurrent program, the second substep of storing a set of execution logs generated in the first substep, the third substep of analyzing the set of execution logs stored in the second substep and the first concurrent program, and the fourth substep of rearranging execution logs stored in the second substep on the basis of an analysis result in the third substep.

24. A method according to claim 23, wherein the third substep includes the substep of extracting precedence constraints between processes from the set of execution logs stored in the second substep and the first concurrent program and storing the precedence constraints as an analysis result.

25. A method according to claim 21, further comprising the step of converting a flow of processes of the sequential program into a field consisting of a constraint and a transition condition, the step of tuning said field, and the step of introducing information associated with the concurrency.

26. A method of programming a concurrent program, comprising:

the step of converting a first concurrent program having a concurrent structure into a sequential program capable of being sequentially executed;

the step of introducing designated nondeterminism to the sequential program; and the step of performing parallelization of the sequential program to convert the sequential program into a second concurrent program.

27. A method of programming a concurrent program, comprising:

the first step of converting a first concurrent program having a concurrent structure into a sequential program capable of being sequentially executed;

the second step of performing parallelization of the sequential program to convert the sequential program into a second concurrent program, wherein the first step includes the first substep of converting a predetermined section of the first concurrent program having the concurrent structure into the sequential program capable of being sequentially executed, the second substep of analyzing the concurrent structure of the predetermined section of the first concurrent program, the third substep of analyzing a sequential structure of a predetermined section of the sequential program, the fourth substep of displaying, as graph information, a correlation associated with the concurrent structure analyzed in the second substep and a correlation associated with the sequential structure analyzed in said third step, and the fifth substep of performing parallelization of the selected predetermined section of the sequential program to convert the section into a partial sequential program partially having the concurrent structure, and wherein the second step includes the substep of performing parallelization of the partial sequential program to convert the partial sequential program into a second concurrent program.

28. A method of programming a concurrent program, comprising:

the first step of converting a predetermined section of a first concurrent program having a concurrent structure into a sequential program capable of being sequentially executed;

the second step of analyzing the concurrent structure of the predetermined section of the first concurrent program;

the third step of analyzing a sequential structure of a predetermined section of the sequential program;

the fourth step of displaying, as graph information, a correlation associated with the concurrent structure analyzed in the second step and a correlation associated with the sequential structure analyzed in the third step;

the fifth step of performing parallelization of at least two selected sections of the sequential program to convert the sections into a partial sequential program partially having the concurrent structure; and the sixth step of performing parallelization of the partial sequential program to convert the partial sequential program into a second concurrent program.

29. A method according to claim 28, wherein the first step includes the substep of debugging the sequential program until a desired execution result of the sequential program is obtained.

30. A method according to claim 29, wherein the first step includes the first substep of executing the first concurrent program, the second substep of storing a set of execution logs generated in the first substep, the third substep of analyzing the set of execution logs stored in the second substep and the first concurrent program, and the fourth substep of rearranging execution logs stored in the second substep on the basis of an analysis result in the third substep.

31. A method according to claim 30, wherein the third substep includes the substep of extracting precedence constraints between processes from the set of execution logs stored in the second substep and the first concurrent program and storing the precedence constraints as an analysis result.

32. A method according to claim 28, wherein the fourth step includes the substep of displaying the graph information while defining the predetermined section as a node, the correlation associated with the concurrent structure as a first arc, and the correlation associated with the sequential structure as a second arc.

33. A method according to claim 28, wherein the fifth step includes the substep of debugging the partial sequential program until a desired execution result of the partial sequential program is obtained.

34. A method according to claim 28, wherein the fifth step includes the substep of analyzing the sequential structure of a predetermined section of the partial sequential program, and further comprising a seventh step of repeating processing from the fourth step to the fifth step.

35. A method according to claim 28, wherein the first step includes
the first substep of executing the first concurrent program,
the second substep of storing a set of execution logs generated in the first substep,
the third substep of analyzing the set of execution logs stored in the second substep and the first concurrent program, and
the fourth substep of rearranging execution logs stored in the second substep on the basis of an analysis result in the third substep.

36. A method according to claim 35, wherein the third substep includes the substep of extracting precedence constraints between processes from the set of execution logs stored in the second substep and the first concurrent program and storing the precedence constraints as an analysis result.

37. A method of programming a concurrent program, comprising:
the first step of converting a first concurrent program having a concurrent structure into a sequential program capable of being sequentially executed; and
the second step of performing parallelization of the sequential program to convert the sequential program into a second concurrent program,
wherein the first step includes
the first substep of executing the concurrent program,
the second substep of storing a set of execution logs generated in the first substep,
the third substep of analyzing the set of execution logs stored in the second substep and the first concurrent program, and
the fourth substep of rearranging execution logs stored in the second substep on the basis of an analysis result in the third substep, and
wherein the third substep includes
the substep of extracting precedence constraints between processes and their sections from the set of execution logs stored in the second substep and the first concurrent program and storing the precedence constraints as an analysis result.

38. A method of programming a concurrent program, comprising:
the step of converting a first concurrent program having a concurrent structure into a sequential program capable of being sequentially executed;
the step of converting a flow of processes of the sequential program into a field consisting of a constraint and a transition condition;
the step of tuning said field;
the step of introducing information associated with the concurrency; and
the step of performing parallelization of the sequential program to convert the sequential program into a second concurrent program.

39. A method of programming a concurrent program, comprising:
the first step of converting a predetermined process group of a first concurrent program having a concurrent structure into a sequential program capable of being sequentially executed in accordance with a predetermined execute order;
the second step of designating some processes in the predetermined process group as a parallelization candidate for the sequential program;
the third step of changing the execution order of said process group designated in the second step to convert the sequential program into a pseudo-concurrent program;
the fourth step of converting the pseudo-concurrent program into a partial sequential program partially having a sequential structure; and
the fifth step of performing parallelization of the partial sequential program to convert the partial sequential program into a second concurrent program.

40. A method according to claim 39, wherein the first step includes the substep of debugging the sequential program until a desired execution result of the sequential program is obtained.

41. A method according to claim 39, wherein the second step includes
the substep of analyzing the first concurrent program, and
the substep of extracting said process group as a parallelization candidate from an analysis result.

42. A method according to claim 39, wherein the third step includes the substep of debugging the pseudo-concurrent program until a desired execution result of the pseudo-concurrent program is obtained.

43. A method according to claim 39, wherein the third step includes the substep of eliminating a pseudo-concurrent behavior determined as unnecessary from an execution result of the pseudo-concurrent program.

44. A method according to claim 39, wherein the fourth step includes the substep of designating said some processes in the predetermined process group as a parallelization candidate for the partial sequential program, and further comprising
the step of repeating processing from the third step to the fourth step a predetermined number of times.

45. A method of programming a concurrent program, comprising:
the first step of converting a first concurrent program having a concurrent structure into a sequential program capable of being sequentially executed; and
the second step of performing parallelization of the sequential program to convert the sequential program into a second concurrent program,
wherein the first step includes
the first substep of converting the first concurrent program into the sequential program in accordance with a serializing rule, and
the second substep of changing the serializing rule to introduce information associated with concurrency to the sequential program, and
the second step includes the substep of performing parallelization of the sequential program on the basis of debugging information and the information associated with the concurrency to convert the sequential program into a second concurrent program.

46. An apparatus for supporting parallelization comprising:

serialization means for converting a first concurrent program having a concurrent structure into a sequential program capable of being sequentially executed;

parallelization means for performing parallelization of the sequential program to convert the sequential program into a second concurrent program; and nondeterminism introduction means for introducing designated nondeterminism to the sequential program as information associated with the concurrency.

47. An apparatus according to claim 46, wherein said nondeterminism introduction means includes execution means for executing the first concurrent program, storing means for storing a set of execution logs generated by said execution means, analysis means for analyzing the set of execution logs stored in said storing means and the first concurrent program, and rearranging means for rearranging execution logs stored in said storing means on the basis of an analysis result from said analysis means.

48. An apparatus for supporting parallelization, comprising:

serialization means for converting a predetermined section of a first concurrent program having a concurrent structure into a sequential program capable of being sequentially executed;

graph information display means for displaying, as graph information, the sequential program;

concurrency introduction means for performing parallelization of at least two selected sections of the sequential program to convert the sections into a partial sequential program partially having the concurrent structure; and parallelization means for performing parallelization of the partial sequential program to convert the partial sequential program into a second concurrent program.

49. An apparatus for supporting parallelization, comprising:

serialization means for converting a predetermined section of a first concurrent program having a concurrent structure into a sequential program capable of being sequentially executed;

graph information display means for displaying, as graph information, the sequential program;

concurrency introduction means for canceling a sequential part of the sequential program and introducing designated concurrency to the sequential program by using information of the graph information display means to provide a partial sequential program; and parallelization means for performing parallelization of the partial sequential program to convert the sequential program into a second concurrent program.

50. An apparatus for supporting parallelization, comprising:

serialization means for converting a predetermined process group of a first concurrent program having a concurrent structure into a sequential program capable of being sequentially executed in accordance with a predetermined execution order;

process designating means for designating some processes in the predetermined process group as parallelization candidates for the sequential program;

simulated concurrent program conversion means for changing an execution order of said processes designated by said process designating means to convert the sequential program into a plurality of pseudo-concurrent programs;

concurrency introduction means for converting the plurality of pseudo-concurrent programs into a partial sequential program partially having a concurrent structure; and parallelization means for performing parallelization of the partial sequential program to convert the partial sequential program into a second concurrent program.

51. A method of programming a concurrent program, comprising:

the first step of converting a predetermined section of a first concurrent program having a concurrent structure into a sequential program capable of being sequentially executed;

the second step of displaying, as graph information, the sequential program;

the third step of introducing concurrency of at least two selected predetermined sections of the sequential program to convert the sections into a partial sequential program partially having the concurrent structure; and the fourth step of performing parallelization of the partial sequential program to convert the partial sequential program into a second concurrent program.

52. A method of programming a concurrent program, comprising:

the first step of converting a predetermined section of a first concurrent program having a concurrent structure into a sequential program capable of being sequentially executed;

the second step of displaying, as graph information, the sequential program;

the third step of canceling a sequential part of the sequential program and introducing designated concurrency to the sequential program by using information of the graph information display means; and the fourth step of performing parallelization of the sequential program to convert the sequential program into a second concurrent program.

* * * * *